(12) United States Patent
Maruyama et al.

(10) Patent No.: US 11,928,734 B2
(45) Date of Patent: Mar. 12, 2024

(54) SYSTEMS AND METHODS FOR DETERMINING AN INITIAL MARGIN

(71) Applicant: Intercontinental Exchange Holdings, Inc., Atlanta, GA (US)

(72) Inventors: Atsushi Maruyama, London (GB); Boudewijn Duinstra, Woerden (NL); Christian A. M. Schlegel, Marietta, GA (US); Daniel R. de Almeida, Dunwoody, GA (US); Fernando V. Cerezetti, Orpington (GB); Gabriel E. S. Medina, London (GB); Ghais Issa, Atlanta, GA (US); Iddo Yekutieli, Atlanta, GA (US); Jerome M. Drean, Atlanta, GA (US); Marcus Keppeler, London (GB); Rafik Mrabet, London (GB); Stephen R. Pounds, Roswell, GA (US); Wen Jiang, Marietta, GA (US); Yanyan Hu, London (GB); Yunke Yang, Atlanta, GA (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

(21) Appl. No.: 17/719,983

(22) Filed: Apr. 13, 2022

(65) Prior Publication Data
US 2022/0237701 A1    Jul. 28, 2022

Related U.S. Application Data

(63) Continuation of application No. 17/530,591, filed on Nov. 19, 2021, now Pat. No. 11,321,782, which is a
(Continued)

(51) Int. Cl.
*G06Q 40/06* (2012.01)

(52) U.S. Cl.
CPC .................................. *G06Q 40/06* (2013.01)

(58) Field of Classification Search
None
See application file for complete search history.

(56) References Cited

U.S. PATENT DOCUMENTS

| 7,426,487 B2 | 9/2008 | Glinberg et al. |
| 7,593,879 B2 | 9/2009 | Glinberg et al. |

(Continued)

FOREIGN PATENT DOCUMENTS

| CN | 101964104 A | 2/2011 |
| WO | 2015/094545 A1 | 6/2015 |

OTHER PUBLICATIONS

Artzner, Philippe, et al., "*Coherent Measures of Risk*," Jul. 22, 1998, pp. 1-24.

(Continued)

*Primary Examiner* — Jason M. Borlinghaus
(74) *Attorney, Agent, or Firm* — DLA Piper LLP (US)

(57) ABSTRACT

An exemplary system according to the present disclosure comprises a computing device that in operation, causes the system to receive financial product or financial portfolio data, map the financial product to a risk factor, execute a risk factor simulation process involving the risk factor, generate product profit and loss values for the financial product or portfolio profit and loss values for the financial portfolio based on the risk factor simulation process, and determine an initial margin for the financial product. The risk factor simulation process can be a filtered historical simulation process.

12 Claims, 27 Drawing Sheets

Related U.S. Application Data continuation of application No. 17/221,052, filed on Apr. 2, 2021, now Pat. No. 11,216,886, which is a continuation of application No. 17/104,403, filed on Nov. 25, 2020, now Pat. No. 11,023,978, which is a continuation of application No. 16/775,970, filed on Jan. 29, 2020, now Pat. No. 10,922,755, which is a continuation-in-part of application No. 16/046,190, filed on Jul. 26, 2018, now Pat. No. 10,817,947, which is a continuation of application No. 14/303,941, filed on Jun. 13, 2014, now Pat. No. 10,102,581.

(60) Provisional application No. 61/835,711, filed on Jun. 17, 2013.

(56) References Cited

U.S. PATENT DOCUMENTS

| | | | |
|---|---|---|---|
| 7,813,988 | B2 | 10/2010 | Levin et al. |
| 8,103,578 | B2 | 1/2012 | Koblas et al. |
| 8,108,281 | B2 | 1/2012 | Koblas et al. |
| 8,131,634 | B1 | 3/2012 | Shah |
| 8,239,308 | B2 | 8/2012 | Iyer et al. |
| 8,321,333 | B2 | 11/2012 | Shah |
| 8,738,509 | B2 | 5/2014 | Koblas et al. |
| 8,849,711 | B2 | 9/2014 | Glinberg et al. |
| 10,157,419 | B1 | 12/2018 | Xu et al. |
| 10,430,880 | B2 | 10/2019 | Baysal et al. |
| 10,515,410 | B2 | 12/2019 | Kodama et al. |
| 2002/0042764 | A1 | 4/2002 | Gardner et al. |
| 2002/0046145 | A1 | 4/2002 | Ittai |
| 2003/0018550 | A1 | 1/2003 | Rotman et al. |
| 2003/0101122 | A1 | 5/2003 | Merkoulovitch et al. |
| 2004/0030667 | A1* | 2/2004 | Xu ............. G06Q 40/08 |
| 2006/0004653 | A1* | 1/2006 | Strongin, II ......... G06Q 20/10 705/37 |
| 2007/0179908 | A1 | 8/2007 | Stubbs et al. |
| 2007/0288397 | A1 | 12/2007 | Frahm et al. |
| 2008/0319920 | A1* | 12/2008 | Levin ............. G06Q 40/06 705/36 R |
| 2009/0171824 | A1 | 7/2009 | Glinberg et al. |
| 2009/0271325 | A1 | 10/2009 | Wilson |
| 2010/0287113 | A1 | 11/2010 | Lo et al. |
| 2010/0287119 | A1 | 11/2010 | Browne et al. |
| 2011/0047096 | A1 | 2/2011 | Levin et al. |
| 2011/0145168 | A1 | 6/2011 | Dirnstorfer et al. |
| 2012/0041893 | A1 | 2/2012 | Glinberg et al. |
| 2012/0209756 | A1 | 8/2012 | El-Sakkout et al. |
| 2012/0246094 | A1 | 9/2012 | Hsu et al. |
| 2013/0060673 | A1 | 3/2013 | Shah et al. |
| 2013/0066807 | A1 | 3/2013 | Iyer et al. |
| 2013/0073479 | A1 | 3/2013 | Koblas et al. |
| 2014/0172746 | A1 | 6/2014 | Yin et al. |
| 2014/0207650 | A1 | 7/2014 | Shah |

OTHER PUBLICATIONS

Ballotta, Laura, et al., "A Gentle Introduction to Value at Risk," Technical Report, Apr. 2017, pp. 1-85.
Barone-Adesi, Giovanni, et al., "VaR Without Correlations for Portfolio of Derivative Securities," Apr. 1997, pp. 1-28.
"Amendment to the Capital Accord to Incorporate Market Risks," Basle Committee on Banking Supervision, Jan. 1996, pp. 1-54.
"International Convergence of Capital Measurement and Capital Standards," Basle Committee on Banking Supervision, Jul. 1988, pp. 1-28.
"Sound Practices for Backtesting Counterparty Credit Risk Models," Basle Committee on Banking Supervision, Dec. 2010, pp. 1-123.
"Fundamental Review of the Trading Book: A Revised Market Risk Framework," Consultative Document, Basle Committee on Banking Supervision, Oct. 2013, pp. 1-123.
Bollerslev, Tim, "Generalized Autoregressive Conditional Heteroskedasticity," Journal of Econometrics 31, North-Holland, 1986, pp. 307-327.
Cont, Rama "Empirical Properties of Asset Returns: Stylized Facts and Statistical Issues," Institute of Physics Publishing, Quantitative Finance vol. 1, 2001, pp. 223-236.
Danielsson, Jón, et al., "Subadditivity Re-Examined: the Case for Value-at-Risk," Nov. 2005, pp. 1-18.
Demarta, Stefano, et al., "The t Copula and Related Copulas," May 2004, pp. 1-20.
Dhaene, Jan, et al., "Can a Coherent Risk Measure Be Too Subadditive?" Nov. 27, 2006, pp. 1-28.
"EACH Views on Portfolio Margining Additional Subjects and Evidence," European Association of CCP Clearing Houses (EACH), Mar. 2016, pp. 1-11.
Embrechts, Paul, et al., "An Academic Response to Basel 3.5, " Risks, 2014, pp. 1-48.
Gatheral, Jim, et al., "Arbitrage-Free SVI Volatility Surfaces," arXiv: 1204.064d6v4 [q-fin.PR], Mar. 22, 2013, pp. 1-27.
Glosten, Lawrence, R., et al., "On the Relation between the Expected Value and the Volatility of the Nominal Excess Return on Stocks," Wiley-Blackwell American Finance Association, The Journal of Finance, vol. 48, No. 5, Dec. 1993, pp. 1779-1801.
Poon, Ser-Huang, et al., "Practical Issues in Forecasting Volatility," Financial Analysis Journal, vol. 61, No. 1, Jan./Feb. 2005, pp. 45-56.
Gurrola-Perez, Pedro, et al., "Working Paper No. 525 Filtered Historical Simulation Value-at-Risk Models and their Competitors," Bank of England, Mar. 2015, pp. 1-30.
Hull, John, et al., "Incorporating Volatility Updating into the Historical Simulation Method for Value at Risk," Oct. 1998, pp. 1-19.
Benos, Evangelos, et al., "Managing Market Liquidity Risk in Central Counterparties," Risk Journals, Journal of Financial Market Infrastructures 5(4), pp. 105-125.
Basel Committee on Banking Supervision, Standards, "Minimum Capital Requirements for Market Risk," Bank for International Settlements, Jan. 2016, 92 pages.
Christoffersen, Peter F., "Evaluating Interval Forecasts," International Economic Review, vol. 39, No. 4, Symposium on Forecasting and Empirical Methods in Macroeconomics and Finance, Nov. 1998, pp. 841-862.
Ivanov, Stanislav, et al., "Dynamic Forecasting of Portfolio Risk," Presented at the CRSP Forum 2006, pp. 1-44.
"RiskMetrics™—Technical Document," J.P. Morgan/Reuters, Fourth Edition, Dec. 17, 1996, p. 1-284.
Murphy, David, et al., "An Investigation into the Procyclicality of Risk-Based Initial Margin Models," Bank of England, Financial Stability Paper No. 29, May 2014, pp. 1-18.
Murphy, David, et al., "A Comparative Analysis of Tools to Limit the Procyclicality of Initial Margin Requirements," Bank of England, Staff Working Paper No. 597, Apr. 2016, pp. 1-26.
Rab, Nikolaus, et al., "Scaling Portfolio Volatility and Calculating Risk Contributions in the Presence of Serial Cross-Correlations," arXiv: 1009.3638v3 [q-fin.RM], Nov. 29, 2011, pp. 1-26.
Sewell, Martin, "Characterization of Financial Time Series," UCL Department of Computer Science, Jan. 20, 2011, pp. 1-35.
Boudoukh, Jacob, et al., "The Best of Both Worlds: A Hybrid Approach to Calculating Value at Risk," 1997, pp. 1-13.
Extended European Search Report dated Apr. 28, 2020 of counterpart European Application No. 20156886.2.
Canadian Official Action dated Jan. 15, 2021, of counterpart Canadian Application No. 3,071,311.
ProQuestDialogNPL Search History, Jun. 30, 2021.
"Regulation 40.10(a) Submission—Adoption of a New Framework for Initial Margin Calculations," CME Submission19-213 to Commodities Futures Trading Commission, May 28, 2019.
Canadian Official Action dated May 19, 2022, of counterpart Canadian Application No. 3,071,311.
European Official Action dated Oct. 2, 2023, of counterpart European Application No. 20 156 886.2.

* cited by examiner

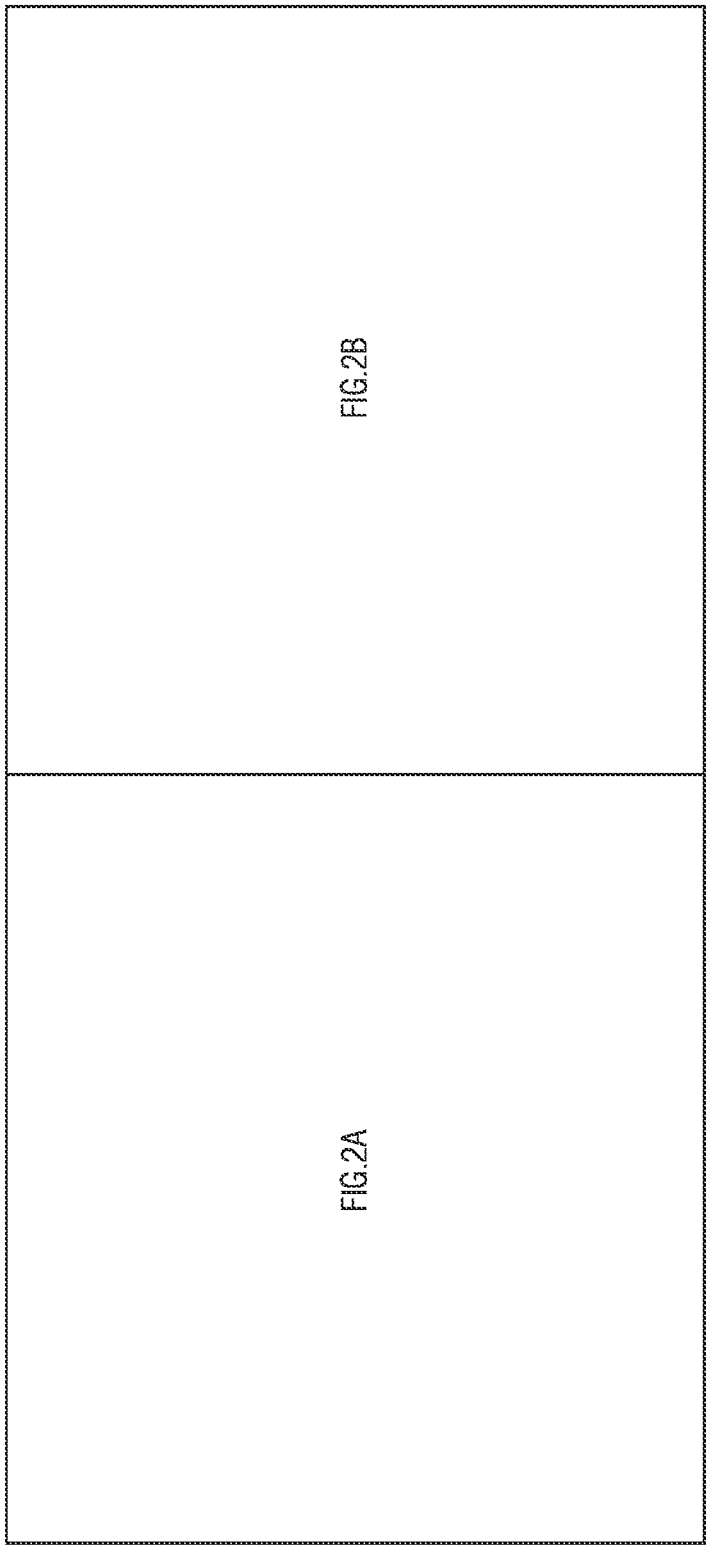

SYSTEMS AND METHODS FOR DETERMINING AN INITIAL MARGIN

CROSS-REFERENCE TO RELATED APPLICATIONS

This application is a continuation of Ser. No. 17/530,591 filed Nov. 19, 2021, which is a continuation of Ser. No. 17/221,052 filed Apr. 2, 2021 (now U.S. Pat. No. 11,216, 886), which is a continuation of Ser. No. 17/104,403 filed Nov. 25, 2020 (now U.S. Pat. No. 11,023,978), which is a continuation of Ser. No. 16/775,970 filed Jan. 29, 2020 (now U.S. Pat. No. 10,922,755), which is a continuation-in-part of U.S. application Ser. No. 16/046,190 filed Jul. 26, 2018 (now U.S. Pat. No. 10,817,947), which is a continuation of U.S. application Ser. No. 14/303,941 filed Jun. 13, 2014 (now U.S. Pat. No. 10,102,581), which claims the benefit of U.S. Application Ser. No. 61/835,711 filed Jun. 17, 2013, the entire contents of each of which are incorporated herein by reference.

TECHNICAL FIELD

This disclosure relates generally to financial products, methods and systems, and more particularly to systems and methods for collateralizing risk of financial products.

BACKGROUND

Conventional clearinghouses collect collateral in the form of an "initial margin" ("IM") to offset counterparty credit risk (i.e., risk associated with having to liquidate a position if one counterparty of a transaction defaults). In order to determine how much IM to collect, conventional systems utilize a linear analysis approach for modeling the risk. This approach, however, is designed for financial products, such as equities and futures, that are themselves linear in nature (i.e., the products have a linear profit/loss scale of 1:1). As a result, it is not well suited for more complex financial products, such as options, volatile commodities (e.g., power), spread contracts, non-linear exotic products or any other financial products having non-linear profit/loss scales. In the case of options, for example, the underlying product and the option itself moves in a non-linear fashion, thereby resulting in an exponential profit/loss scale. Thus, subjecting options (or any other complex, non-linear financial products) to a linear analysis will inevitably lead to inaccurate IM determinations.

Moreover, conventional systems fail to consider diversification or correlations between financial products in a portfolio when determining an IM for the entire portfolio. Instead, conventional systems simply analyze each product in a portfolio individually, with no consideration for diversification of product correlations.

Accordingly, there is a need for a system and method that efficiently and accurately calculates IM for both linear and non-linear products, and that considers diversification and product correlations when determining IM for a portfolio of products.

SUMMARY

The present disclosure relates to systems and methods of collateralizing counterparty credit risk for at least one financial product or financial portfolio comprising mapping at least one financial product to at least one risk factor, executing a risk factor simulation process comprising a filtered historical simulation process, generating product or portfolio profit and loss values and determining an initial margin for the financial product or portfolio.

The present disclosure also relates to systems, methods and non-transitory computer-readable mediums for efficiently modeling datasets. A system includes at least one computing device comprising memory and at least one processor. The memory stores a margin model and a liquidity risk charge (LRC) model. The processor executes computer-readable instructions that cause the system to: receive, as input, data defining risk factor data and additional data associated with at least one financial portfolio, where the at least one financial portfolio comprises at least one financial product and one or more currencies. The instructions also cause the system to execute the margin model, causing the margin model to execute a risk factor simulation process involving the received risk factor data. The risk factor simulation process comprises a filtered historical simulation process. The instructions also cause the system to generate, by the margin model, portfolio profit and loss values for the at least one financial portfolio based on output from the risk factor simulation process; and determine an initial margin for the at least one financial portfolio based on the portfolio profit and loss values. The instructions also cause the system to execute the LRC model, causing the LRC model to determine a portfolio level liquidity risk for the at least one financial portfolio, based on the additional data and portfolio profit and loss data from the margin model. The LRC model determines the liquidity risk based on one or more equivalent portfolio representations of the at least one portfolio.

BRIEF DESCRIPTION OF THE DRAWINGS

The foregoing summary and following detailed description may be better understood when read in conjunction with the appended drawings. Exemplary embodiments are shown in the drawings, however, it should be understood that the exemplary embodiments are not limited to the specific methods and instrumentalities depicted therein. In the drawings:

FIGS. 2, 2A and 2B, collectively "FIG. 2," show an exemplary diagram showing various data elements and functions of an exemplary system according to the present disclosure.

DETAILED DESCRIPTION

Introduction

Figure 1:
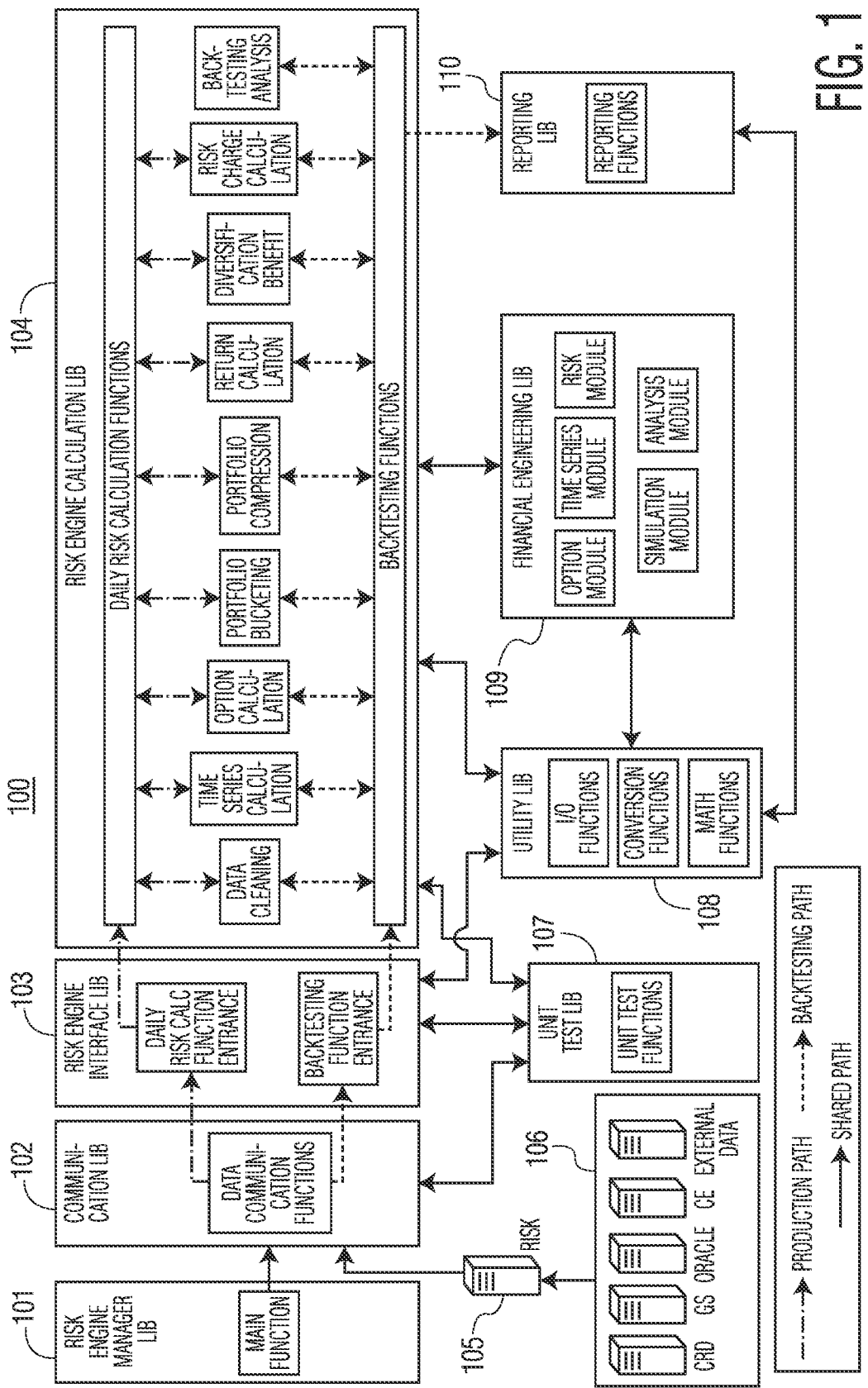
FIG. 1 shows an exemplary risk engine architecture.

The present disclosure relates generally to systems and methods for efficiently and accurately collateralizing counterparty credit risk. Notably, the systems and methods described herein are effective for use in connection with all types of financial products (e.g., linear and non-linear, complex), and with portfolios of financial products, whether fully or partially diversified.

As indicated above, conventional systems utilize a linear analysis approach for modeling risk of all types of financial products, including those financial products that are not themselves linear in nature. Moreover, conventional systems fail to consider diversification or correlations between financial products in a portfolio when determining an initial margin ("IM") for the entire portfolio. As will be appreciated, diversification and product correlations within a portfolio can offset some of the overall risk of the portfolio, thereby reducing the IM that needs to be collected.

The systems and methods described herein address the foregoing deficiencies (as well as others) by providing new systems and methods that efficiently and accurately calculate IMs for both linear and non-linear products, and that consider diversification and product correlations when determining IM for a portfolio of products.

In one aspect, the present disclosure relates to a novel multi-asset portfolio simulation system and method (also referred to herein as ICE Risk Model (IRM) system or margin model system). IRM, in one embodiment, utilizes a unique technique for determining IM that includes (without limitation) decomposing products (e.g., complex non-linear products) into their respective individual components, and then mathematically modeling the components to assess a risk of each component. For purposes of this disclosure, "decomposing" may be considered a mapping of a particular financial product to the components or factors that drive that product's profitability (or loss). This mapping may include, for example, identifying those components or factors that drive a financial product's profitability (or loss). A "component" or "factor" (or "risk factor") may therefore refer to a value, rate, yield, underlying product or any other parameter or object that may affect, negatively or positively, a financial product's profitability.

Once the components (or factors) are mathematically modeled, a second mapping (in the reverse direction) may be executed in which the components (or factors) are then reassembled. In the context of this disclosure, "reassembling" components of a financial product may be considered an aggregation of the results of the modeling procedure summarized above.

After the components (or factors) of the financial product are reassembled, the entire product may be processed through a filtered historical simulation (FHS) process to determine an IM (or a 'margin rate') for the financial product.

For purposes of this disclosure, the term "product" or "financial product" should be broadly construed to comprise any type of financial instrument including, without limitation, commodities, derivatives, shares, bonds, and currencies. Derivatives, for example, should also be broadly construed to comprise (without limitation) any type of options, caps, floors, collars, structured debt obligations and deposits, swaps, futures, forwards, and various combinations thereof.

A similar approach may be taken for a portfolio of financial products (i.e., a financial portfolio). Indeed, a financial portfolio may be broken down into its individual financial products, and the individual financial products may each be decomposed into their respective components (or factors). Each component (or factor) may then be mathematically modeled to determine a risk associated with each component (or factor), reassembled to its respective financial product, and the financial products may then be reassembled to form the financial portfolio. The entire portfolio may then be processed through an FHS process to determine an overall margin rate for the financial portfolio as a whole.

In addition, any correlations between the financial products or pertinent product hierarchy within the financial portfolio may be considered and taken into account to determine an IM (or a margin rate) for the financial portfolio. This may be accomplished, for example, by identifying implicit and explicit relationships between all financial products in the financial portfolio, and then accounting (e.g., offsetting risk) for the relationships where appropriate.

As will be evident from the foregoing, the present disclosure relates to a top-down approach for determining IM that determines and offsets product risk where appropriate. As a result, the systems and methods described herein are able to provide a greater level of precision and accuracy when determining IM. In addition, this top-down approach facilitates the ability to compute an IM on a fully diversified level or at any desired percentage level.

Systems and methods of the present disclosure may include and/or be implemented by one or more computers or computing devices. For purposes of this disclosure, a "computer" or "computing device" (these terms may be used interchangeably) may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components.

Exemplary (non-limiting) examples of computers include any type of server (e.g., network server), a processor, a microprocessor, a personal computer (PC) (e.g., a laptop computer), a palm PC, a desktop computer, a workstation computer, a tablet, a mainframe computer, an electronic wired or wireless communications device such as a telephone, a cellular telephone, a personal digital assistant, a voice over Internet protocol (VOIP) phone or a smartphone, an interactive television (e.g., a television adapted to be connected to the Internet or an electronic device adapted for use with a television), an electronic pager or any other computing and/or communication device.

Computers may be linked to one another via a network or networks and/or via wired or wired communications link(s). A "network" may be any plurality of completely or partially interconnected computers wherein some or all of the computers are able to communicate with one another. The connections between computers may be wired in some cases (i.e. via wired TCP connection or other wired connection) or may be wireless (i.e. via WiFi network connection). Any connection through which at least two computers may exchange data can be the basis of a network. Furthermore, separate networks may be interconnected such that one or more computers within one network may communicate with one or more computers in another network. In such a case, the plurality of separate networks may optionally be considered to be a single network.

Terms and Concepts

The following terms and concepts may be used to better understand the features and functions of systems and methods according to the present disclosure:

Account refers to a topmost level within a customer portfolio in the margin account hierarchy (discussed below) where a final margin is reported; the Account is made up of Sectors (discussed below).

Backfilling See Synthetic Price Service (defined below).

Backtesting refers to a normal statistical framework that consists of verifying that actual losses are in line with projected losses. This involves systematically comparing the history of VaR (defined below) forecasts with their associated portfolio returns. Three exemplary backtests may be used to measure the performance of margining according to the present disclosure: Basel Traffic Light, Kupiec, and Christofferson Tests.

Basel Traffic Light Test refers to a form of backtesting which tests if the margin model has too many margin breaches.

Bootstrapping See Correlation Matrix Joint Distribution (defined below).

Christoffersen Test refers to a form of backtesting which tests if the margin model has too many or too few margin breaches and whether the margin breaches were realized on consecutive days.

Cleaned Data See Synthetic Data (defined below).

Cleaned Historical Dynamic Data (CHDD) refers to a process to clean the raw time series data and store the processed financial time series data to be fed into a margin model as input.

Conditional Coverage relates to backtesting and takes into account the time in which an exceptions occur. The Christoffersen test is an example of conditional coverage.

Confidence Interval defines the percentage of time that an entity (e.g., exchange firm) should not lose more than the VaR amount.

Contingency Group (CG) refers to collections of products that have direct pricing implications on one another; for instance, an option on a future and the corresponding future. An example of a CG is Brent={B, BUL, BRZ, BRM, . . . }, i.e., everything that ultimately refers to Brent crude as an underlying for derivative contracts.

Contract refers to any financial instrument (i.e., any financial product) which trades on a financial exchange and/or is cleared at a clearinghouse. A contract may have a PCC (physical commodity code), a strip date (which is closely related to expiry date), a pricing type (Futures, Daily, Avg., etc.), and so on.

Correlation Matrix Joint Distribution refers to a Synthetic Price Service (defined below) approach which builds a correlation matrix using available time series on existing contracts which have sufficient historical data (e.g., 1,500 days). Once a user-defined correlation value is set between a target series (i.e., the product which needs to be backfilled) and one of an existing series with sufficient historical data, synthetic returns for the target can be generated based on the correlation.

Coverage Ratio refers to a ratio comparing Risk Charge (defined below) to a portfolio value. This ration may be equal to the margin generated for the current risk charge day divided by the latest available portfolio value.

DB Steering refers to an ability to manually or systematically set values in a pricing model without creating an offset between two positions. This may be applicable to certain instruments that are not correlated or fully correlated both statistically and logically (e.g., Sugar and Power).

Diversification Benefit (DB) refers to a theoretical reduction in risk a financial portfolio achieved by increasing the breadth of exposures to market risks over the risk to a single exposure.

Diversification Benefit (DB) Coefficient refers to a number between 0 and 1 that indicates the amount of diversification benefit allowed for the customer to receive. Conceptually, a diversification benefit coefficient of zero may correspond to the sum of the margins for the sub-portfolios, while a diversification benefit coefficient of 1 may correspond to the margin calculated on the full portfolio.

Diversification Benefit (DB) Haircut refers to the amount of the diversification benefit charged to a customer or user, representing a reduction in diversification benefit.

Dynamic VaR refers to the VaR of a portfolio assuming that the portfolio's exposure is constant through time.

Empirical Characteristic Function Distribution Fitting (ECF) refers to a backfilling approach which fits a distribution to a series of returns and calculates certain parameters (e.g., stability $\alpha$, scale $\sigma$, skewness $\beta$, and location $\mu$) in order to generate synthetic returns for any gaps such that they fall within the same calculated distribution.

Enhanced Historical Simulation Portfolio Margining (EHSPM) refers to a VaR risk model which scales historical returns to reflect current market volatility using EWMA (defined below) for the volatility forecast. Risk Charges are aggregated according to Diversification Benefits.

Estimated Weighted Moving Average (EWMA) is used to place emphasis on more recent events versus past events while remembering passed events with decreasing weight.

Exceedance may be referred to as margin breach in backtesting and may be identified when Variation Margin is greater than a previous day's Initial Margin.

Exponentially Weighted Moving Average (EWMA) refers to a model used to take a weighted average estimation of returns.

Filtered Data refers to option implied volatility surfaces truncated at (e.g., seven) delta points.

Fixed Expiry refers to a fixed contract expiration date. As time progresses, the contract will move closer to its expiry date (i.e., time to maturity is decaying). For each historical day, settlement data which share the same contract expiration date may be obtained to form a time series, and then historical simulation may be performed on that series.

Haircut refers to a reduction in the diversification benefit, represented as a charge to a customer.

Haircut Contribution refers to a contribution to the diversification haircut for each pair at each level.

Haircut Weight refers to the percentage of the margin offset contribution that will be haircut at each level.

Historical VaR uses historical data of actual price movements to determine the actual portfolio distribution.

Holding Period refers to a discretionary value representing the time horizon analyzed, or length of time determined to be required to hold assets in a portfolio.

Implied Volatility Dynamics refers to a process to compute the scaled implied volatilities using the Sticky-Delta or Sticky-Strike method (defined below). It may model the implied volatility curve as seven points on the curve.

Incremental VaR refers to the change in Risk of a portfolio given a small trade. This may be calculated by using the marginal VaR times the change in position.

Independence In backtesting, Independence takes into account when an exceedance or breach occurs.

Initial Margin (IM) refers to an amount of collateral that a holder of a particular financial product (or financial portfolio) must deposit to cover for default risk.

Input Data refers to Raw data that is filtered into cleaned financial time series. The cleaned time series may be input into a historical simulation. New products or products without a sufficient length of time series data have proxy time series created.

Kupiec Test refers to a process for testing, in the context of backtesting, which tests if a margin model has too many or too few margin breaches.

Instrument Correlation refers to a gain in one instrument that offsets a loss in another instrument on a given day. At a portfolio level, for X days of history (e.g.), a daily profit and loss may be calculated and then ranked.

Margin Attribution Report defines how much of a customer's initial margin charge was from active trading versus changes in the market. In a portfolio VaR model, one implication is that customers' initial margin calculation will not be a sub-process of the VaR calculation.

Margin Offset Contribution refers to the diversification benefit of a financial products to a portfolio (e.g., the offset contribution of combining certain financial products into the same portfolio versus margining the financial products separately).

Margin Testing—Risk Charge testing may be done to assess how a risk model performs on a given portfolio or financial product. The performance tests may be run on-demand and/or as a separate process, distinct from the production initial margin process. Backtesting may be done on a daily, weekly, or monthly interval (or over any period). Statistical and regulatory tests may be performed on each model backtest. Margin Tests include (without limit) the Basel Traffic light, Kupiec, and Christofferson test.

Marginal VaR refers to the proportion of the total risk to each Risk Factor. This provides information about the relative risk contribution from different factors to the systematic risk. The sum of the marginal VaRs is equal to the systematic VaR.

Offset refers to a decrease in margin due to portfolio diversification benefits.

Offset Ratio refers to a ratio of total portfolio diversification benefit to the sum of pairwise diversification benefits. This ratio forces the total haircut to be no greater than the sum of offsets at each level so that the customer is never charged more than the offset.

Option Pricing refers to options that are repriced using the scaled underlying and implied volatility data.

Option Pricing Library—Since underlying prices and option implied volatilities are scaled separately in the IRM option risk charge calculation process, an option pricing library may be utilized to calculate the option prices from scaled underlying prices and implied volatilities. The sticky Delta technique may also utilize conversions between option strike and delta, which may be achieved within the option pricing library.

Overnight Index Swap (OIS) refers to an interest rate swap involving an overnight rate being exchanged for a fixed interest rate. An overnight index swap uses an overnight rate index, such as the Federal Funds Rate, for example, as the underlying for its floating leg, while the fixed leg would be set at an assumed rate.

Portfolio Bucketing refers to a grouping of clearing member's portfolios (or dividing clearing member's account) in a certain way such that the risk exposure of the clearinghouse can be evaluated at a finer grain. Portfolios are represented as a hierarchy from the clearing member to the instrument level. Portfolio bucketing may be configurable to handle multiple hierarchies.

Portfolio Compression refers to a process of mapping a portfolio to an economically identical portfolio with a minimal set of positions. The process of portfolio compression only includes simple arithmetic to simplify the set of positions in a portfolio.

Portfolio Risk Aggregation refers to the aggregated risk charge for each portfolio level from bottom-up.

Portfolio Risk Attribution refers to the risk attribution for each portfolio from top-down.

Portfolio VaR refers to a confidence on a portfolio, where VaR is a risk measure for portfolios. As an example, VaR at a ninety-nine percent (99%) level may be used as the basis for margins.

Position In the Margin Account Hierarchy (discussed below), the position level is made up of distinct positions in the cleared contracts within a customer's account. Non-limiting examples of positions may include 100 lots in Brent Futures, −50 lots in Options on WTI futures, and −2,500 lots in AECO Basis Swaps.

Product as indicated above, a product (or financial product) may refer to any financial instrument. In fact, the terms product and instrument may be used interchangeably herein. In the context of a Margin Account Hierarchy, Products may refer to groups of physical or financial claims on a same (physical or financial) underlying. Non-limiting examples of Products in this context may include Brent Futures, Options on WTI futures, AECO Natural Gas Basis swaps, etc.

Raw Data refers to data which is obtained purely from trading activity recorded via a settlement process.

Raw Historical Dynamic Data (RHDD) refers to an ability to store historical financial time series for each unique identifier in the static data tables for each historical day (e.g., expiration date, underlying, price, implied volatility, moneyness, option Greeks, etc.).

Relative Expiry—As time progresses, a contract remains at the same distance to its expiry date and every point in the time series corresponds to different expiration dates. For each historical day, settlement data which share the same time to maturity may be used to form the time series.

Reporting refers to the reporting of margin and performance analytics at each portfolio hierarchy. A non-limiting example of a portfolio hierarchy grouping includes: Clearing Member, Clearing Member Client, Product type, Commodity type, instrument. Backtest reporting may be performed on regular intervals and/or on-demand.

Return Scaling refers to a process to compute and scale returns for each underlying instrument and implied volatility in the CHDD. Scaling may be done once settlement prices are in a clearing system.

Risk Aggregation refers to a process to aggregate risk charges from a sub-portfolio level to a portfolio level. This aggregation may be performed using the diversification benefits to offset.

Risk Attribution refers to a process to attribute contributions to the risk charges of portfolios to sub-portfolios.

Risk Charge refers to an Initial Margin applied to on the risk charge date.

Risk Charge Performance Measurement refer to the performance metrics that are calculated on each backtest, which can be performed at specified intervals and/or by request.

Risk Dashboard refers to a risk aggregation reporting tool (optionally implemented in a computing device and accessible via a Graphical User Interface (GUI)) for risk charges across all portfolio hierarchies. The Risk Dashboard may be configured to provides the ability to drill down into detailed analysis and reports across the portfolio hierarchies.

Risk Factors—As indicated above, a Risk Factor may refer to any value, rate, yield, underlying product or any other parameter or object that may affect, negatively or positively, a financial product's profitability. Linear instruments may themselves be a risk factor. For each option product, the underlying instrument for every option expiry may be a risk factor. Seven (7) points on the implied volatility curve for every option expiry may also be risk factors.

Sector refers to a level of the Margin Account Hierarchy containing contingency groups. Non-limiting examples of sectors include North American Power, North American Natural Gas, UK Natural Gas, European Emissions, etc.

Specific VaR refers to the Risk that is not captured by mapping a portfolio to risk factors.

Static VaR refers to the VaR of a portfolio assuming that the portfolio's positions are constant through time.

Sticky Delta Rule refers to a rule formulated under the assumption that implied volatility tends to "stick" to delta. The sticky delta rule may be used by quoting implied volatility with respect to delta. Having input a set of fixed deltas, for example, historical implied volatilities which come from pairing each delta to a unique option and matches each input delta with the option whose delta is closest to this input value may be obtained. This process results in an implied volatility surface.

Synthetic Data corresponds to any data which has required Synthetic Price Service to backfill prices or fill in gaps where data is lacking.

Synthetic Price Service, also referred to as Backfilling, refers to a process to logically simulate historical price data where it did not exist, with the goal of building a historical profit and loss simulation to submit into a VaR (Value at Risk) calculation. Non-limiting exemplary algorithms that may be utilized to generate synthetic prices include (without limitation): Empirical Characteristic Function Distribution Fitting (ECF) and Correlation Matrix Joint Distribution (e.g., Bootstrapping).

Systematic VaR refers to the Risk that is captured by mapping a portfolio to risk factors.

Time Series corresponds to any data which has required Synthetic Price Service to backfill prices or fill in gaps where data is lacking.

Total VaR refers to Systematic VaR plus Specific VaR.

Unconditional Coverage—In backtesting, these tests statistically examine the frequency of exceptions over some time interval. Basel Traffic Light and Kupiec can both be classified as non-limiting examples of unconditional coverage tests.

VaR (Value at Risk) refers to the maximum loss a portfolio is expected to incur over a particular time period with a specified probability.

Variation Margin (VM) refers to margin paid on a daily or intraday basis based on adverse price movements in contracts currently held in an account. VM may be computed based on the difference between daily settlement prices and the value of the instrument in a given portfolio.

Volatility Cap or Volatility Ceiling refers to an upper limit on how high a current backtesting day's forecasted volatility is allowed to fluctuate with respect to a previous backtesting day. The Volatility Cap may be implemented by using a multiplier which defines this upper limit. A Volatility Cap may be used to prevent a system from posting a very high margin requirement due to a spike in market volatility.

Volatility Forecast refers to risk factor return volatility that is forecasted using an EWMA. The EWMA model may weight recent information more than past information which makes the risk factor return volatility more adaptive than a standard volatility estimate.

Yield Curve describes interest rates (cost of borrowing) plotted against time to maturity (term of borrowing) and is essential to pricing options.

Yield Curve Generator (YCG) refers to an algorithm which produces full Yield Curves by interpolating/extrapolating Overnight Index Swap (OIS) rates.

Overview

As noted above, the systems and methods of this disclosure provide a model for more efficiently and accurately determining initial margin. This new model (among other things) is able to scale linearly with the number of underlyings so that the introduction of new products or asset classes does not require an outsized amount of human interaction and ongoing maintenance. The model also allows control of diversification benefits at multiple levels in order to maintain a conservative bias, and may be explainable without large amounts of complex mathematics.

The present disclosure takes an empirical approach to the risk of portfolios of financial products. As further discussed below, historical simulation may be utilized (as part of the margin model) to minimize the amount of prescription embedded within the risk charge framework, which allows for a more phenomenological approach to risk pricing that ties the results back to realized market events. The aim has been to make the framework as simple as possible while retaining the core functionality needed.

Features of the model include (without limitation): utilizing a VaR as the risk measure; determining initial margin based on historical return; scaling market volatility of historical returns to reflect current market volatility; scaling each product in isolation and without considering the market volatility of all other assets; volatility forecasting based on EWMA; full revaluation across the historical period for every position; sticky delta evolution of an option implied volatility surface; modeling an implied volatility surface using delta points (e.g., seven points) on a curve; dynamic VaR over holding periods; aggregating risk charges according to diversification benefits; calculating diversification benefits (DBs) from historical data (DBs can be prescribed as well); performance analysis on sufficient capital coverage and model accuracy; as well as others that will be apparent based on the following descriptions.

The systems and methods of this disclosure may apply to any type of financial products and combinations thereof, including (without limitation): futures, forwards, swaps, 'vanilla' options (calls and puts), basic exercise (European and American), options (including options on first line swaps), fixed income products (e.g., swaps (IRS, CDS, Caps, Floors, Swaptions, Forward Starting, etc.)), dividend payments, exotic options (e.g., Asian Options, Barrier Options, Binaries, Lookbacks, etc.), exercise products (e.g., Bermudan, Canary, Shout, Swing, etc.).

The model of the present disclosure may, in an exemplary embodiment, operate under the following assumptions, although said model may be implemented under additional, alternative or fewer assumptions:

a. future volatility of financial returns may be estimated from the past volatility of financial returns;
b. future (forecasts) may be similar to past performance (e.g., volatility, correlations, credit events, stock splits, dividend payments, etc.);
c. EWMA may be utilized to estimate return volatility;
d. an EWMA decay factor (e.g., of 0.97) may be used to weight historical returns;
e. volatility scaling historical returns data to resemble more recent return volatility may be utilized to forecast future return volatility;
f. the volatility of individual underlying products may be adjusted individually;
g. portfolio exposures may be assumed constant over a holding period;
h. the model assumes accurate data is input;
i. disparity in local settlement time does not adversely impact the accuracy of the volatility forecast;
j. a 99% VaR for a 1,000 day return series can be accurately estimated;
k. option implied volatility surface dynamics are relative to the current underlying instrument's price level; and
l. full position valuation may be performed across historical windows of 1,000 days or more.

Types of information and data that may be utilized by the model may include (without limitation): financial instrument data (e.g., static data (instrument properties), dynamic data (prices, implied volatilities, etc.)), portfolios (composition, diversification benefits, etc.), risk model configurations (e.g., EWMA decay factor, VaR level, days of historical returns, etc.).

Components of a risk information system according to the present disclosure may include (without limitation): a financial instrument database (to store instrument properties, historical data, etc.), a data filter (to clean erroneous data, fill gaps in data, convert raw data into a time series, etc.), portfolio bucketing (to group portfolios by clearing member, client accounts, product, commodity, market type, etc.), portfolio compression (to net portfolios to a minimal set of positions, e.g., currency triangles, long and shorts on the same instrument, etc.), financial pricing library (e.g., option pricing, implied volatility dynamics, returns calculations, return scaling, etc.), currency conversion (e.g., converts returns to a common return currency for portfolios that contain positions in instruments with more than one settlement currency), risk library (to compute risk at the instrument level, compute risk at the portfolio levels, apply diversification benefits, etc.), performance analysis library (to perform backtests, compute performance measures, produce summary reports and analytics, etc.).

Turning now to FIG. 1, an exemplary risk engine architecture 100 is shown. This exemplary architecture 100 includes a risk engine manager library 101 that provides main functionality for the architecture 100 and a communication library 102 that provides data communication functionality. Components such as a risk server 105 and a cluster of one or more servers 106 may provide data and information to the communication library 102. Data and information from the communication library 102 may be provided to a risk engine interface library 103, which provides an 'entrance' (e.g., daily risk calculation entrance and backtesting functionality entrance) into the risk engine calculation library 104. The risk engine calculation library 104 may be configured to perform daily risk calculations and backtesting functions, as well as all sub-functions associated therewith (e.g., data cleaning, time series calculations, option calculations, etc.).

The exemplary architecture 100 also may include a unit test library 107, in communication with the communication library 102, risk engine interface library 103 and risk engine calculation library 104, to provide unit test functions. A utility library 108 may be provided in communication with both the risk engine interface library 103 and the risk engine calculation library 104 to provide in/out (I/O) functions, conversion functions and math functions.

A financial engineering library 109 may be in communication with the utility library 108 and the risk engine calculation library 104 to provide operations via modules such as an option module, time series module, risk module, simulation module, analysis module, etc.

A reporting library 110 may be provided to receive data and information from the risk engine calculation library 104 and to communicate with the utility library 108 to provide reporting functions.

Notably, the various libraries, modules and functions described above in connection with the exemplary architecture 100 of FIG. 1 may comprise software components (e.g. computer-readable instructions) embodied on one or more computing devices (co-located or across various locations, in communication via wired and/or wireless communications links), where said computer-readable instructions are executed by one or more processing devices to achieve and provide their respective functions.

Figure 2A:
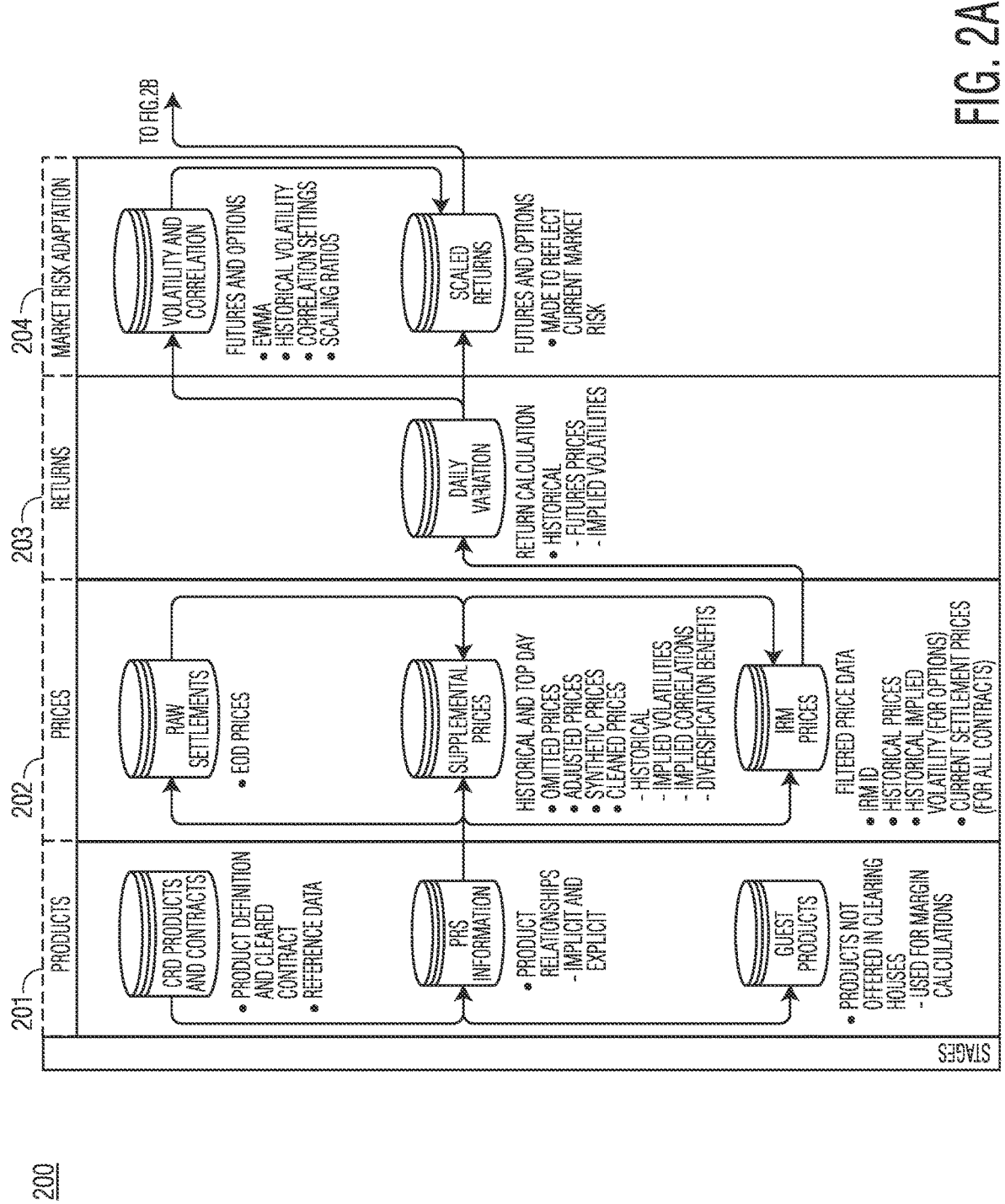
Figure 2B:
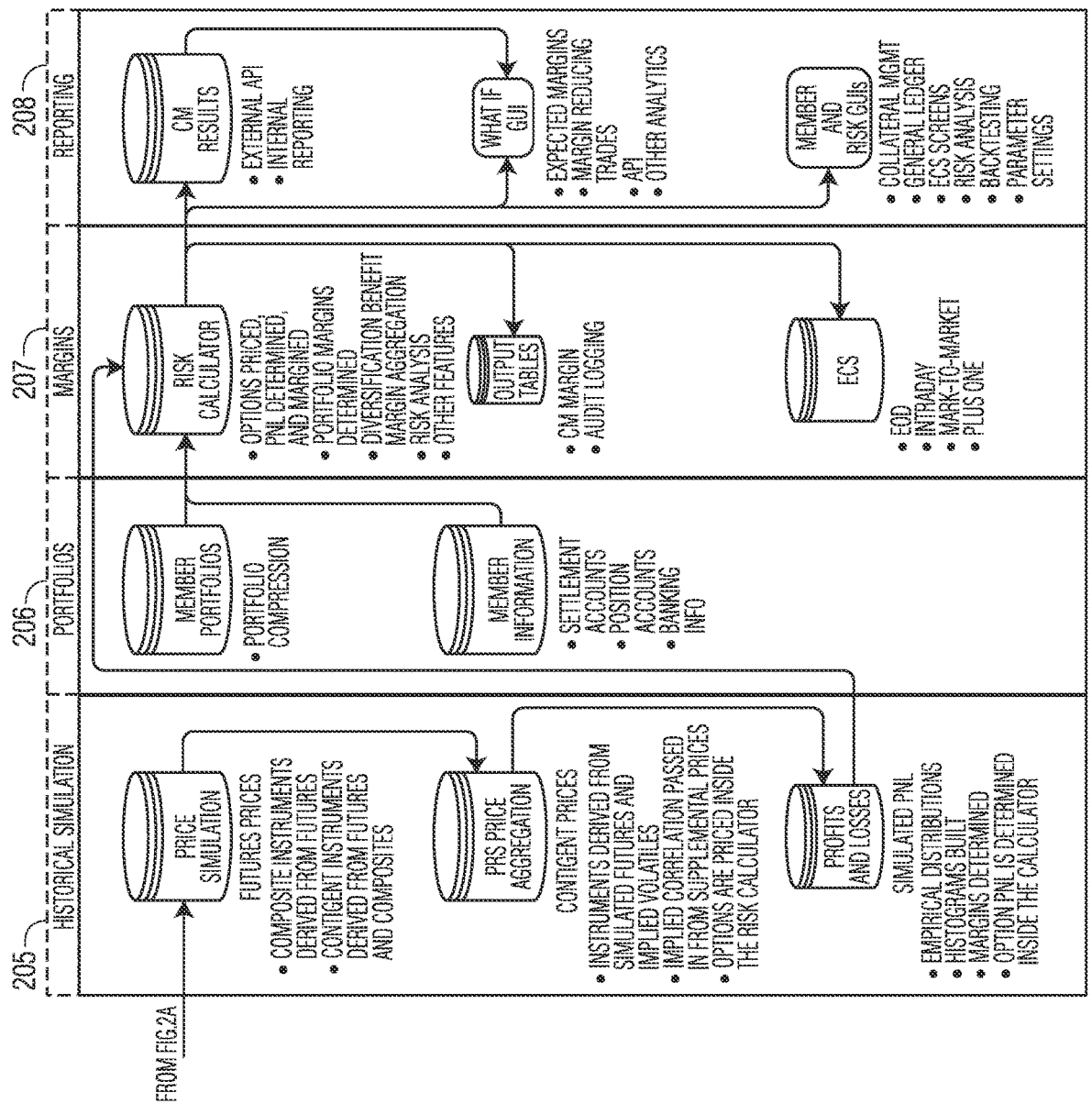

Turning now to FIGS. 2, 2A and 2B, collectively referred to as "FIG. 2" hereafter, an exemplary diagram 200 showing the various data elements and functions of an exemplary IRM system according to the present disclosure is shown. More particularly, the diagram 200 shows the data elements and functions provided in connection with products 201, prices 202, returns 203, market risk adaptation 204, historical simulation 205, portfolios 206, margins 207 and reporting 208, and their respective interactions. These data components and functions may be provided in connection with (e.g., the components may be embodied on) system elements such as databases, processors, computer-readable instructions, computing devices (e.g., servers) and the like.

An exemplary computer-implemented method of collateralizing counterparty credit risk in connection with one or more financial products may include receiving as input, by at least one computing device, data defining at least one financial product. The computing device may include one or more co-located computers, computers dispersed across various locations, and/or computers connected (e.g., in communication with one another) via a wired and/or wireless communications link(s). At least one of the computing devices comprises memory and at least one processor executing computer-readable instructions to perform the various steps described herein.

Upon receiving the financial product data, the exemplary method may include mapping, by computing device(s), the financial product(s) to at least one risk factor, where this mapping step may include identifying at least one risk factor that affects a profitability of the financial product(s).

Next, the method may include executing, by the computing device(s), a risk factor simulation process involving risk factor(s) previously identified. This risk factor simulation process may include retrieving, from a data source, historical pricing data for the one risk factor(s), determining statistical properties of the historical pricing data, identifying any co-dependencies between prices that exist within the historical pricing data and generating, as output, normalized historical pricing data based on the statistical properties and co-dependencies.

The risk factor simulation process may also include a filtered historical simulation process, which may itself include a co-variance scaled filtered historical simulation that involves normalizing the historical pricing data to resemble current market volatility by applying a scaling factor to said historical pricing data. This scaling factor may reflect the statistical properties and co-dependencies of the historical pricing data.

Following the risk factor simulation process, the exemplary method may include generating, by the computing device(s), product profit and loss values for the financial product(s) based on output from the risk factor simulation process. These profit and loss values may be generated by calculating, via a pricing model embodied in the computing device(s), one or more forecasted prices for the financial product(s) based on the normalized historical pricing data input into the pricing model, and comparing each of the forecasted prices to a current settlement price of the financial product(s) to determine a product profit or loss value associated with each of said forecasted prices.

Next, the computing device(s) may determine an initial margin for the financial product(s) based on the product profit and loss values, which may include sorting the product profit and loss values, most profitable to least profitable or vice versa and selecting the product profit or loss value among the sorted values according to a predetermined confidence level, where the selected product profit or loss value represents said initial margin.

In one exemplary embodiment, the historical pricing data may include pricing data for each risk factor over a period of at least one-thousand (1,000) days. In this case, the foregoing method may involve: calculating, via the pricing model, one-thousand forecasted prices, each based on the normalized pricing data pertaining to a respective one of the one-thousand days; determining a product profit or loss value associated with each of the one-thousand forecasted prices by comparing each of the one-thousand forecasted prices to a current settlement price of the at least one financial product; sorting the product profit and loss values associated with each of the one-thousand forecasted prices from most profitable to least profitable or vice versa; and identifying a tenth least profitable product profit or loss value. This tenth least profitable product profit or loss value may represent the initial margin at a ninety-nine percent confidence level.

An exemplary computer-implemented method of collateralizing counterparty credit risk in connection with a financial portfolio may include receiving as input, by one or more computing device(s), data defining at least one financial portfolio. The financial portfolio(s) may itself include one or more financial product(s). As with the exemplary method discussed above, the computing device(s) used to implement this exemplary method may include one or more co-located computers, computers dispersed across various locations, and/or computers connected (e.g., in communication with one another) via a wired and/or wireless communications link(s). At least one of the computing devices comprises memory and at least one processor executing computer-readable instructions to perform the various steps described herein.

Upon receiving the financial portfolio data, the exemplary method may include mapping, by the computing device(s), at least one financial product in the portfolio to at least one risk factor by identifying at least one risk factor that affects a probability of said financial product(s).

Next, the computing device(s) may execute a risk factor simulation process involving the risk factor(s). This risk factor simulation process may include retrieving, from a data source, historical pricing data for the risk factor(s) and determining statistical properties of the historical pricing data. Then, any co-dependencies between prices that exist within the historical pricing data may be identified, and a normalized historical pricing data may be generated based on the statistical properties and the co-dependencies.

The risk factor simulation process may further include a filtered historical simulation process. This filtered historical simulation process may include a co-variance scaled filtered historical simulation that involves normalizing the historical pricing data to resemble current market volatility by applying a scaling factor to the historical data. This scaling factor may reflect the statistical properties and co-dependencies of the historical pricing data.

Following the risk factor simulation process, the exemplary method may include generating, by the computing device(s), product profit and loss values for the financial product(s) based on output from the risk factor simulation process. Generating these profit and loss values may include calculating, via a pricing model embodied in the computing device(s), one or more forecasted prices for the financial product(s) based on the normalized historical pricing data input into said pricing model; and comparing each of the forecasted prices to a current settlement price of the at financial product(s) to determine a product profit or loss value associated with each of said forecasted prices.

The profit and loss values of the respective product(s) may then be aggregated to generate profit and loss values for the overall financial portfolio(s). These portfolio profit and loss values may then be used to determine an initial margin for the financial portfolio(s). In one embodiment, the initial margin determination may include sorting the portfolio profit and loss values, most profitable to least profitable or vice versa; and then selecting the portfolio profit or loss value among the sorted values according to a predetermined confidence level. The selected portfolio profit or loss value may represent the initial margin.

In one exemplary embodiment, the historical pricing data may include pricing data for each risk factor over a period of at least one-thousand (1,000) days and the financial portfolio may include a plurality of financial products. In this case, the foregoing method may involve: calculating, via the pricing model, one-thousand forecasted prices for each of the plurality of financial products, where the forecasted prices are each based on the normalized pricing data pertaining to a respective one of the one-thousand days; determining one-thousand product profit or loss values for each of the plurality of financial products by comparing the forecasted prices associated each of the plurality of financial products to a respective current settlement price; determining one-thousand portfolio profit or loss values by aggregating a respective one of the one-thousand product profit or loss values from each of the plurality of financial products; sorting the portfolio profit and loss values from most profitable to least profitable or vice versa; and identifying a tenth least profitable portfolio profit or loss value. This tenth least profitable product profit or loss value may represent the initial margin at a ninety-nine percent confidence level.

An exemplary system configured for collateralizing counterparty credit risk in connection with one or more financial products and/or one or more financial portfolios may include one or more computing devices comprising one or more co-located computers, computers dispersed across various locations, and/or computers connected (e.g., in communication with one another) via a wired and/or wireless communications link(s). At least one of the computing devices comprises memory and at least one processor executing computer-readable instructions that cause the exemplary system to perform one or more of various steps described herein. For example, a system according to this disclosure may be configured to receive as input data defining at least one financial product; map the financial product(s) to at least one risk factor; execute a risk factor simulation process (and/or a filtered historical simulation process) involving the risk factor(s); generate product profit and loss values for the financial product(s) based on output from the risk factor simulation process; and determine an initial margin for the financial product(s) based on the product profit and loss values.

Another exemplary system according to this disclosure may include at least one computing device executing instructions that cause the system to receive as input data defining at least one financial portfolio that includes at least one financial product; map the financial product(s) to at least one risk factor; execute a risk factor simulation process (and/or a filtered historical simulation process) involving the risk factor(s); generate product profit and loss values for the financial product(s) based on output from the risk factor simulation process; generate portfolio profit and loss values for the financial portfolio based on the product profit and loss values; and determine an initial margin for the financial portfolio(s) based on the portfolio profit and loss values.

A more detailed description of features and aspects of the present disclosure are provided below.

Volatility Forecasting

A process for calculating forecasted prices may be referred to as volatility forecasting. This process involves creating "N" number of scenarios (generally set to 1,000 or any other desired number) corresponding to each risk factor of a financial product. The scenarios may be based on historical pricing data such that each scenario reflects pricing data of a particular day. For products such as futures contracts, for example, a risk factor for which scenarios may be created may include the volatility of the futures' price; and for options, underlying price volatility and the option's implied volatility may be risk factors. As indicated above, interest rate may be a further risk factor for which volatility forecasting scenarios may be created.

The result of this volatility forecasting process is to create N number of scenarios, or N forecasted prices, indicative of what could happen in the future based on historical pricing data, and then calculate the dollar value of a financial product or of a financial portfolio (based on a calculated dollar value for each product in the portfolio) based on the forecasted prices. The calculated dollar values (of a product or of a financial portfolio) can be arranged (e.g., best to worst or vice versa) to select the fifth percentile worst case scenario as the Value-at-Risk (VaR) number. Note here that any percentile can be chosen, including percentiles other than the first through fifth percentiles, for calculating risk. This VaR number may then be used to determine an initial margin (IM) for a product or financial portfolio.

In one embodiment, the methodology used to perform volatility forecasting as summarized above may be referred to as an "exponentially weighted moving average" or "EMWA" methodology. Inputs into this methodology may include a scaling factor ($\lambda$) that may be set by a programmed computer device and/or set by user Analyst, and price series data over "N" historical days (prior to a present day). For certain financial products (e.g., options), the input may also include implied volatility data corresponding to a number of delta points (e.g., seven) for each of the "N" historical days and underlying price data for each of the "N" historical days.

Outputs of this EMWA methodology may include a new simulated series of risk factors, using equations mentioned below.

For certain financial products such as futures, for example, the EMWA methodology may include:

1. Determining fix parameter values (N):

$$N = 1000, \lambda = .97 \qquad (1)$$

2. Gathering instrument price series ($F_t$):
   $F_t$, $F_{1000}$, $F_{999}$, ... $F_1$, where $F_{1000}$ is a current day's settlement price
3. Calculating Log returns $r_i$:

$$r_i = \log \frac{F_i}{F_{i-1}} \quad (2)$$

4. Calculating sample mean of returns $\hat{u}$:

$$\hat{u} = \frac{1}{N-1} \sum_{i=1}^{N-1} r_t \quad (3)$$

5. Calculating sample variance of returns $\hat{v}$:

$$\hat{v} = \frac{1}{N-2} \sum_{i=1}^{N-1} (r_i - \hat{u})^2 \quad (4)$$

6. Calculating EMWA scaled variance ($\hat{e}_1$), this may be the first step of generating a volatility forecast: A first iteration equation may use $\hat{v}$:

$$\hat{e}_j = (1-\lambda)*(r_j - \hat{u}) + \lambda*\hat{v} \quad (5)$$

then, a next iteration may proceed as:

$$\hat{e}_j = (1-\lambda)*(r_j - \hat{u}) + \lambda*\hat{e}_{j-1}, \quad (6)$$

where $\hat{e}_{j-1}$ refers to value from previous iteration
7. Calculating EMWA standardized log returns $Z_j$:

$$\hat{z}_j = \frac{(r_j - \hat{u}_j)}{\sqrt{\hat{e}_j}} \text{ or } \hat{z}_j = \frac{r_j}{\sqrt{\hat{e}_j}} \quad (7)$$

8. Calculating Volatility $\hat{\sigma}_j$:

$$\hat{\sigma}_j = \sqrt{\max(\hat{v}_j, \hat{e}_j)} \quad (8)$$

For other financial products, such as options for example, the EMWA methodology may include performing all of the steps discussed above in the context of futures (i.e., steps 1-8) for each underlying future price series and for the implied volatility pricing data corresponding to the delta points.

Implied Volatility Dynamics

When modeling risk for options, the "sticky delta rule" may be used in order to accurately forecast option implied volatility. The 'delta' in the sticky delta rule may refer to a sensitivity of an option's value to changes in its underlying's price. Thus, a risk model system or method according to this disclosure is able to pull implied volatilities for vanilla options and implied correlations for cal spread options (CSOs), for example, by tracking changes in option implied volatility in terms of delta.

Figure 3:
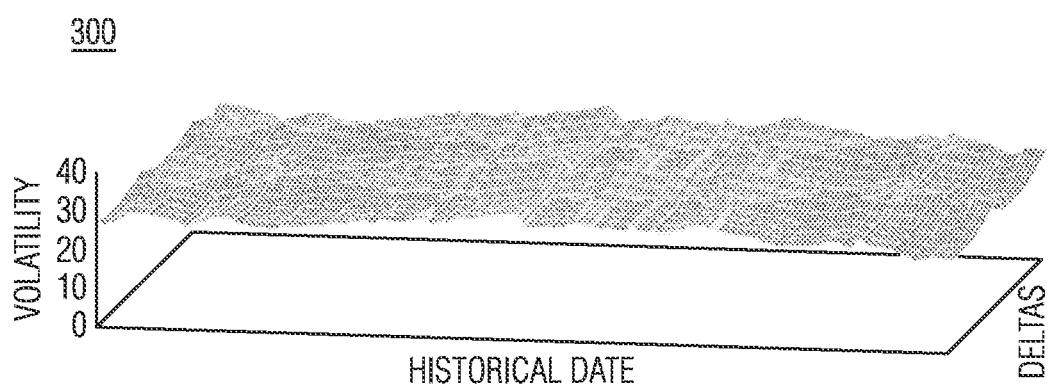
FIG. 3 shows an exemplary implied volatility to delta surface graph of an exemplary system according to the present disclosure.

More particularly, the sticky delta rule may be utilized by quoting implied volatility with respect to delta. Having input a set of fixed deltas, historical implied volatilities which come from pairing each delta to a unique option may be obtained. Each input delta may then be matched with the option whose delta is closest to this input value. The implied volatility for each of these options can then be associated with a fixed delta and for every day in history this process is repeated. Ultimately, this process builds an implied volatility surface using the implied volatility of these option-delta pairs. An exemplary implied volatility to delta surface 300 is shown in FIG. 3.

Using an implied volatility surface, the implied volatility of any respective option may be estimated. In particular, systems and methods according to this disclosure may perform a transformation from delta space to strike space for vanilla options in order to obtain a given option's implied volatility with respect to strike; for CSOs, strikes may be pulled as well. In other words, given any strike, the systems and method of this disclosure can obtain its implied volatility.

The sticky delta rule is formulated under the impression that implied volatility tends to "stick" to delta. Under this assumption, changes in implied volatility may be captured by tracking these "sticky deltas." The present disclosure uses these "sticky deltas" as anchors in implied volatility surfaces which are then transformed to strike space in order to quote a given option implied volatility.

Given inputs of implied volatilities of the "sticky deltas," implied volatility for any given option may be determined. For CSOs, for example, the delta to strike transformation may not be required, since implied correlation is used to estimate prices.

Figure 4:
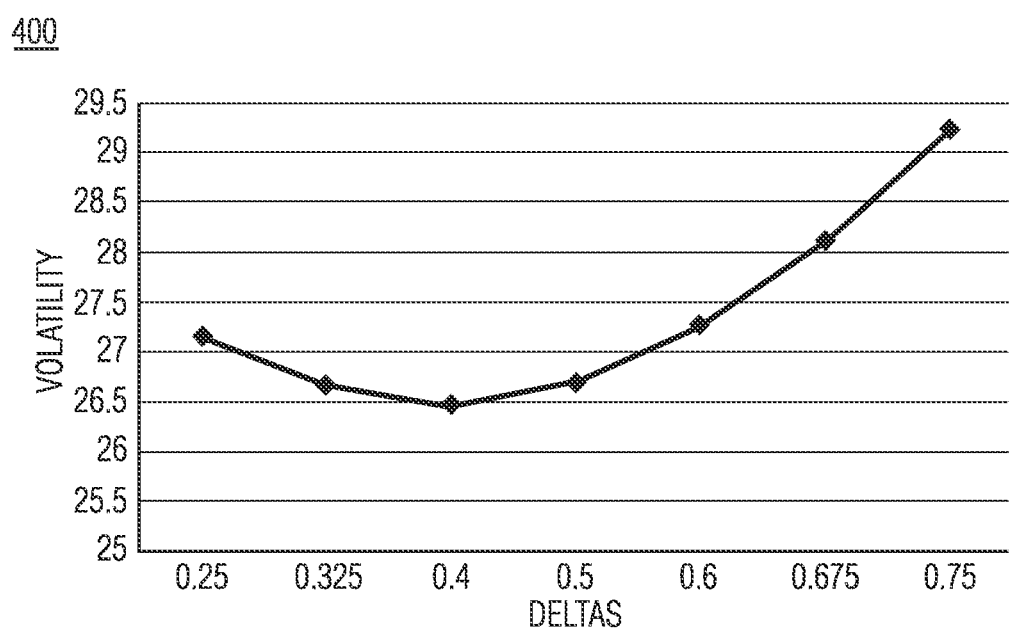
FIG. 4 shows a cross-section of the exemplary implied volatility of an exemplary system according to the present disclosure.

A delta surface may be constructed using fixed delta points (e.g., seven fixed delta points) and corresponding implied volatilities. Linear interpolation may be used to find the implied volatility of a delta between any two fixed deltas. In practice, the implied volatility surface may be interpolated after transforming from delta space to strike space. This way, the implied volatility for any strike may be obtained. A cross-section 400 of the exemplary implied volatility surface of FIG. 3 is shown in FIG. 4.

Figure 5:
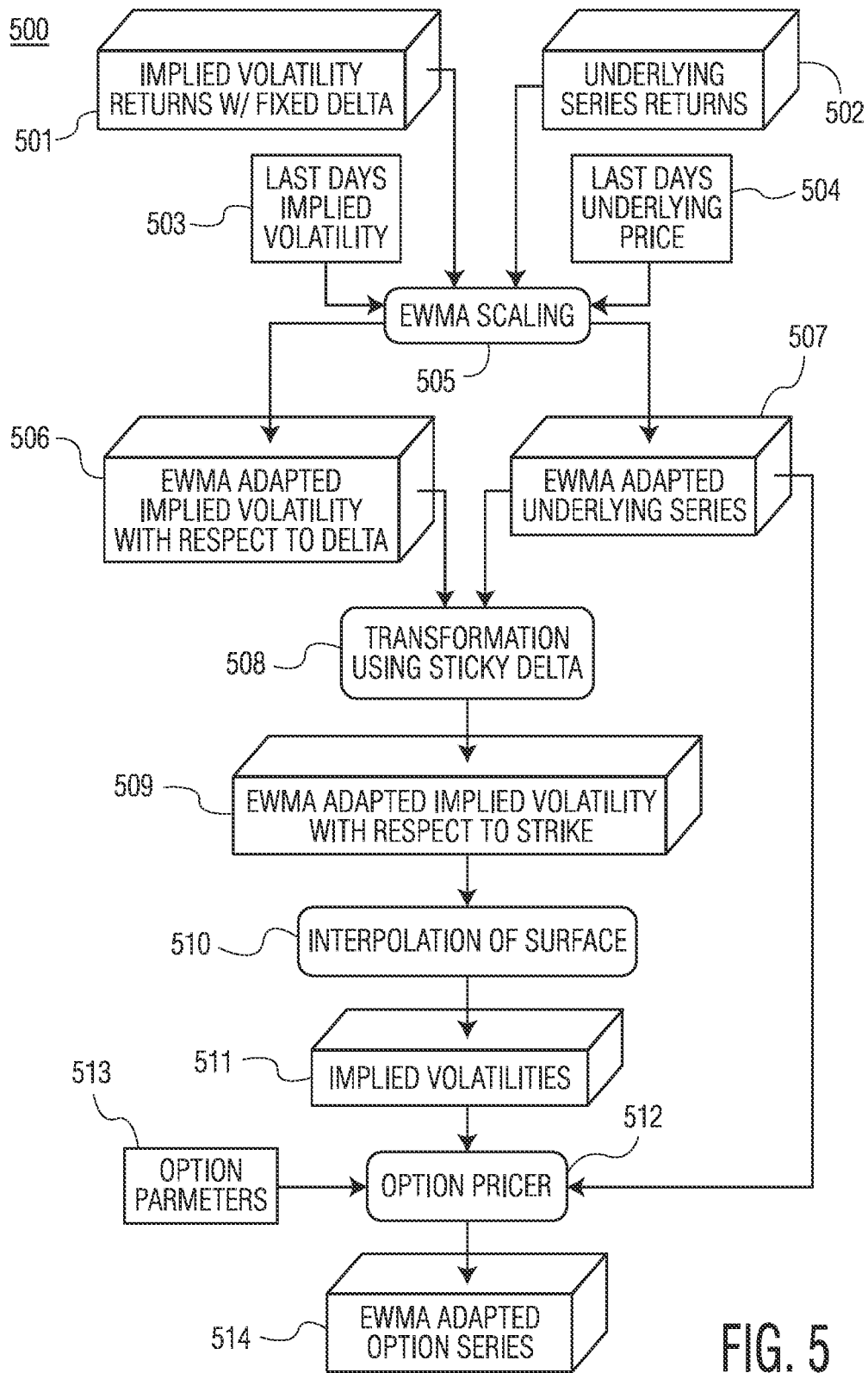
FIG. 5 shows an exemplary implied volatility data flow of an exemplary system according to the present disclosure.

FIG. 5 shows an exemplary implied volatility data flow 500, which illustrates how the EWMA scaling process 505 may utilize as few as one (or more) implied volatility 503 and one (or more) underlying price 504 to operate. This is the case, at least in part, because (historical) implied volatility returns 501 and underlying price series returns 502 are also inputs into the EWMA scaling process 505. EWMA scaling 505 is able to make these return series comparable in terms of a single input price 504 and a single implied volatility 503, respectively. In effect, EWMA scaling provides normalized or adapted implied volatilities 506 and underlying prices 507.

The adapted implied volatilities 506 and underlying prices 507 may then be used by a Sticky Delta transformation process 508 to yield adapted implied volatilities with respect to Strike 509. This may then be fed into an interpolation of surface process 510 to yield implied volatilities 511. The implied volatilities 511 as well as EWMA adapted underlying prices 507 may be utilized by an Option Pricer 512, together with option parameters 513 to yield an EWMA adapted option series 514.

Transformation of Delta to Strike

Figure 6:
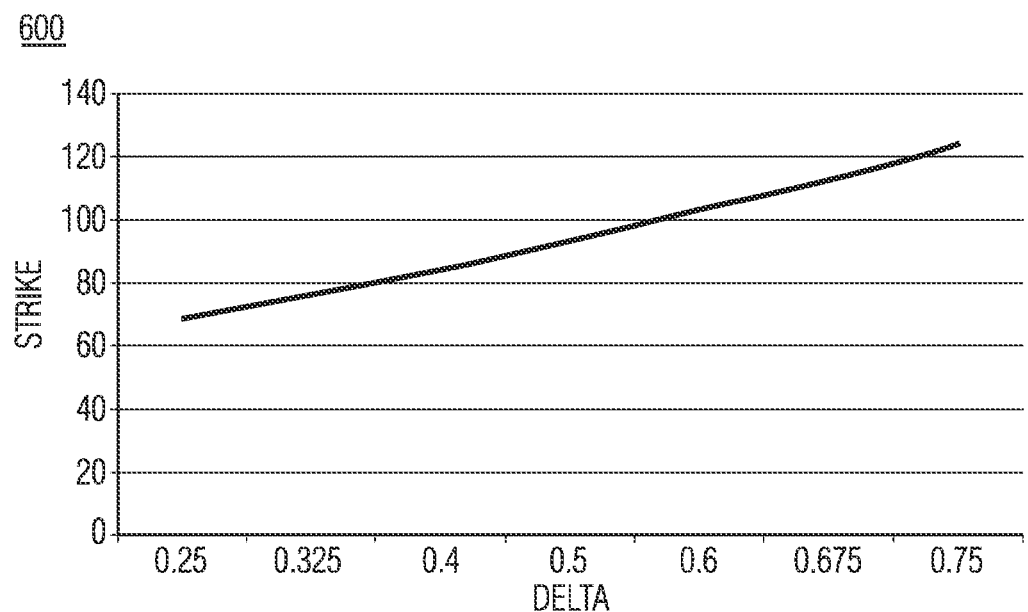
FIG. 6 shows a graphical representation of an exemplary transformation of delta-to-strike of an exemplary system according to the present disclosure.

In order to find the implied volatility for any given vanilla option or CSO, the systems and methods of the present disclosure may utilize a transformation of delta space to strike space. A graphical representation of an exemplary transformation of delta-to-strike 600 is shown in FIG. 6.

Given any strike, the present disclosure provides means for identifying the respective implied volatility. This transformation may be carried out using the following formula, the parameters of which are defined in Table 1 below:

$$K = \frac{F}{\exp\left(\sigma\sqrt{t} \cdot N^{-1}(\exp(rt)) - \frac{\sigma^2}{2}t\right)} \quad (9)$$

TABLE 1

Delta to Strike Conversion Parameters

| Parameters | Descriptions |
|---|---|
| $N^{-1}(\cdot)$ | The inverse of the cumulative distribution of the standard normal distribution |
| F | EWMA adapted price of the underlying future |
| K | Strike price |
| $\sigma$ | Volatility of option returns |
| t | Time to expiry |
| r | Risk-free rate |

Systems and methods according to this disclosure may utilize implied volatility along with EWMA adapted forward price to estimate the price of a financial product such as an option, for example. Details for calculating the EWMA adapted forward price are discussed further below.

To capture the risk of options (although this process may apply to other types of financial instruments), for example, systems and methods according to this disclosure may track risk factors associated with the financial product. In this example, the risk factors may include: an option's underlying price and the option's implied volatility. As an initial step, an implied volatility surface in terms of delta may be calculated. With this volatility surface, and using the sticky delta rule, the current level of implied volatility for any respective option may be determined.

Inputs for using the sticky delta rule may include: historical underlying prices, fixed deltas [if seven deltas are used, for example, they may include: 0.25, 0.325, 0.4, 0.5, 0.6, 0.675, 0.75], historical implied volatilities for each fixed delta, for CSOs, historical implied correlations for each fixed delta, and for CSOs, historical strike for each fixed delta.

Notably, when calculating VaR for options, implied volatilities may be used to estimate option price. Implied volatility in the options market seems to move with delta. Using the sticky delta rule to track changes in implied volatility may therefore lead to accurate forecasts of implied volatility for all respective securities.

Volatility Ceiling

A volatility ceiling, or volatility cap, may be an upper limit on how high a current backtesting day's forecasted volatility is allowed to fluctuate with respect to a previous backtesting day. This volatility ceiling may be implemented by using a multiplier which defines this upper limit. In a real-time system, which is forecasting margins instead of using backtesting days, the terminology "yesterday's forecasted volatility" may be used.

The idea of a volatility ceiling is to prevent the system from posting a very high margin requirement from the client due to a spike in market volatility. A margin call which requires the client to post a large margin, especially during a market event, can add to systemic risk (e.g., by ultimately bankrupting the client). Hence, the idea would be to charge a margin which is reasonable and mitigates clearinghouse risk.

If the volatility forecast for a future time period (e.g., tomorrow) is unreasonably high due to a volatility spike caused by a current day's realized volatility, then it is possible that an unconstrained system would charge a very high margin to a client's portfolio under consideration. Typically, this may occur when a market event has occurred related to the products in the client's portfolio. This can also happen if there are 'bad' data points; typically, post backfilling, if returns generated fluctuate too much then this case can be encountered.

As noted above, charging a very high margin in case of a market event can add on to the systemic risk problem of generating more counterparty risk by potentially bankrupting a client that is already stretched on credit. Hence, the present disclosure provides means for capping the volatility and charging a reasonable margin which protects the clearinghouse and does not add to the systemic risk issue.

Inputs into a system for preventing an unreasonably high margin call may include: a configurable multiplier alpha a (e.g., set to value 2), previous backtesting day's (or for live system yesterday's) forecasted volatility, $\sigma_{i-1}$ and current day's (e.g., today's) forecasted volatility, $\sigma_i$. Output of such a system may be based on following equation:

$$\sigma_i = \min(\sigma_i, \alpha * \sigma_{i-1}), \quad (10)$$

where $\sigma_i$ is reassigned to a new volatility forecast, which is the minimum of today's volatility forecast, or alpha times yesterday's forecast.

An initial step in the process includes defining a configurable parameter, alpha, which may be input directly into the system (e.g., via a graphical user interface (GUI) embodied in a computing device in communication with the system) and/or accepted from a control file. Then, the following steps can be followed for different types of financial products.

For futures (or similar types of products):

1. For backtesting, a variable which holds previous backtesting day's volatility forecast may be maintained in the system; and for a live system, yesterday's volatility forecast may be obtained in response to a query of a database storing such information, for example.

2. The new volatility may be determined based on the following equation:

$$\sigma_i = \min(\sigma_i, \alpha * \sigma_{i-1}) \quad (11)$$

For options (or similar types of products):

1. For backtesting, a vector of x-number (e.g., seven (7)) volatility values for previous day corresponding to the same number (e.g., seven (7)) on delta points on a volatility surface may be maintained; and for the live system, yesterday's volatility forecast for each of the seven delta points on the volatility surface may be obtained in response to a query of a database, for example.

2. The new volatility corresponding to each point may be determined based on the following equation:

$$\sigma_i^p = \min(\sigma_i^p, \alpha * \sigma_{i-1}^p), \quad (12)$$

where p is delta point index

Under normal market conditions, a volatility cap of $\alpha=2$ should have no impact on margins.

Configurable Holding Period

Two notable parameters of VaR models include the length of time over which market risk is measured and the confidence level. The time horizon analyzed, or the length of time determined to be required to hold the assets in the portfolio, may be referred to as the holding period. This holding period may be a discretionary value.

The holding period for portfolios in a risk model according to this disclosure may be set to be one (1) day as a default, which means only the risk charge to cover the potential loss for the next day is considered. However, due to various potential regulatory requirements and potential changes in internal risk appetite, this value may be configurable to any desired value within the risk architecture described herein. This allows for additional scenarios to be vetted under varying rule sets. The configurable holding period can enhance the ability of the present disclosure to capture the risk for a longer time horizon. The following items illustrate a high level overview of the functionality involved:

a. the holding period, n-days, may be configured in a parameter sheet;
b. the holding period value may impact returns calculations;
c. n-day returns, historical returns over the holding period [e.g., ln(Price(m)/Price(m−n))] may be computed;
d. analytics may be performed on the n-return series;
e. historical price simulations may be performed over the n-day holding period; and
f. profit and loss determinations may be representative of the profit and loss over the holding period.

With a configurable holding period, the time horizon of return calculations for both future and implied volatility (e.g., for options) may not simply be a single day. Instead, returns may be calculated according to the holding period specified.

In a VaR calculation, sample overlapping is also allowed. For example, considering a three-day holding period, both the return from day one to day four and the return from day two to day five may be considered to be valid samples for the VaR calculation.

In backtesting, daily backtests may also be performed. This means performing backtesting for every historical day that is available for the risk charge calculation. However, since the risk charge calculated for each backtesting day may have a multiple-day holding period, risk charge may be compared to the realized profit/loss over the same time horizon.

Notably, VaR models assume that a portfolio's composition does not change over the holding period. This assumption argues for the use of short holding periods because the composition of active trading portfolios is apt to change frequently. However, there are cases where a longer holding period is preferred, especially because it may be specified by regulation. Additionally, the holding period can be driven by the market structure (e.g., the time required to unwind a position in an over-the-counter (OTC) swaps market may be longer than the exchange traded futures markets). The holding period should reflect the amount time that is expected to unwind the risk position. Therefore, the present disclosure provides a model with a configurable holding period. This will allow risk management to change the holding period parameter if needed.

Expiration Model

Figure 7:
FIG. 7 shows an exemplary fixed time series of an exemplary system according to the present disclosure.

Systems and methods of the present disclosure may be configured to process financial products having fixed expiries and/or relative expiries. Under the fixed expiry model, for each historical day, settlement data which share the same contract expiration date may be obtained to form a time series, and then historical simulation may be performed on that series. Since the contract expiration date is fixed, as time progresses the contract will move closer to its expiry date (e.g., time to maturity is decaying). An example of a fixed time series 700 is shown in FIG. 7.

On the other hand, under the relative expiry model, for each historical day, settlement data which share the same time to maturity may be used to form the time series. Therefore, as time progresses the contract will remain at the same distance to its expiry date and every point in the time series may correspond to different expiration dates.

Figure 8:
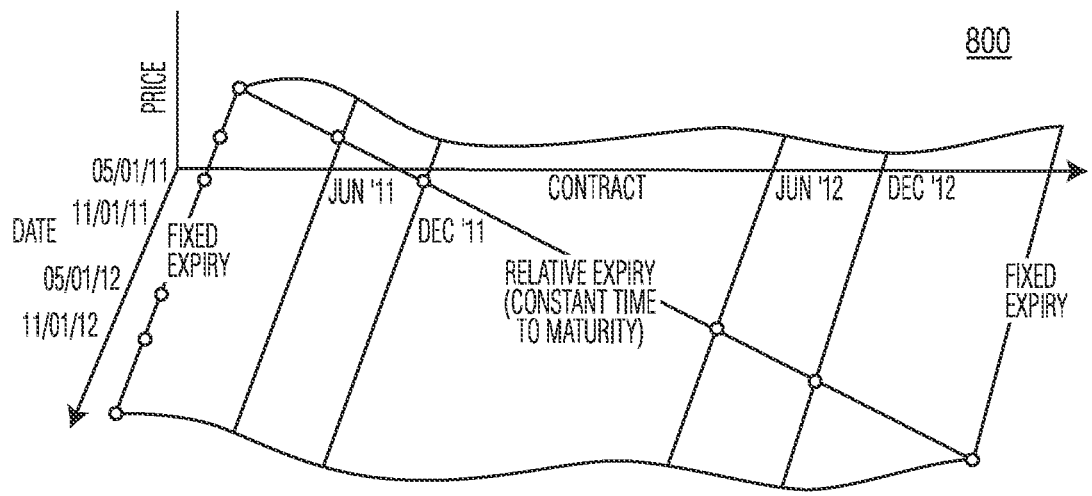
FIG. 8 shows a chart of the differences between an exemplary relative and fixed expiry data series of an exemplary system according to the present disclosure.

Turning now to FIG. 8, a chart 800 shows the differences between relative and fixed expiry data. Any data pulled from the fixed expiry model would fall on a fixed expiry curve. This is a curve connecting the price points of the contract that expires at a specific time (e.g., Jun. 15, 2012) on the forward curve day-over-day. Relative expiry data is represented by the curve that connects points of the contract that expire at a specific time period later (e.g., in one year). This figure shows that relative expiry data represents prices from several contracts.

Take, for example, futures contract A that issued on January '12 with a one year time to expiry. In the case where the contract is fixed expiry, data is obtained such that the contract will move closer to its expiration date. This implies that price changes can be tracked for contract A by simply using the obtained data as a historical price series.

On the other hand, if contract A is a relative expiry contract, data is obtained such that the contract quoted will actually remain at the same distance to its expiration date. This implies that the data consists of quotes of different contracts with the same distance to maturity from the given settlement date.

Figure 9:
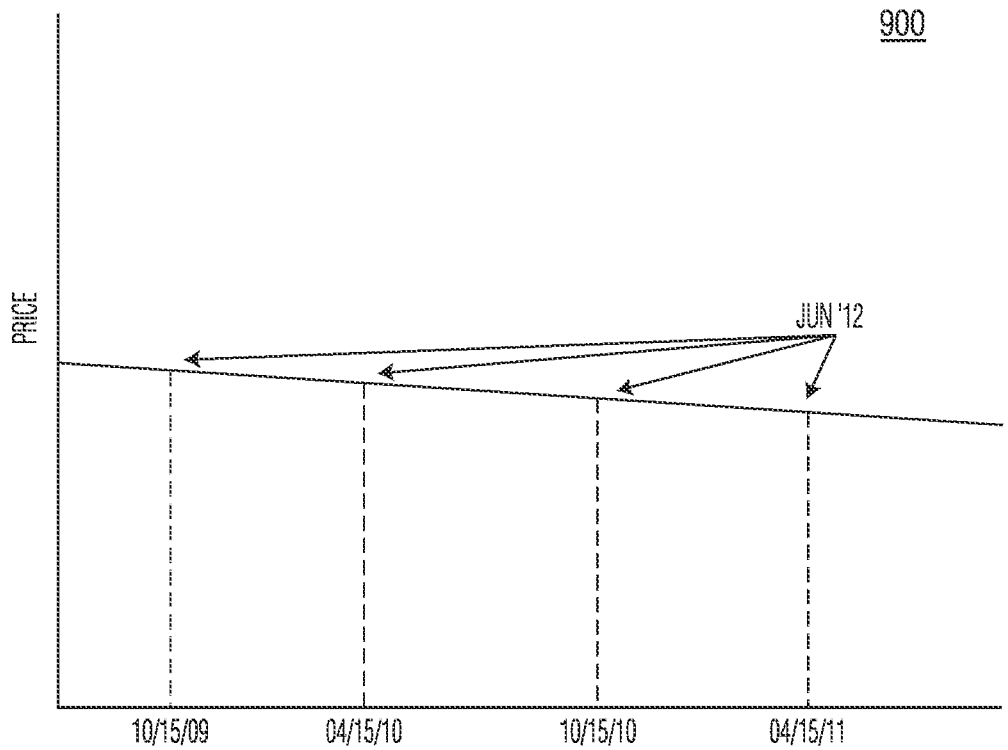
FIG. 9 shows a chart of an exemplary fixed expiry dataset of an exemplary system according to the present disclosure.

Another aspect of the present disclosure is the ability to more effectively eliminate the seasonality impact from market risk of a given contract. This aspect may be illustrated in the context of FIG. 9, which shows an example chart 900 of a fixed expiry dataset. As shown in the chart 900, on every historical date (e.g. Oct. 15, 2009, Apr. 15, 2010, etc.) a system according to this disclosure may scale the price of the same contract (June '12). Notably, a single contract may be quoted for every historical date and rather than price fluctuations caused by seasonality, these price changes may occur since the contract converges to spot price as expiration approaches. Any significant price movement which deviates from the contract's natural convergence to spot, in the fixed expiry data, may be attributed to unpredictable demand or changes in economic climate.

In the context of a relative expiry dataset, the volatility in a relative expiry time series may be associated to tenor seasonality rather than the volatility of a single tenor. As such, on every historical date in such a time series, a system according to this disclosure may be configured to scale the price of the contract which expires in a constant time period away from the historical date.

Inputs into an expiration model (e.g., fixed or relative) may include, for example, a portfolio profile, historical prices and historical volatilities at various delta points. Under the fixed expiry model, for example, time series data may be assumed to reference the same contract; this means that for every historical date, the data corresponding to one fixed expiration date may be obtained and will form the time series for later scaling purposes.

An exemplary risk calculation process for calculating a risk of a product may include performing returns calculations which may be used in an EWMA sub-process, the results of which may be used to perform standardized return calculations and volatility forecast and cap calculations. Next, an EWMA adaptation process may be performed before a VaR calculation is performed. An option pricing process (e.g., for options) may also be performed following EWMA adaptation before the VaR calculation occurs.

Option Pricing Library

Since underlying prices and option implied volatilities may be scaled separately in an option risk charge calculation process of this disclosure, an option pricing library may be utilized to calculate the option prices from scaled underlying prices and implied volatilities. Furthermore, the sticky delta technique described herein may utilize conversions between option strike and delta, which may also achieved within the option pricing library.

When calculating risk charges for options, a Value-at-Risk (VaR) analysis may utilize a series of projected options values, which may not be directly available and may therefore be calculated from scaled underlying prices and volatilities. Therefore, the options pricing library may be configured to provide an interface for the risk calculator to price options from the scaled values and other parameters.

The sticky delta method utilizes a conversion from deltas to strikes given option implied volatilities for each delta after which an interpolation can be performed in strike domain to get the interpolated implied volatility for further calculation.

Examples of inputs for the option pricing library may include (without limitation): for 'vanilla' options, option type (call/put), underlying price, strike, time to expiry, interest rate, and implied volatility. For options on spreads, inputs may include option type (call/put), strike, first leg's underlying price, second leg's underlying price, first leg's underlying volatility, second leg's underlying volatility, time to expiry, interest rate, and implied correlation. For Asian options, inputs may include option type (call/put), underlying price, strike, time to expiry, interest rate, time to first averaging point, time between averaging points, number of averaging points, and implied volatility. For foreign exchange options, inputs may include option type (call/put), underlying price, strike, time to expiry, interest rate, interest rate of foreign currency, and implied volatility. For delta-to-strike conversion, input may include delta, underlying price, strike, time to expiry, interest rate, and implied volatility.

Outputs of the option pricing library may include an option price (from option pricer) and/or an option strike (from delta-to-strike conversion).

Optionally, the option pricing library may be an independent module outside of the risk calculation module (e.g., a standalone library regardless of the risk model change). In the risk calculation module, an example function call may be as follows (function format is for illustrative purposes and could differ depending on implementation):

(13) optionPrice=Black76Pricer(optionType, underlyingPrice, strike, timeToExpiry, interestRate, impliedVol, marginChoice) or

(14) optionStrike=DeltaStrikeConverter(delta, underlyingPrice, strike, timeToExpiry, interestRate, impliedVol, model), where Black-Scholes, Black76 (both margined and non-margined), spread option, Garmin-Kohlhagen, Barone-Adesi and Whaley, Bachelier, and Curran models may be implemented. Both margined and non-margined Black76 models may be implemented for delta-to-strike conversion.

Yield Curve Generator (YCG)

A yield curve describes interest rates (cost of borrowing) plotted against time to maturity (term of borrowing). Yield curves may be utilized for pricing options because options need to be discounted correctly using the interest rate corresponding to their expiration date. Also, interest rates in different countries have a direct relationship to their foreign exchange ("FX") rates and can be used to price forward contracts.

Yield curves may be generated daily for the settlement process by a python-based yield curve generator, which uses a data feed of Overnight Index Swap (OIS) rates as inputs. A more generic and robust solution may utilize similar algorithms but may be configured as a standalone module providing yield curves based on client-server architecture to various products.

For calculation of option value (and in turn margin), a yield curve or interest rate corresponding to the expiry of a particular option on the day of calculation (e.g., for the Black-76 model) may be utilized. Historical interest rates to identify volatility against the strike being priced are also utilized. This may be accomplished by first converting the volatility surface from delta to strike space and then interpolating over it. The conversion from delta space to strike space may utilize interest rates for the Black-76 model.

Notably, use of an interest rate may be dependent on the pricing model being utilized. Thus, in a production level system which may have various pricing models for different instruments, interest rates may or may not be required depending on the instrument and model used to price that instrument.

Inputs into a yield curve generator module may include (for example) a pricing day's yield curve which for a single options contract may be the interest rate corresponding to the expiration date of the option contract on the pricing date; and/or historical yield curves per VaR calculation day, which for one options contract means the interest rate corresponding to expiration date as of VaR calculation day which may be used for a conversion from delta to strike.

Accurate margins due to correct interest rates being used for pricing and accurate conversion from delta to strike yield proper YCG rates.

In operation, assuming the ability to query the historical interest rate curve (yield curve) and current yield curve with granularity of time to maturity in terms of "days" from an available database is possible, the following steps can proceed:

a. Going from delta space to strike space the following formula may be used to convert delta points (e.g., seven delta points) each day into their corresponding strikes. Although the seven delta points in this example (e.g., 0.25, 0.325, 0.4, 0.5, 0.6, 0.675, and 0.75) may be constant, the strikes corresponding to these deltas may change as underlying shifts each day. For the Black-76 model, an equation to go from delta to strike space may comprise the following:

$$K = F * e^{-\left(N^{-1}(e^{rT}*\Delta)*\sigma\sqrt{T} - \frac{\sigma^2}{2}*T\right)}, \qquad (15)$$

where K=strike, F=futures price, $N^{-1}$=cumulative normal inverse, T=time to expiry of option, r=interest rate, corresponding to maturity at T, σ=implied volatility and Δ=delta (change in option price per unit change in futures price).

Notably, the interest rate may be different each day in the VaR period when converting from delta to strike (maturity taken with respect to current day).

b. When attempting to re-price options (scenarios) using scaled data through an option pricing formula after EWMA volatility and underlying price scaling, the historical day's interest rate with maturity taken with respect to the margining day {e.g., Today(risk calculation day)+Holding Period in business days} may be taken. The purpose here is to incorporate for interest rate risk.

c. For the backtesting process, the ability to pull historical yield curves to re-price options on the backtesting day may be utilized.

d. a YCG database may provide a daily yield curve with each yield curve giving interest rates against each maturity date starting from next day with increments of one, up to any number of years (e.g., seventy years).

Examples of option models that may be used in connection with YCG include (without limitation) Black-76, Margined Black-76, Spread-Li CSO, APO (Black-76) and others. Most of these models (except Margined Black-76) require interest rate.

Portfolio Bucketing

An aspect of the present disclosure is to calculate an initial margin for each clearing member according to the portfolios each member holds in their accounts. Another way to look at it is to attribute the overall market risk for a clearinghouse to each clearing member. However, this will only provide the clearinghouse's risk exposure at clearing member level. Portfolio bucketing provides means for grouping clearing member's portfolios (or divide clearing member's account) such that the risk exposure of the clearinghouse can be evaluated at a more detailed level.

Figure 10:
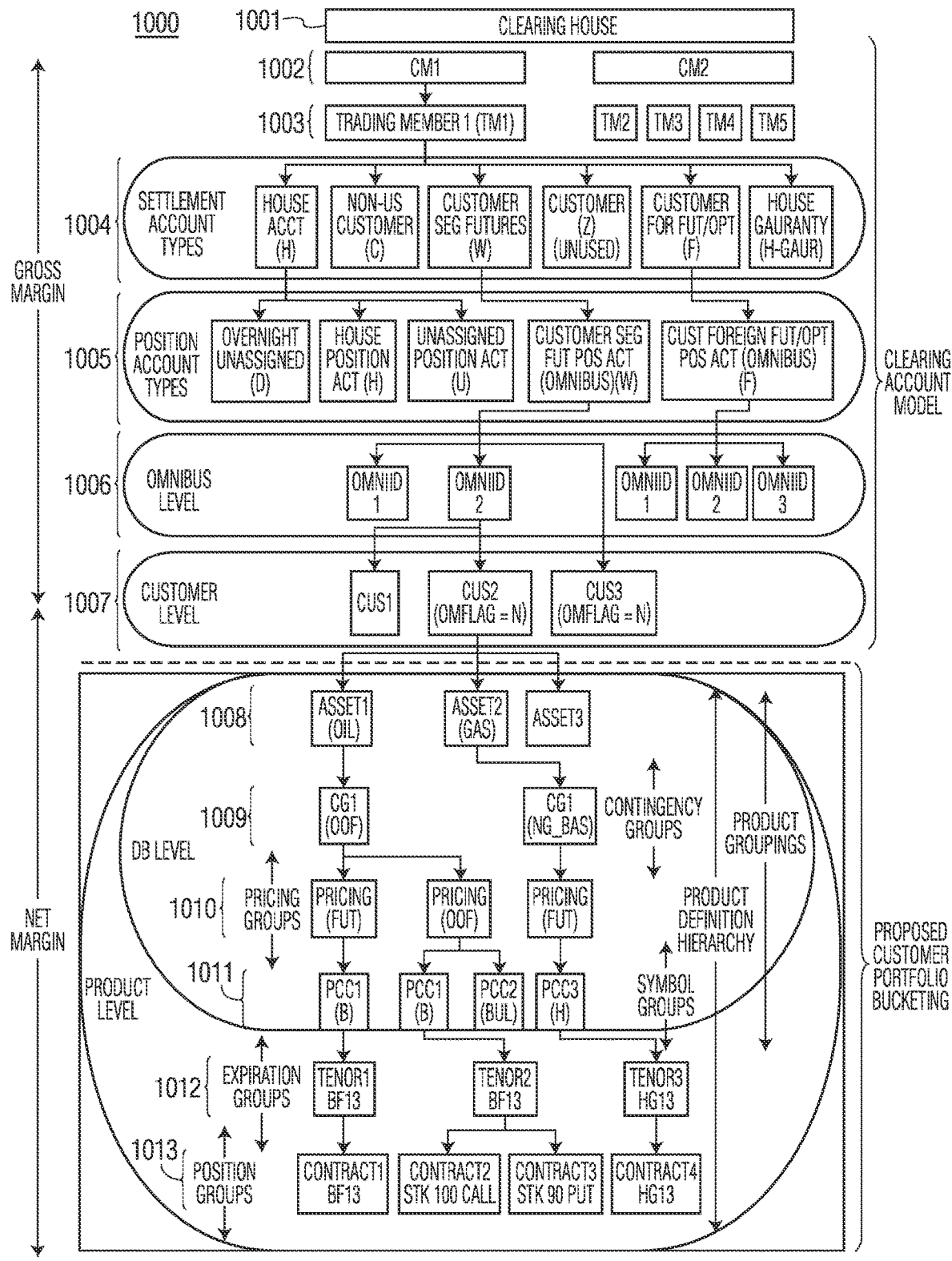
FIG. 10 shows an exemplary clearinghouse account hierarchy of an exemplary system according to the present disclosure.

There are multiple layers under each clearing member account. The systems and method of this disclosure may be configured to attribute an initial margin for a clearing member to each bucketing component on each layer. FIG. 10 shows an exemplary clearinghouse account hierarchy 1000. As shown, the account hierarchy includes twelve (12) contract position attributes that may pertain to a contract position within a clearing member account. Notably, more, fewer and/or alternative attributes may be utilized in connection with this disclosure.

For each contract position within a clearing member account, a unique hierarchy path in the structure of FIG. 10 may be identified in order to aggregate initial margins and evaluate risk exposure at each level. After the clearing account hierarchy 1000 is built, a risk exposure to each component ("portfolio bucket") under the hierarchy 1000 may be calculated, with or without accounting for diversification benefit within the bucket. One purpose of attributing initial margin to different portfolio buckets is to evaluate the potential impact on the clearinghouse in scenarios where abnormal market movement occurs for certain markets and to report initial margin for different levels of buckets.

As noted above, contract positions may exhibit the attributes included in the hierarchy 1000, which may then be fed into an IRM system according to this disclosure as inputs. In the exemplary hierarchy, for a particular clearinghouse 1001, the attributes include:

1. Clearing member identifier 1002 (e.g., GS, MS, JPM, etc.);
2. Trading member identifier 1003 (e.g., TM1, TM2, etc.);
3. Settlement account identifier 1004 (e.g., H, C, F, etc.);
4. Position account identifier 1005 (e.g., D, H, U, etc.);
5. Omnibus account identifier 1006 (e.g., omni1, omni2, NULL, etc.);
6. Customer account identifier 1007 (e.g., cus1, cus2, NULL, etc.);
7. Asset identifier 1008 (e.g., OIL, GAS, etc.);
8. Contingency group identifier 1009 (e.g., BrentGroup, PHEGroup, etc.);
9. Pricing group identifier 1010 (e.g., FUT, OOF, etc.)|
10. Symbol group identifier 1011 (e.g., B, BUL, H, etc.);
11. Expiration group identifier 1012 (e.g., F13, G14, Z14, etc.); and
12. Position identifier 1013.

Figure 11:
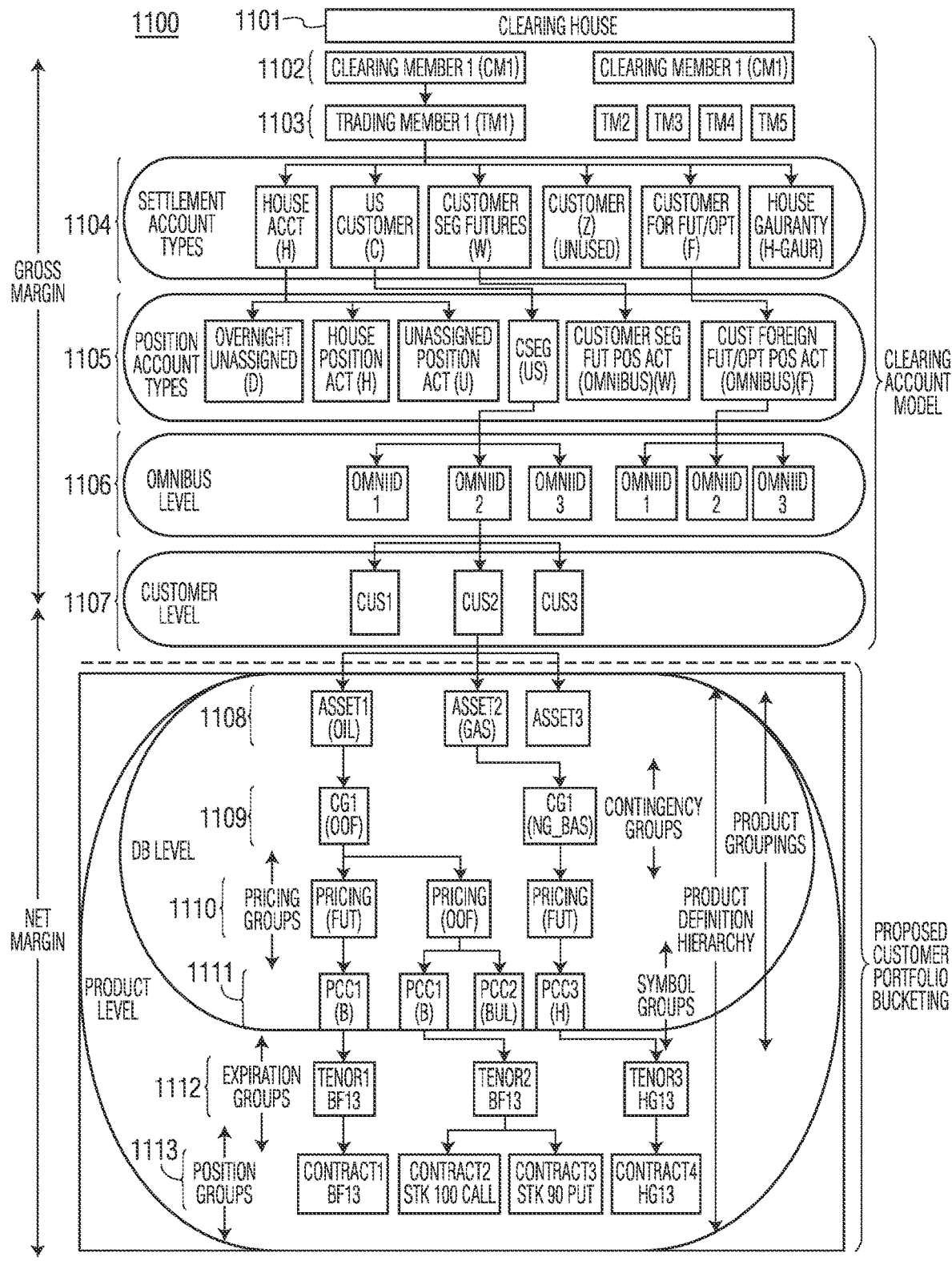
FIG. 11 shows another exemplary clearinghouse account hierarchy of an exemplary system according to the present disclosure.

Portfolio bucketing and initial margin aggregation will be illustrated in the context of another exemplary hierarchy 1100 shown in FIG. 11, which may apply to customer for Futures/Options (F) and customer Seg Futures (W) on the settlement account level, when the customer accounts are disclosed. It may also apply to the US Customer (C) case. The contract position attributes for a particular clearinghouse 1101, as well as the exemplary (non-limiting) initial margin (IM) calculations, are described below.

1. Clearing Member Level 1102:

Bucketing criteria: All the contracts that share the same clearing member identifier may be considered to be within one clearing member bucket.

Initial margin calculation: The initial margin attributed to each clearing member bucket may be equal to the summation of the initial margins attributed to all trading member account buckets under it, as shown in the equation (16) below. There may be no diversification benefit applied across trading member accounts.

$$IM(\text{Clearing Member } i) = \sum_{j=0}^{n} IM(\text{Trading Member Account } j \mid \text{Clearing Member } i) \quad (16)$$

2. Trading Member Level 1103:

Bucketing criteria: All the contracts that share the same clearing member identifier and trading member identifier may be considered to be within one trading member bucket.

Initial margin calculation: The initial margin attributed to each trading member bucket may be equal to the summation of the initial margins attributed to all settlement account buckets under it, as shown in the equation (17) below. There may be no diversification benefit applied across settlement accounts.

$$IM(\text{Trading Member } i) = \sum_{j=0}^{n} IM(\text{Settlement Account } j \mid \text{Trading Member } i) \quad (17)$$

3. Settlement Account Level 1104:

Bucketing criteria: All the contracts that share the same clearing member identifier, trading member identifier and settlement account identifier may be considered to be within one settlement account bucket.

Initial margin calculation: The initial margin attributed to each settlement account bucket may be equal to the summation of the initial margins attributed to all position account buckets under it, as shown in the equation (18)

below. There may be no diversification benefit applied across position accounts.

$$IM(\text{Settlement Account } i) = \sum_{j=0}^{n} IM(\text{Position Account } j \mid \text{Settlement Account } i) \quad (18)$$

4. Position Account Level 1105:

Bucketing criteria: All the contracts that share the same clearing member identifier, trading member identifier, settlement account identifier and position account identifier may be considered to be within one position account bucket.

Initial margin calculation: The initial margin attributed to each position account bucket may be equal to the summation of the initial margins attributed to all omnibus account buckets and all customer account buckets (when the customer account buckets do not belong to any omnibus account bucket) under it, as shown in the equation (19) below. There may be no diversification benefit applied across omnibus/customer accounts.

$$IM(\text{Position Account } i) = \sum_{j=0}^{n} IM(\text{Omnibus/Customer Account } j \mid \text{Position Account } i) \quad (19)$$

5. Omnibus Account Level 1106:

Bucketing criteria: All the contracts that share the same clearing member identifier, trading member identifier, settlement account identifier, position account identifier and omnibus account identifier may be considered to be within one omnibus account bucket.

Initial margin calculation: The initial margin attributed to each omnibus account bucket may be equal to the summation of the initial margins attributed to all customer account buckets under it, as shown in equation (20) below. There may be no diversification benefit applied across customer accounts.

$$IM(\text{Omnibus Account } i) = \sum_{j=0}^{n} IM(\text{Customer Account } j \mid \text{Omnibus Account } i) \quad (20)$$

6. Customer Account Level 1107:

Bucketing criteria: All the contracts that share the same clearing member identifier, trading member identifier, settlement account identifier, position account identifier, omnibus account identifier and customer account identifier may be considered to be within one customer account bucket.

Initial margin calculation: The initial margin attributed to each customer account bucket may be calculated directly from summation of the initial margins attributed to all asset group buckets under it, as well as the initial margin calculated from realized portfolio profit/loss (P/L), using diversification benefit calculation algorithms. The following equation (21) may apply:

$$IM(\text{Customer Account } i) = \quad (21)$$
$$f_{DB}\left(\sum_{j=0}^{n} IM(\text{Asset Group } j \mid \text{Customer Account } i), IM(\text{Portfolio } i)\right)$$

7. Asset Group Level 1108:

Bucketing criteria: All the contracts that share the same clearing member identifier, trading member identifier, settlement account identifier, position account identifier, omnibus account identifier, customer account identifier and asset group identifier may be considered to be within one asset group bucket.

Initial margin calculation: The initial margin attributed to each asset group bucket may be calculated directly from summation of the initial margins attributed to all contingency group buckets under it, as well as the initial margin calculated from realized portfolio P/L, using diversification benefit calculation algorithms. The following equation (22) may be used:

$$IM(\text{Asset Group } i) = \quad (22)$$
$$f_{DB}\left(\sum_{j=0}^{n} IM(\text{Contingency Group } j \mid \text{Asset Group } i), IM(\text{Portfolio } i)\right)$$

8. Contingency Group Level 1109:

Bucketing criteria: All the contracts that share the same clearing member identifier, trading member identifier, settlement account identifier, position account identifier, omnibus account identifier, customer account identifier, asset group identifier and contingency group identifier may be considered to be within one contingency group bucket.

Initial margin calculation: The initial margin attributed to each contingency group may be calculated directly from the history of all positions it contains (instead of pricing group buckets which are just one level below contingency group), allowing taking full advantage of diversification benefits, using the following equation (23):

$$IM(\text{Contingency Group } i) = \quad (23)$$
$$f_{DB\_full}(\text{Position 1, Position 2, } \ldots \mid \text{Contingency Group } i)$$

9. Pricing Group Level 1110:

Bucketing criteria: All the contracts that share same clearing member identifier, trading member identifier, settlement account identifier, position account identifier, omnibus account identifier, customer account identifier, asset group identifier, contingency group identifier and pricing group identifier may be considered to be within one pricing group bucket.

Initial margin calculation: The initial margin attributed to each pricing group may be calculated directly from the history of all positions it contains (instead of symbol group buckets which are just one level below pricing group), allowing taking full advantage of diversification benefits, using the following equation (24):

$$IM(\text{Pricing Group } i) = \\ f_{DB\_full}(\text{Position 1, Position 2, ...} | \text{Pricing Group } i) \quad (24)$$

10. Symbol group level 1111:

Bucketing criteria: All the contracts that share the same clearing member identifier, trading member identifier, settlement account identifier, position account identifier, omnibus account identifier, customer account identifier, asset group identifier, contingency group identifier, pricing group identifier and symbol group identifier may be considered to be within one symbol group bucket.

Initial margin calculation: The initial margin attributed to each symbol group may be calculated directly from the history of all positions it contains (instead of expiration group buckets which are just one level below symbol group), allowing taking full advantage of diversification benefits, using the following equation (25):

$$IM(\text{Symbol Group } i) = \\ f_{DB\_full}(\text{Position 1, Position 2, ...} | \text{Symbol Group } i) \quad (25)$$

11. Expiration group level 1112:

Bucketing criteria: All the contracts that share the same clearing member identifier, trading member identifier, settlement account identifier, position account identifier, omnibus account identifier, customer account identifier, asset group identifier, contingency group identifier, pricing group identifier, symbol group identifier and expiration group identifier may be considered to be within one expiration group bucket.

Initial margin calculation: The initial margin attributed to each expiration group may be calculated from the history of all positions it contains, allowing taking full advantage of diversification benefits, as shown in by following equation (26):

$$IM(\text{Expiration Group } i) = \\ f_{DB\_full}(\text{Position 1, Position 2, ...} | \text{Expiration Group } i) \quad (26)$$

12. Position level 1113:

Bucketing criteria: Each bucket on this level only contains one single contract position.

Initial margin calculation: The initial margin attributed to each position group may be calculated as if it were a single asset portfolio. This step may form the basis of initial margin aggregation for a portfolio.

Figure 12:
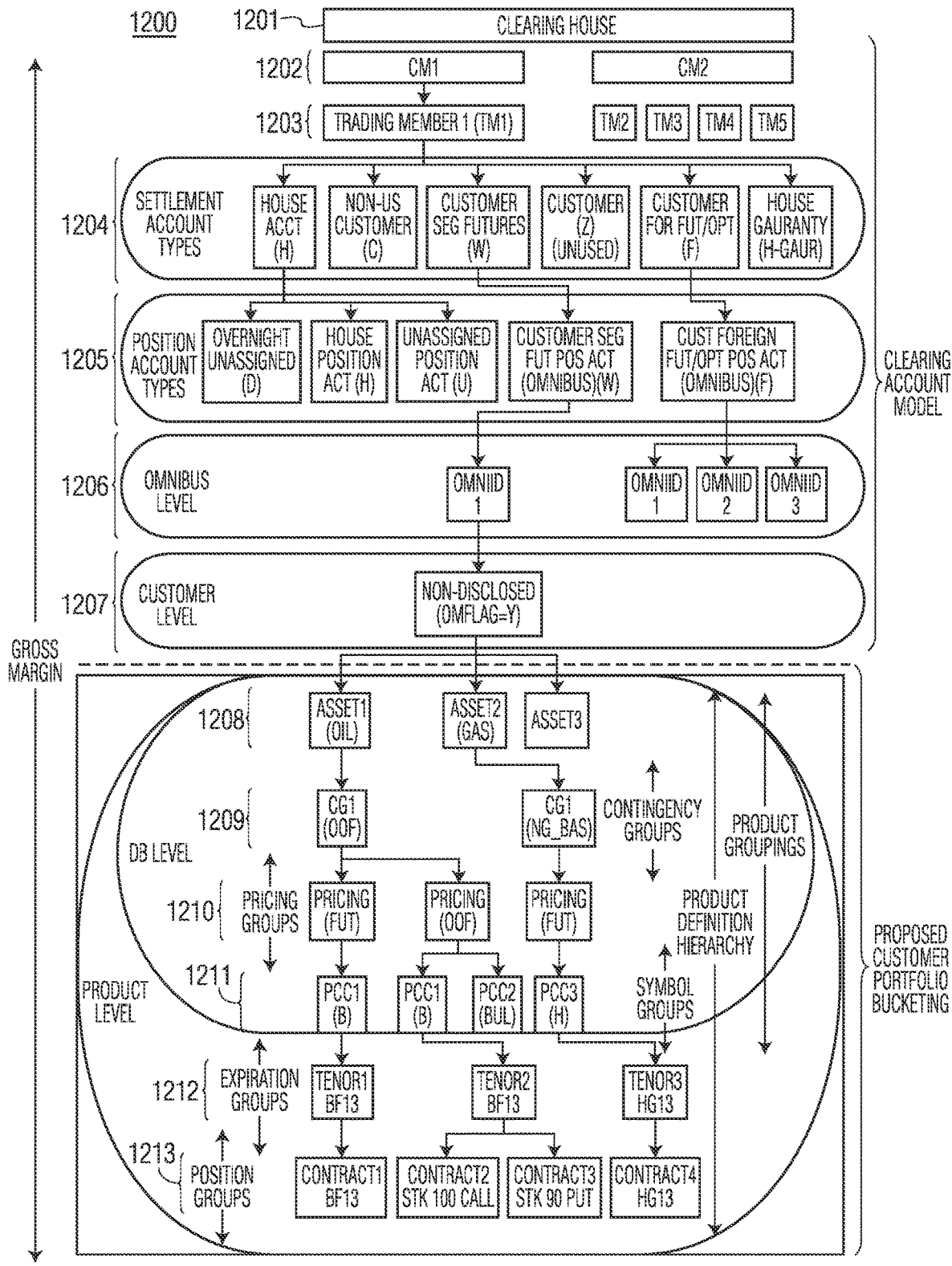
FIG. 12 shows another exemplary clearinghouse account hierarchy of an exemplary system according to the present disclosure.

An exemplary account hierarchy 1200 of non-disclosed customer accounts is shown in FIG. 12. The hierarchy 1200 may apply to customer for Future/Options (F) and Customer Seg Futures (W) on the settlement account level, when the customer accounts are non-disclosed. The contract position attributes for a particular clearinghouse 1201, as well as the exemplary (non-limiting) initial margin (IM) calculations, are described below.

1. Clearing Member Level 1202:

Bucketing criteria: All the contracts that share the same clearing member identifier may be considered to be within one clearing member bucket.

Initial margin calculation: The initial margin attributed to each clearing member bucket may be equal to the summation of the initial margins attributed to all trading member account buckets under it, as shown in the following equation (27). There may be no diversification benefit applied across trading member accounts.

$$IM(\text{Clearing Member } i) = \\ \sum_{j=0}^{n} IM(\text{Trading Member Account } j | \text{Clearing Member } i) \quad (27)$$

2. Trading Member Level 1203:

Bucketing criteria: All the contracts that share the same clearing member identifier and trading member identifier may be considered to be within one trading member bucket.

Initial margin calculation: The initial margin attributed to each trading member bucket may be equal to the summation of the initial margins attributed to all settlement account buckets under it, as in the following equation (28). There may be no diversification benefit applied across settlement accounts.

$$IM(\text{Trading Member } i) = \\ \sum_{j=0}^{n} IM(\text{Settlement Account } j | \text{Trading Member } i) \quad (28)$$

3. Settlement Account Level 1204:

Bucketing criteria: All the contracts that share the same clearing member identifier, trading member identifier and settlement account identifier may be considered to be within one settlement account bucket.

Initial margin calculation: The initial margin attributed to each settlement account bucket may be equal to the summation of the initial margins attributed to all position account buckets under it, as in the following equation (29). There may be no diversification benefit applied across position accounts.

$$(30) IM(\text{Settlement Account } i) = \\ \sum_{j=0}^{n} IM(\text{Position Account } j | \text{Settlement Account } i) \quad (29)$$

4. Position Account Level 1205:

Bucketing criteria: All the contracts that share the same clearing member identifier, trading member identifier, settlement account identifier and position account identifier may be considered to be within one position account bucket.

Initial margin calculation: The initial margin attributed to each position account bucket may be equal to the summation of the initial margins attributed to all omnibus account buckets and all customer account buckets (when the customer account buckets don't belong to any omnibus account bucket) under it, as in the following equation (30). There may be no diversification benefit applied across omnibus/customer accounts.

$$IM(\text{Position Account } i) = \sum_{j=0}^{n} IM(\text{Omnibus/Customer Account } j \mid \text{Position Account } i) \qquad (30)$$

5. Omnibus Account Level 1206:

Bucketing criteria: All the contracts that share the same clearing member identifier, trading member identifier, settlement account identifier, position account identifier and omnibus account identifier may be considered to be within one omnibus account bucket.

Initial margin calculation: The initial margin attributed to each omnibus account bucket may be equal to the initial margins of the non-disclosed customer account buckets under it, as in the following equation (31).

$$IM(\text{Omnibus Account } i) = IM(\text{Non-disclosed Customer Account } i) \qquad (31)$$

6. Customer Account Level 1207:

Bucketing criteria: All the contracts that share the same clearing member identifier, trading member identifier, settlement account identifier, position account identifier, omnibus account identifier and customer account identifier may be considered to be within one customer account bucket.

Initial margin calculation: The initial margin attributed to each customer account (non-disclosed) bucket may be equal to the summation of the initial margins attributed to all asset group buckets under it, as in the following equation (32). There may be no diversification benefit applied across omnibus/customer accounts.

$$IM(\text{Customer Account } i) = \sum_{j=0}^{n} IM(\text{Asset Group } j \mid \text{Customer Account } i) \qquad (32)$$

7. Asset Group Level 1208:

Bucketing criteria: All the contracts that share the same clearing member identifier, trading member identifier, settlement account identifier, position account identifier, omnibus account identifier, customer account identifier and asset group identifier may be considered to be within one asset group bucket.

Initial margin calculation: The initial margin attributed to each asset group bucket may be equal to the summation of the initial margins attributed to all contingency group buckets under it, as in the following equation (33). There may be no diversification benefit applied across contingency group buckets.

$$IM(\text{Asset Group } i) = \sum_{j=0}^{n} IM(\text{Contingency Group } j \mid \text{Asset Group } i) \qquad (33)$$

8. Contingency Group Level 1209:

Bucketing criteria: All the contracts that share the same clearing member identifier, trading member identifier, settlement account identifier, position account identifier, omnibus account identifier, customer account identifier, asset group identifier and contingency group identifier may be considered to be within one contingency group bucket.

Initial margin calculation: The initial margin attributed to each contingency group may be equal to the summation of the initial margins attributed to all pricing group buckets under it, as in the following equation (34). There may be no diversification benefit applied across pricing group buckets.

$$IM(\text{Contingency Group } i) = \sum_{j=0}^{n} IM(\text{Pricing Group } j \mid \text{Contingency Group } i) \qquad (34)$$

9. Pricing Group Level 1210:

Bucketing criteria: All the contracts that share same clearing member identifier, trading member identifier, settlement account identifier, position account identifier, omnibus account identifier, customer account identifier, asset group identifier, contingency group identifier and pricing group identifier may be considered to be within one pricing group bucket.

Initial margin calculation: The initial margin attributed to each pricing group may be equal to the summation of the initial margins attributed to all symbol group buckets under it, as in the following equation (35). There may be no diversification benefit applied across symbol group buckets.

$$IM(\text{Pricing Group } i) = \sum_{j=0}^{n} IM(\text{Symbol Group } j \mid \text{Pricing Group } i) \qquad (35)$$

10. Symbol Group Level 1211:

Bucketing criteria: All the contracts that share the same clearing member identifier, trading member identifier, settlement account identifier, position account identifier, omnibus account identifier, customer account identifier, asset group identifier, contingency group identifier, pricing group identifier and symbol group identifier may be considered to be within one symbol group bucket.

Initial margin calculation: The initial margin attributed to each symbol group may be equal to the summation of the initial margins attributed to all expiration group buckets under it, as in the following equation (36). There may be no diversification benefit applied across expiration group buckets.

$$IM(\text{Symbol Group } i) = \sum_{j=0}^{n} IM(\text{Expiration Group } j \mid \text{Symbol Group } i) \qquad (36)$$

11. Expiration Group Level 1212:

Bucketing criteria: All the contracts that share the same clearing member identifier, trading member identifier, settlement account identifier, position account identifier, omnibus account identifier, customer account identifier, asset group identifier, contingency group identifier, pricing group identifier, symbol group identifier and expiration group identifier may be considered to be within one expiration group bucket.

Initial margin calculation: The initial margin attributed to each expiration group may be equal to the summation of the initial margins attributed to all position group buckets under it, as in the following equation (37). There may be no diversification benefit applied across position group buckets.

$$IM(\text{Expiration Group } i) = \sum_{j=0}^{n} IM(\text{Position Group } j | \text{Expiration Group } i) \quad (37)$$

12. Position Level 1213:

Bucketing criteria: Each bucket on this level may only contain one single contract position.

Initial margin calculation: The initial margin attributed to each position group may be calculated as if it were a single asset portfolio.

Figure 13:
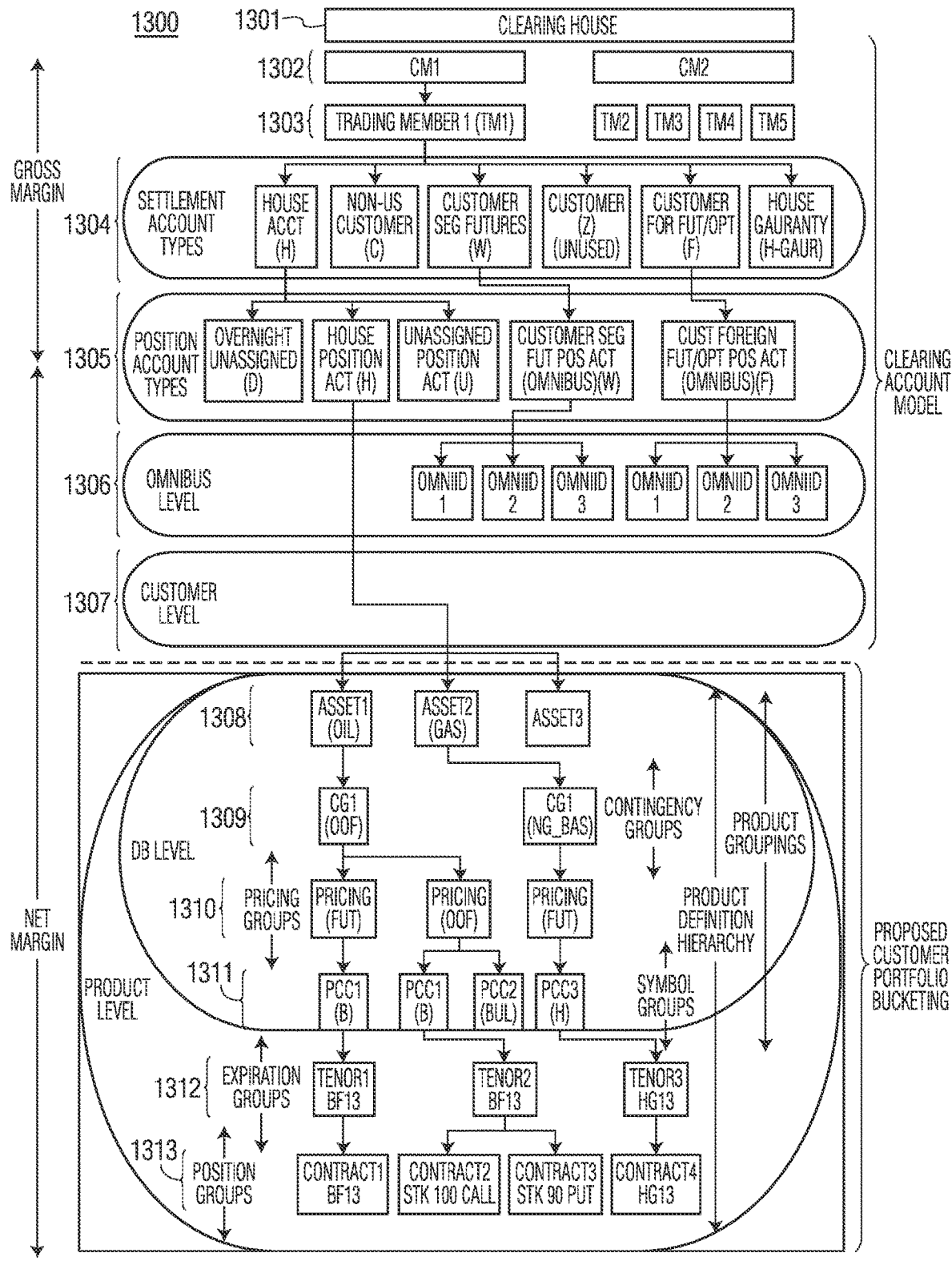
FIG. 13 shows another exemplary clearinghouse account hierarchy of an exemplary system according to the present disclosure.
Figure 14:
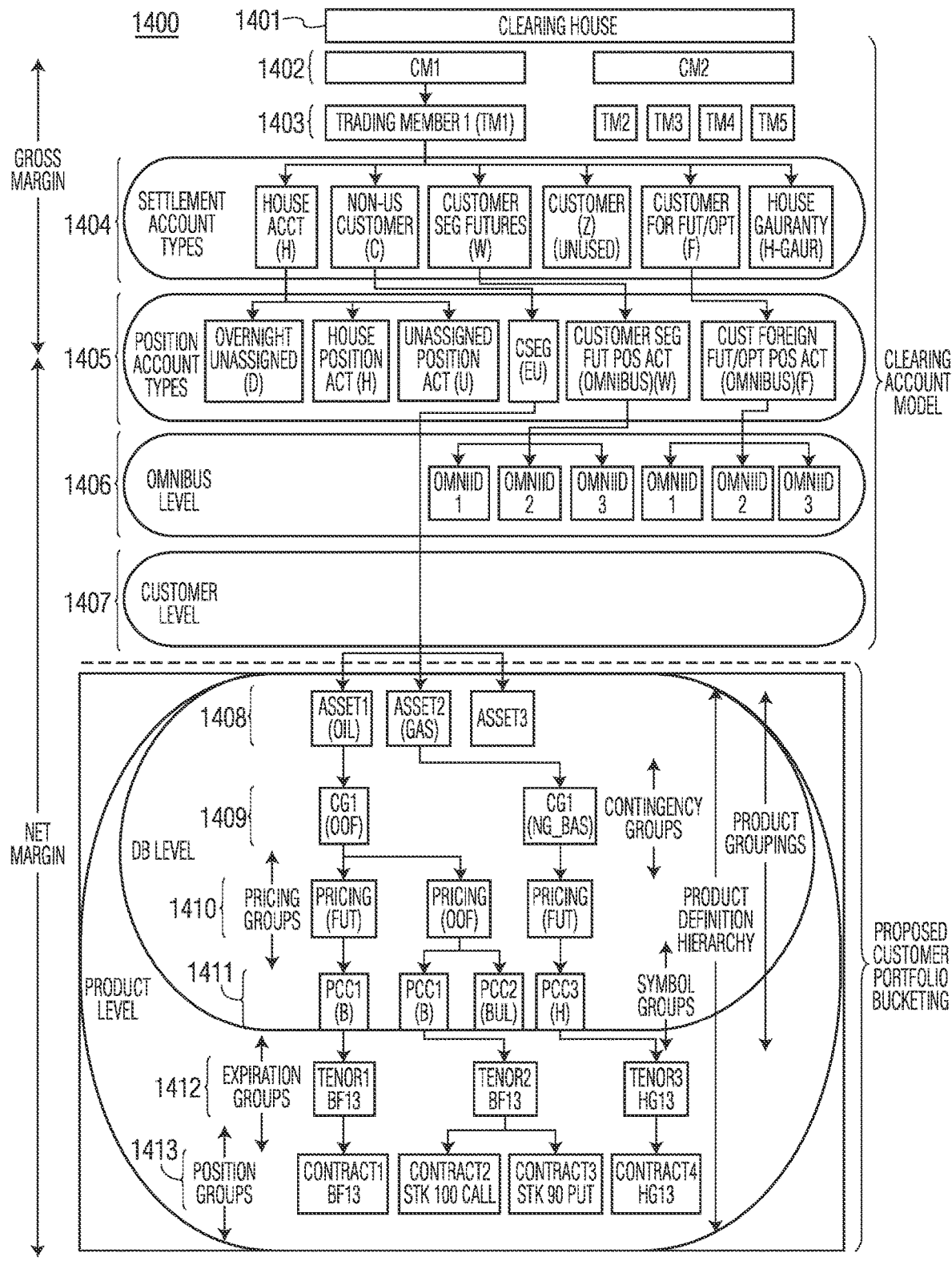
FIG. 14 shows another exemplary clearinghouse account hierarchy of an exemplary system according to the present disclosure.

Additional exemplary account hierarchies 1300, 1400 are shown in FIGS. 13 and 14, respectively. These hierarchies may apply to house accounts (H) and non-US customers (C) on the settlement account level. The contract position attributes for clearinghouses 1301, 1401 as well as the exemplary (non-limiting) initial margin (IM) calculations, are described below.

1. Clearing Member Level 1302, 1402:

Bucketing criteria: All the contracts that share the same clearing member identifier may be considered to be within one clearing member bucket.

Initial margin calculation: The initial margin attributed to each clearing member bucket may be equal to the summation of the initial margins attributed to all trading member account buckets under it, as in the following equation (38). There may be no diversification benefit applied across trading member accounts.

$$IM(\text{Clearing Member } i) = \sum_{j=0}^{n} IM(\text{Trading Member Account } j | \text{Clearing Member } i) \quad (38)$$

2. Trading Member Level 1303, 1403:

Bucketing criteria: All the contracts that share the same clearing member identifier and trading member identifier may be considered to be within one trading member bucket.

Initial margin calculation: The initial margin attributed to each trading member bucket may be equal to the summation of the initial margins attributed to all settlement account buckets under it, as in the following equation (39). There may be no diversification benefit applied across settlement accounts.

$$IM(\text{Trading Member } i) = \sum_{j=0}^{n} IM(\text{Settlement Account } j | \text{Trading Member } i) \quad (39)$$

3. Settlement Account Level 1304, 1404:

Bucketing criteria: All the contracts that share the same clearing member identifier, trading member identifier and settlement account identifier may be considered to be within one settlement account bucket.

Initial margin calculation: The initial margin attributed to each settlement account bucket may be equal to the summation of the initial margins attributed to all position account buckets under it, as in the following equation (40). There may be no diversification benefit applied across position accounts.

$$IM(\text{Settlement Account } i) = \sum_{j=0}^{n} IM(\text{Position Account } j | \text{Settlement Account } i) \quad (40)$$

4. Position Account Level 1305, 1405:

Bucketing criteria: All the contracts that share the same clearing member identifier, trading member identifier, settlement account identifier and position account identifier may be considered to be within one position account bucket.

Initial margin calculation: The initial margin attributed to each position account bucket may be calculated directly from summation of the initial margins attributed to all asset group buckets under it, as well as the initial margin calculated from realized portfolio P/L, using diversification benefit calculation algorithms. An exemplary equation (41) is below:

$$IM(\text{Position Account } i) = f_{DB}\left(\sum_{j=0}^{n} IM(\text{Asset Group } j | \text{Position Account } i), IM(\text{Portfolio } i)\right) \quad (41)$$

5. Customer Account Level 1307, 1407: n/a.

6. Asset Group Level 1308, 1408:

Bucketing criteria: All the contracts that share the same clearing member identifier, trading member identifier, settlement account identifier, position account identifier and asset group identifier may be considered to be within one asset group bucket.

Initial margin calculation: The initial margin attributed to each asset group bucket may be calculated directly from summation of the initial margins attributed to all contingency group buckets under it, as well as the initial margin calculated from realized portfolio P/L, using diversification benefit calculation algorithms. An exemplary equation (42) is provided below.

$$IM(\text{Asset Group } i) = f_{DB}\left(\sum_{j=0}^{n} IM(\text{Contingency Group } j | \text{Asset Group } i), IM(\text{Portfolio } i)\right) \quad (42)$$

7. Contingency Group Level 1309, 1409:

Bucketing criteria: All the contracts that share the same clearing member identifier, trading member identifier, settlement account identifier, position account identifier, asset group identifier and contingency group identifier may be considered to be within one contingency group bucket.

Initial margin calculation: The initial margin attributed to each contingency group may be calculated directly from the history of all positions it contains (instead of pricing group buckets which are just one level below contingency group), as in the following equation (43), allowing taking full advantage of diversification benefits.

$$IM(\text{Contingency Group } i) = \quad (43)$$
$$f_{DB\_full}(\text{Position 1, Position 2, } \ldots \mid \text{Contingency Group } i)$$

8. Pricing Group Level 1310, 1410:

Bucketing criteria: All the contracts that share same clearing member identifier, trading member identifier, settlement account identifier, position account identifier, asset group identifier, contingency group identifier and pricing group identifier may be considered to be within one pricing group bucket.

Initial margin calculation: The initial margin attributed to each pricing group may be calculated directly from the history of all positions it contains (instead of symbol group buckets which are just one level below pricing group), as in the following equation (44), allowing taking full advantage of diversification benefits.

$$IM(\text{Pricing Group } i) = \quad (44)$$
$$f_{DB\_full}(\text{Position 1, Position 2, } \ldots \mid \text{Pricing Group } i)$$

9. Symbol Group Level 1311, 1411:

Bucketing criteria: All the contracts that share the same clearing member identifier, trading member identifier, settlement account identifier, position account identifier, asset group identifier, contingency group identifier, pricing group identifier and symbol group identifier may be considered to be within one symbol group bucket.

Initial margin calculation: The initial margin attributed to each symbol group may be calculated directly from the history of all positions it contains (instead of expiration group buckets which are just one level below symbol group), as in the following equation (45), allowing taking full advantage of diversification benefits.

$$IM(\text{Symbol Group } i) = \quad (45)$$
$$f_{DB_{full}}(\text{Position 1, Position 2, } \ldots \mid \text{Symbol Group } i)$$

10. Expiration Group Level 1312, 1412:

Bucketing criteria: All the contracts that share the same clearing member identifier, trading member identifier, settlement account identifier, position account identifier, asset group identifier, contingency group identifier, pricing group identifier, symbol group identifier and expiration group identifier may be considered to be within one expiration group bucket.

Initial margin calculation: The initial margin attributed to each expiration group may be calculated from the history of all positions it contains, as in the following equation (46), allowing taking full advantage of diversification benefits.

$$IM(\text{Expiration Group } i) = \quad (46)$$
$$f_{DB\_full}(\text{Position 1, Position 2, } \ldots \mid \text{Expiration Group } i)$$

11. Position Level 1313, 1413:

Bucketing criteria: Each bucket on this level may only contains one single contract position.

Initial margin calculation: The initial margin attributed to each position group may be calculated as if it were a single asset portfolio.

Diversification Benefit

Figure 15:
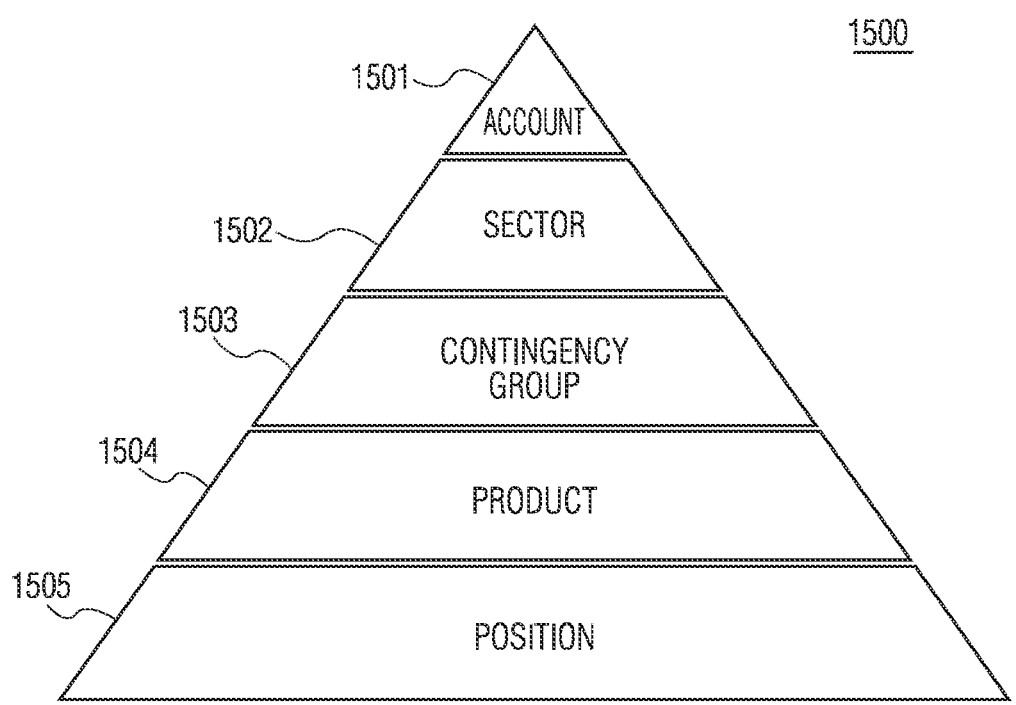
FIG. 15 shows an exemplary hierarchy of a customer's account portfolio of an exemplary system according to the present disclosure.

A diversification benefit process according to this disclosure may assume the following: 1) a customer's account may be considered a portfolio with a natural hierarchy 1500, as shown in FIG. 15; each level of the hierarchy 1500 may have pairwise diversification benefit coefficients defined at each level, which may by default be set up to have zero haircut, meaning no affect on VaR margin; and a haircut may be applied to the diversification benefit at each level (for any reason deemed necessary or desirable).

In summary, an exemplary process for determining IM that accounts for diversification benefit may include one or more of the following exemplary steps:

a. compute a separate and combined margin at each level of the hierarchy for a customer account;
b. compute a diversification benefit at each level of the hierarchy;
c. perform a diversification attribution at each level of the hierarchy;
d. inside each level, the diversification benefit may be allocated to each possible pair;
e. the diversification benefit coefficient may then be used to haircut the diversification benefit given to the customer account;
f. the sum of the diversification benefit haircuts at each level may then be added on to the fully diversified margin charge; and
g. the haircuts across each level of the hierarchy may be added to arrive at an initial margin.

Referring again to FIG. 15, components of the exemplary hierarchy 1500 may include levels such as account 1501, sector 1502, contingency group 1503, product 1504 and position 1505. The account level 1501 is shown as the topmost level, which may be the level at which a final initial margin may be reported. An account 1501 may be made up of sectors 1502.

Sectors 1502 may be made up of contingency groups such as, for example, North American Power, North American Natural Gas, UK Natural Gas, European Emissions, etc.

The contingency group 1503 level may include collections of products that may have direct pricing implications on one another. For example, an option on a future and the corresponding future. An example of a contingency group (CG) may be a Brent={B, BUL, BRZ, BRM, . . . }, i.e., everything that ultimately refers to Brent crude as an underlying for derivative contracts. Contingency groups 1503 may be composed of products.

The product level 1504 may include groups of products, including physical or financial claims on a same (physical or financial) underlying. Non-limiting examples of products include Brent Futures, Options on WTI futures, AECO Natural Gas Basis swaps, etc.

The position level 1505 may comprise distinct positions in a cleared contracts within a customer's account. Non-limiting examples of positions may be referred to as 100 lots in Brent Futures, −50 lots in Options on WTI futures, and −2,500 lots in AECO Basis Swaps, etc.

Concepts associated with diversification benefit and the hierarchy discussed above are provided below. Notably, some of the following terms and concepts have already been discussed above. The following descriptions are intended to supplement (and not limit) any of the descriptions provided above.

Margin may be used interchangeably with initial margin, discussed above. Margin may be the amount of capital required to collateralize potential losses from the liquidation of a customer's portfolio over an assumed holding period and to a particular statistical confidence interval.

$$M_1 = \text{Margin}(\text{Postion 1}), M_{1,2} = \text{Margin}(\text{Position 1} + \text{Position 2}), \quad (47)$$

where i and j refer to indices across all sectors so Mi may be the margin for the ith sectors and Mi,j refers the margin of a pairwise combined sectors.

Margin Separate (Msep) refers to the sum of the margins calculated on every position's individual profits and loss array in a portfolio. This refers to a worst possible case in which there is no diversification benefit.

$$Msep = M(\text{Position1}) + M(\text{Position2}) + M(\text{Position3}) + \ldots \quad (48)$$

Margin Combined (Mcomb) refers to a margin calculated on an entire portfolio's profit and loss array. This is the case in which full diversification benefit is given.

$$Mcomb = M(\text{Position1} + \text{Position2} + \text{Postion3} \ldots) \quad (49)$$

This may also be referred to as a fully diversified margin.

Offset may refer to a decrease in margin due to portfolio diversification benefits.

$$\text{Offset} = (Msep - Mcomb) \quad (50)$$

Haircut may refer to a reduction in the diversification benefit.

Diversification Benefit (DB) may refer to a theoretical reduction in risk a portfolio achieved by increasing the breadth of exposures to market risks over the risk to a single exposure; based, for example, upon a Markowitz portfolio theory. In the context of this disclosure, a diversification benefit (DB) may be a metric of the risk measure reduction an account receives by viewing risk from a portfolio perspective versus a position perspective.

$$DB = Msep - Mcomb \quad (51)$$

Rearranging this equation provides:

$$Mcomb - Msep - DB \quad (52)$$

In this way, the DB may be defined as a "dollar" value.

Diversification Benefit Coefficient (y) may be a number between zero (0) and one (1) that indicates an amount of diversification benefit allowed for an account. Conceptually, a diversification benefit of zero may correspond to the sum of the margins for sub-portfolios, while a diversification benefit of one may be the margin calculated on the full portfolio.

$$Mnew = Msep - y * DB \quad (53)$$

According to the foregoing equation, Mnew may be equal to Msep or Mcomb by setting y equal to zero or one respectively.

Diversification Benefit Haircut (h) may refer to the amount of the diversification benefit charged to an account, representing a reduction in diversification benefit. If the subscripts for $y_{ij}$ refer to the sub-portfolios, the diversification benefit haircut can be expressed as one (1) minus $y_{ij}$, as in the following equation:

$$h_{1,2} = 1 - y_{1,2} \quad (54)$$

This may be the pairwise margin haircut.

Margin Offset Contribution (OC) may refer to the margin offset contribution of combining multiple instruments into the same portfolio versus margining them separately. The offset contribution for a pair of products may be the diversification benefit for that set of portfolios:

$$OC_{1,2} = M_1 + M_2 - M_{1,2} \quad (55)$$

$$OC_{1,3} = M_1 + M_3 - M_{1,3} \quad (56)$$

$$OC_{2,3} = M_2 + M_3 - M_{2,3} \quad (57)$$

Offset Ratio (OR) may refer to the ratio of total portfolio diversification benefit to the sum of pairwise diversification benefits.

$$DB_{portfolio} = M_1 + M_2 + M_3 - M_{1,2,3} = M_{sep} - M_{comb} \quad (59)$$

$$OR = \frac{DB_{portfolio}}{(OC_{1,2} + OC_{1,3} + OC_{2,3})} \quad (60)$$

This ratio forces the total haircut to be no greater than the sum of offsets at each level.

Haircut Weight (w) may refer to the percentage of a margin offset contribution that will be the haircut at each level.

$$w_{1,2} = h_{1,2} * OR \quad (61)$$

$$w_{1,3} = h_{1,3} * OR \quad (62)$$

$$w_{2,3} = h_{2,3} * OR \quad (63)$$

Haircut Contribution (HC) may refer to the contribution to the diversification haircut for each pair at each level.

$$HC_{1,2} = w_{1,2} * OC_{1,2} \quad (64)$$

$$HC_{1,3} = w_{1,3} * OC_{1,3} \quad (65)$$

$$HC_{2,3} = w_{2,3} * OC_{2,3} \quad (66)$$

Level Haircut may refer to the haircut at each level.

$$\text{Haircut} = HC_{1,2} * HC_{1,3} + HC_{2,3} \quad (67)$$

IRM Margin may refer to an actual margin charge.

$$M\_IRM = Mcomb + \text{Haircut} \quad (68)$$

An exemplary diversification benefit process according to this disclosure may include the following process steps.
1. Computing base margins, which result in the Mcomb and Msep margin amounts at each level in the account hierarchy. Elements of computing base margins may include identifying a financial portfolio; identifying diversification benefit coefficients associated with the financial portfolio; computing instrument level margins, position level margins and rolling up the positions to compute fully diversified margins for each product separately (i.e., product level margin computation); computing contingency level margins by combining the products into a contingency group level to compute fully diversified margins for each product group separately; computing sector level margins by combining the contingency groups in order to compute fully diversified margins for each sector separately; and computing an account margin by combining the sectors to compute fully diversified margins for an overall account (e.g., a customer account).
2. computing fully diversified margins across all account levels;
3. computing a margin offset across all account levels; and
4. computing diversification haircuts, by: computing inter-sector diversification haircuts; computing inter-contingency group diversification haircuts; computing inter-product diversification haircuts; computing inter-month diversification haircuts; and computing total IRM margin diversification haircuts.

Information from this foregoing process may then be compiled into a "dashboard" (which may be displayed via an interactive GUI).

Next, systems and methods for more efficiently determining an initial margin are described, according to another embodiment of the present disclosure. A risk management system, according to some embodiments, may include a model system configured to determine an initial margin in an efficient manner while also capturing any liquidity-related risks. The risk management system may also be configured to perform model calibration and model testing. The risk management system may be configured to perform model testing and calibration not only with actual historical data, but also through synthetic data. Moreover, the synthetic data may be created to model both benign data conditions as well as extreme events, such as one or more regime changes. In this manner one or more models of the model system may be created and updated to provide stable and accurate risk data for one or more financial products over a variety of data source conditions.

In some examples, the model system of the risk management system may include a margin model and a liquidity risk charge (LRC) model. The margin model (also referred to as IRM), in general, may be configured to estimate the risk of future losses, by generating an initial margin determination. The LRC model, in general, may be configured to assess a liquidity risk at the product portfolio level. Notably, the LRC model may be configured to quantify liquidity-related risks that may not be capable of being captured in the initial margin determination (by the margin model).

In general, the margin model may be configured to determine an appropriate amount for initial margin, in order to protect the clearinghouse in case of member default. In the regular course of transactions, where all positions are matched, the clearinghouse does not assume market price risk. This is because all of its long positions have an identical short position as financial market participants are matched through the clearinghouse. While the clearinghouse may not assume market risk, the clearinghouse may assume the credit risk that comes with acting as the central counterparty (CCP). CCPs are configured as risk managers. CCPs serve as a substituted counterparty to both sides of a transaction brought to them by their clearing members. In contrast to the mismatched books of banks, CCPs run matched books. They do not take risk other than counterparty risk in connection with their role as substituted counterparty. They assume position risk only when a member fails to perform its obligations until such time as the position risk is either liquidated or transferred to another member.

Initial margin may be used in the event of default, to cover the risk the CCP instantly takes on when it assumes the positions of its defaulted clearing member. The risk may be collateralized to a high degree of certainty (e.g., 99%) in the profit and loss distribution of the defaulted portfolio.

However, charging additional initial margin in times of market distress could lead to additional market distress. To avoid such an outcome, the CCP is typically careful not to create additional systemic risk, by applying buffers in times of market calm. This then permits the CCP to carry a risk factor buffer that can be released in times of market distress. Such a risk factor buffer may be achieved within the margin model of the present disclosure, by adhering to anti-procyclical margin requirements.

At a high level, the margin model may be configured to use historical price fluctuations ("volatility") to estimate the risk of future losses. By using historical volatility, the margin model may predict that, with a high degree of certainty (e.g., at least 99%), losses due to adverse market price movements, over a given period of time for a given portfolio (e.g., a portfolio of interest rate derivatives), may not exceed (in magnitude) the initial margin requirements. As an example, if the output of the margin model is −$1 million, this means that with at least 99% certainty from the time of a clearing member default until the end of a projected liquidation period (e.g., two days), adverse market price changes can cause losses of up to $1 million. Collateralization of the $1 million in initial margin prior to default may protect the clearinghouse system against potential losses.

Conceptually, the margin model, according to some embodiments, makes a fundamental risk management proposition that risk may be desirably quantified and managed from a portfolio perspective. For example, a more efficient allocation of capital may be achieved by formally permitting risk offsets where appropriate, while maintaining an overall risk profile that offers sufficient protection for the clearinghouse system. More technically, the margin model may be configured to generate volatility forecasts from historical returns and estimate a joint distribution of portfolio level profit and loss (P&L, also referred to as PnL herein), in a non-parametric way and without formally estimating the covariance matrix. In some embodiments, the margin model may also include volatility components, such as a volatility floor, as part of a determination of a volatility forecast.

In some embodiments, the margin model may comprise a statistical model, and may be configured in accordance with a set of assumptions (e.g., with respect to data, methodology, model parameter selection, and testing). In an example embodiment, assumptions of the margin model may include assumptions related to portfolio margining, filtering, time scaling, procyclicality risk and calibration methodology.

With respect to portfolio margining, the margin model assumes that any offsets in the margin model may be based on significant and reliable correlations in the data. As discussed further below, the margin model may mitigate any risk associated with this assumption based on a correlation stress component.

With respect to filtering, the margin model may perform filtering using exponentially weighted moving average (EWMA) volatilities. More specifically, the margin model may be configured to perform an EWMA process to generate volatility forecasts from historical returns. Every historical return may be divided by historical volatility and then multiplied by the forecast volatility ("scaled"). The margin model assumes that recent volatility has higher information content for predicting future volatility when compared to volatility experienced less recently.

With respect to time scaling, the margin model may be configured to achieve a multiday holding period time scaling by using a "square-root-of-time" rule. For example, and as discussed further below, the margin model may first generate a set of historical one-day returns. To achieve a two-day holding period, the one day returns may be multiplied by the square root of 2. Through, the use of the square root of time rule, the margin model assumes the one-day returns are uncorrelated and have constant variance over the holding period.

With respect to pro-cyclicality risk, the margin model may be configured to mitigate any pro-cyclicality risk by an anti-pro-cyclicality (APC) treatment process. The APC treatment may be configured to reduce pro-cyclicality, by moderating large step changes in initial margin when margin requirements are rising significantly.

With respect to the calibration methodology, the calibration methods of the margin model may be chosen for particular model parameters, such as an EWMA weight and correlation stress weight (described further below). Accordingly the margin model is assumed to be calibrated according to a methodology that is theoretically sound and such that the calibrated values are robust.

In some embodiments, historical correlation may be largely maintained as part of the scaling process of the margin model, however the margin model may not explicitly forecast correlation. Instead, the margin model may determine a risk of declining correlation (through a correlation stress component, described further below).

As discussed above, in the event of clearing member default, the CCP may assume ownership of any instrument belonging to the respective accounts of the clearing member. Any positions assumed by the CCP may then be closed out (liquidated), auctioned or held to expiry, depending on what is deemed the best course of action at that time. One purpose of the LRC model is to ensure that the CCP collects upfront a margin amount sufficient to protect against the risk of an adverse financial impact due to relatively large trading positions as well any bid-ask spread costs that may be incurred as part of closing positions following one or more default scenarios. In this capacity, the LRC model may account for risk not captured in the margin model.

In some embodiments, LRC values generated by the LRC model may represent an additional overnight requirements for the relevant accounts. In some examples, the LRC values may be recalculated daily, due to the dynamic nature of the portfolios as well as updated market pricing. In some examples, each day new requirements including LRC values may be passed on to a banking system, ready for an end of margin call process mandated for all accounts held at the CCP.

More specifically, the margin model of the present disclosure, in some examples, may be configured to evaluate a price risk at a settlement price level (hence without accounting for possible bid-ask spread costs) from a beginning to an end of a holding period, or a margin period of risk (MPOR). The CCP may then be protected, up to a specified level of confidence, against adverse market price changes in the event of one or more clearing member (CM) defaults. In some embodiments, the LRC model may be configured to quantify liquidity-related risks that may not be captured in the initial margin requirement. In some examples, positions that are large relative to typical transactions in a given market may take longer to unwind than is anticipated in the MPOR of the initial margin. The LRC model may be configured to quantify an amount to collateralize for mitigating this exposure.

The LRC model may be configured to assess the following charges to cover possible liquidity risks: a concentration charge (CC) and a bid-ask charge (BAC). The concentration charge may represent a margin add-on value from clearing members of the clearinghouse system to protect the CCP from liquidation costs associated with liquidating large cleared positions. The bid-ask charge may represent a margin add-on value from clearing members to protect the CCP from liquidation costs associated with the bid-ask spread.

From a high level, the LRC model may assess liquidity risk at the portfolio level (as opposed to at the individual instrument level). In this manner the LRC model may extend the notion of portfolio margining to liquidity risk (albeit at instrument group level) so that fewer offsets may be provided compared to the margin model. Intuitively, where individual instruments may be less liquid, to the extent price risk is low at their combined portfolio level, the CCP faces a reduced exposure.

More technically, the LRC model may be configured to construct price risk equivalent portfolio representations by using representative instruments. In some examples, whether a position in a representative instrument is concentrated may be determined by predetermined concentration thresholds calibrated based on the volume and open interest data. If the position is expected to take longer to liquidate than the MPOR of the initial margin, the concentration charge may be applied based on the excess positions.

The BAC makes up the second component of the LRC model and also applies at the instrument group level. In some examples, the BAC may not be based on an excess quantity beyond a predetermined threshold, but rather may be based on an entire position (e.g., in the representative instrument) that qualifies for BAC. In some examples, the LRC model may be configured to output a sum of the concentration charge and the bid-ask charge, to form a (quantified) liquidity risk charge value.

As with the margin model, in some examples, the LRC model may also be configured according to various assumptions. For examples, the LRC model may assume that the use of portfolio representations provides for an adequate way of estimating the liquidity risk charge. For example, the LRC model may be configured to determine a position in a representative instrument such that the price risk is equivalent to the set of instruments represented. As another example, the concentration charge may be determined under the assumption that positions are gradually liquidated without impacting the market, and adequately captures the liquidity risk of a portfolio.

Similar to the model described above with respect to FIGS. 1-15, the margin model described below also utilizes a VaR as the risk measure. The margin model described below also determines the initial margin based on historical (raw) risk factor returns; scaling of historical risk factor returns by volatility to generate risk factor scenarios based on current risk factor values; and volatility forecasting based on EWMA. Moreover, the model system described below may also be configured to efficiently and accurately determine risk data for both linear products (e.g., futures) and non-linear financial products (e.g., options) by an empirical approach, by using a historical simulation procedure.

The margin model described below is different from the above-described model, in that the margin model does not apply correlation scaling on risk factors. Instead, in order to account for any correlation change, the margin model (described below) includes a correlations stress component as a buffer for any sudden increase or decrease across risk factors. Another difference is with respect to the MPOR. The model described above may apply scaling on overlapping n-day returns (with n being equal to MPOR). The margin model described below does not apply a scaling on overlapping n-day returns. Instead, the margin model described below starts with one-day returns (therefore being non-overlapping) and scales up the volatility forecast with a square root factor. Moreover, unlike the model described above with respect to FIGS. 1-15, the model system described below includes the LRC model to assess liquidity risk.

In addition, the margin model of the present disclosure, described below, includes additional components such as a volatility floor, a stress volatility component, an APC treatment, a portfolio diversification benefit limit and currency allocation. The volatility floor may provide a minimum value for the forecasted volatility of each risk factor, to ensure an overall conservative margin estimate in a low market volatility environment. The stress volatility component represents an additional component in addition to the volatility forecast, to ensure that periods of market stress are included for the calculating of volatilities. The APC treatment may be configured to dynamically adjust the volatility forecast based on recent market moves, which generally may reduce the margin pro-cyclicality. The portfolio diversification benefit limit may comprise a measure to limit an amount of portfolio offsets for multi-product portfolios (e.g., in accordance with particular regulations). In some examples, the portfolio diversification benefit limit may aid in mitigating a risk that the correlation to be realized in the future over the margin period turns out to be "worse" (e.g., riskier) than what may be contained in the historical data. The currency allocation may be configured to allocate the initial margin to each local currency group for multicurrency portfolios.

The systems and methods described below may apply to any type of financial products and combinations thereof, including (without limitation): futures, forwards, swaps, 'vanilla' options (calls and puts), basic exercise (European and American), options (including options on first line swaps), fixed income products (e.g., swaps (IRS, CDS, Caps, Floors, Swaptions, Forward Starting, etc.)), dividend payments, exotic options (e.g., Asian Options, Barrier Options, Binaries, Lookbacks, etc.), exercise products (e.g., Bermudan, Canary, Shout, Swing, etc.) and exchange traded derivative (ETD) products. In some examples, the financial products may include financial products across one or more currencies. In some examples, the systems and methods described below may be applied to ETD products, including ETD interest rate derivative products. An example model system may be configured, in some embodiments, to assess initial margin for cleared interest rate derivative products. Futures products may include, without being limited to, STIR futures, GCF repo futures, Swapnote® futures, bond futures, Eris futures, EONIA futures and SONIA futures. Options products may include, without being limited to, options on futures (including options on STIR futures, mid-curve options on STIR futures) and options on bond futures.

Figure 16:
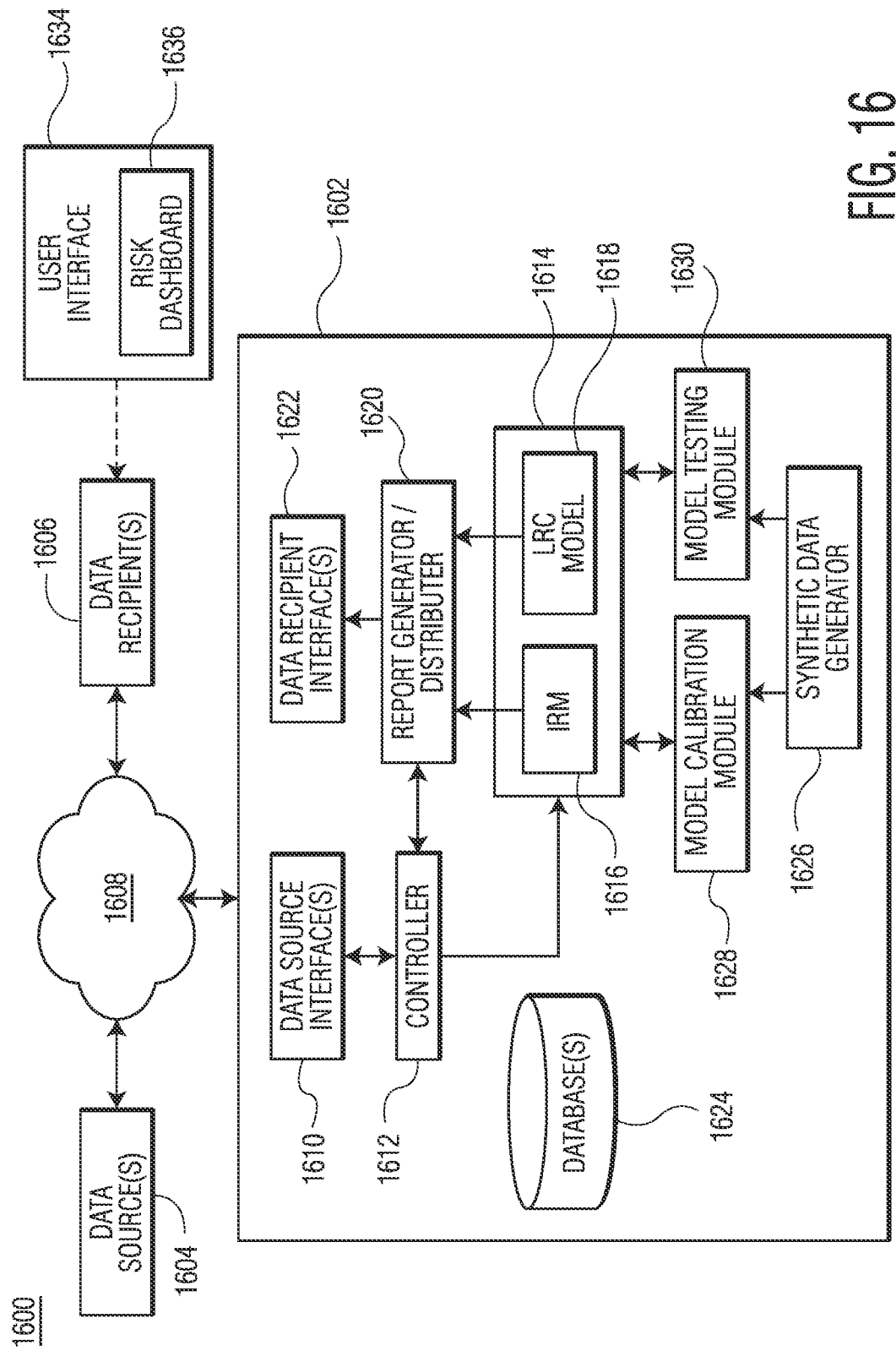
FIG. 16 is a functional block diagram of an example risk management system according to the present disclosure.

Turning now to FIG. 16, FIG. 16 is a functional block diagram illustrating an exemplary risk management system 1600 (also referred to herein as system 1600). System 1600 may include risk engine 1602, one or more data sources 1604 and one or more data recipients 1606. Risk engine 1602, data source(s) 1604 and data recipient(s) 1606 may be communicatively coupled via one or more communication networks 1608. The one or more networks 1608 may include, for example, a private network (e.g., a local area network (LAN), a wide area network (WAN), intranet, etc.) and/or a public network (e.g., the internet).

Each of risk engine 1602, data source(s) 1604, and data recipient(s) 1606 may comprise one or more computing devices, including a non-transitory memory storing computer-readable instructions executable by a processing device to perform the functions described herein. In some examples, risk engine 1602 may be embodied on a single computing device. In other examples, risk engine 1602 may refer to two or more computing devices distributed over several physical locations, connected by one or more wired and/or wireless links.

Data source(s) 1604 may include any suitable source of data and/or information relating to risk factor data for one or more financial products of one or more portfolios and associated with one or more currencies. In general, data source(s) 1604 may comprise a server computer, a desktop computer, a laptop, a smartphone, tablet, or any other user device known in the art configured to capture, receive, store and/or disseminate any suitable data. In one non-limiting example, data source(s) 1604 include sources of electronic financial data. Data and/or information from data source(s) 1604 may include current (e.g., real-time data) as well as historical data. In some examples, the data/information may include data for contract and instrument specifications for one or more financial products (e.g., ETD products). In some examples, data source(s) 1604 may include one or more electronic exchanges, or any other suitable internal or external data source that may either push data to risk engine 1602 or from which risk engine 1602 may pull data relating to risk factor data. In general, risk factor data may be defined as a representation of relevant market risk. Risk factor data may be used for pricing financial instruments in the calculation of, for example, instrument profit and loss, cash rates, forward rate agreements (FRAs), Swaps (e.g., eur otc risk factors, GBP OTC risk factors, USD OTC risk factors), ETD linear risk factors (e.g., STIR future-Eur, GBP, USD, CHF) (quarterly, serial), bond futures, GCF repo, ETD option risk factors-options on STIR futures, mid-curve options on STIR futures, options on bond futures (e.g., Eur, GBP) and ETD FX risk factors.

In addition to the risk factor data, data source(s) 1604 may provide additional data including, without being limited to, trading volume, open interest, bid-ask spread information and spot FX rates. The additional information may be used by LRC model 1618 to determine one or more LRC values.

Data recipient(s) 1606 may include any suitable computer device for displaying and/or interacting with risk reporting results that may be provided by risk engine 1602. Data recipient(s) 1606 may be associated with any individual and/or entity for which risk reporting results may be useful for managing risk associated with one or more financial products. In some examples, data recipient(s) 1606 may include user interface 1634 (e.g., a graphical user interface (GUI)) comprising risk dashboard 1636. Risk dashboard 1636 may be configured to display summary reports of risk data (e.g., daily risk reports including initial margin(s) and LRC value(s) associated with one or more portfolios, risk analytics, other model information). In some examples, user interface 1634 (via risk dashboard 1636) may allow a particular data recipient to not only view the risk data reports, but may also allow the data recipient to interact with the risk data reports and/or to interact with risk engine 1602. For example, a specially permissioned administrator may be configured to interact with one or more modules of risk engine (e.g., synthetic data generator 1626, model calibration module 1628, model testing module 1630) to analyze and/or adjust one or more parameters of model system 1614.

Risk engine architecture 1602 may include one or more data source interfaces 1610, controller 1612, model system 1614, report generator/distributer 1620, one or more data recipient interfaces 1622, one or more databases 1624, synthetic data generator 1626, model calibration module 1628 and model testing module 1630. Controller 1612 may be specially configured to control operation (via execution of programming logic) of one or more of data source interface(s) 1610, model system 1614, report generator/distributer 1620, data recipient interface(s) 1622, database(s) 1624, synthetic data generator 1626, model calibration module 1628 and model testing module 1630. Controller 1612 may include without being limited to, a processor, a microprocessor, a central processing unit, an application specific integrated circuit (ASIC), a field programmable gate array (FPGA), a digital signal processor (DSP) and/or a network processor.

Risk engine 1602 may comprise one or more processors configured to execute instructions stored in a non-transitory memory (such as shown in FIG. 52). It should be understood that risk engine 1602 refers to a computing system having sufficient processing and memory capabilities to perform the specialized functions described herein.

Data source interface(s) 1610 may comprise at least one interface (e.g., an electronic device including hardware circuitry, an application on an electronic device) for communication with data source(s) 1604. In some example, data source interface(s) 1610 may be configured to be specially formatted for communication with particular data source(s) 1604. In some examples, data source interface(s) 1610 may be configured to obtain data pushed from among one or more of data source(s) 1604. In some examples, data source interface(s) 1610 may be configured to poll one or more of data source(s) 1604 for data, for example, at predefined times, predefined days, predefined time intervals, etc. In some examples, data obtained via data source interface(s) 1610 may be stored in database(s) 1624. In some examples, at least a portion of the obtained data may be provided to model system 1614.

Model system 1614 may include IRM 1616 and LRC model 1618. In general each of IRM 1616 and LRC model 1618 may be comprised as a specialized set of computer-readable instructions (i.e., a set of specialized rules) for respectively determining an initial margin and a LRC value for one or more portfolios of financial products across one or more currencies.

Figure 17:
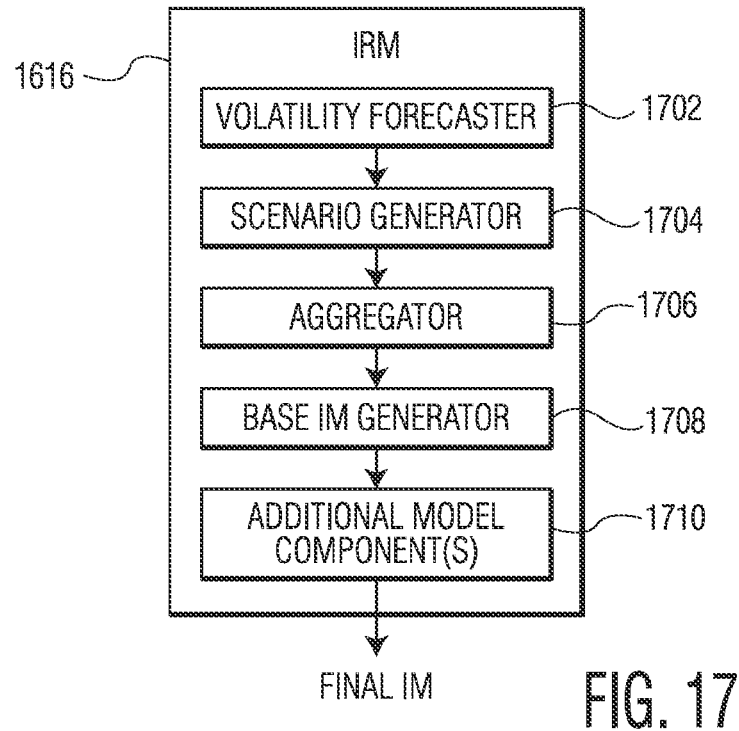
FIG. 17 is a functional block diagram of an example margin model of the risk management system shown in FIG. 16 according to the present disclosure.

Referring to FIG. 17, a functional block diagram of example IRM 1616 is shown. IRM 1616 may include volatility forecaster 1702, scenario generator 1704, aggregator 1706, base IM generator 1708 and one or more additional model components 1710. In general, IRM 1616 may be configured to receive risk factor data representing market risk for one or more particular products. IRM 1616 may leverage appropriate pricing functions, to price any contract value starting from a simulated risk factor time series. More specifically, IRM 1616 may be configured to determine an exposure which may then be aggregated at the portfolio level to produce a portfolio-level initial margin. The portfolio-level initial margin may be used to determine a risk exposure.

Volatility forecaster 1702 may be configured to receive risk factor data, including historical data. Based on the risk factor data, volatility forecaster 1702 may be configured to scale historical (raw) risk factor returns by volatility, based on current risk factor values (e.g., risk factor values associated with a current day). Volatility forecaster 1702 may also be configured to generate one or more risk factor scenarios based on the volatility-scaled risk factor returns.

Scenario generator 1704 may be configured to receive the risk factor scenario(s) (from volatility forecaster 1702). Based on the risk factor scenario(s), scenario generator 1704 may be configured to generate one or more price scenarios at the instrument level. In addition, scenario generator 1704 may be configured to generate one or more profit and loss scenarios. The profit and loss scenarios may be generated relative to a current (e.g., today's) risk factor derived price.

Aggregator 1706 may be configured to receive the individual profit and loss scenarios at the instrument level (from scenario generator 1704). Aggregator 1706 may be configured to aggregate (e.g., combine) the instrument-level profit and loss scenarios to obtain one or more profit and loss scenarios at the portfolio level.

Base IM generator 1708 may be configured to receive the portfolio-level profit and loss scenarios. Base IM generator 1708 may be configured to determine a base initial margin from a distribution determined from the portfolio-level profit and loss scenario(s), at a predefined percentile.

Additional model component(s) 1710 may include one or more components that may be applied to the base initial margin (determined by base IM generator 1708) to obtain a final initial margin. In some examples, additional model component(s) 1710 may include a correlation stress component, a diversification benefits component and a currency allocation component (each described further below).

IRM 1616 is described further below with respect to FIGS. 20, 21, 22, 23A and 23B.

Figure 18:
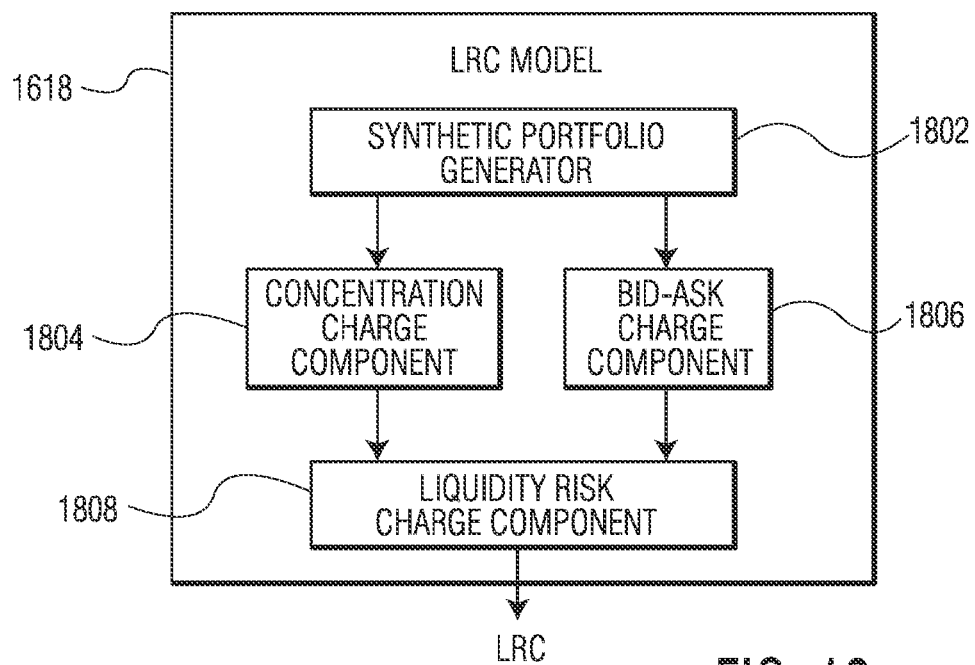
FIG. 18 is a functional block diagram of an example LRC model of the risk management system shown in FIG. 16 according to the present disclosure.

Referring next to FIG. 18, a functional block diagram of example LRC model 1618 is shown. LRC model 1618 may include synthetic portfolio generator 1802, concentration charge component 1804, bid-ask charge component 1806 and liquidity risk charge component 1808. In general, LRC model 1618 may be configured to receive information relating to trading volume, open interest, bid-ask spread(s), spot FX rates and one or more profit and loss vectors associated with one or more financial products. In some examples, the trading volume information, open interest information, bid-ask spread information and spot FX rate information may be obtained from among data source(s) 1604 (which may be stored in database(s) 1624). The profit and loss vector(s) may be obtained from IRM 1616. The set of received data may be used by LRC model 1618 to determine any LRC values for one or more portfolios.

Synthetic portfolio generator 1802 may be configured to receive the set of received data (e.g., volume, interest, spread, FX rates and vectors) and may be configured to generate two different representations of a portfolio, based on representative instruments. One of the portfolio representations may be based on a Delta method and the other portfolio representation may be based on a VaR technique. Both representations are described further below.

Concentration charge component 1804 may receive the two portfolio representations from synthetic portfolio generator 1802. Concentration charge component 1804 may be configured to determine a concentration charge for the concentrated representative instruments for each of the two portfolio representations.

Bid-ask charge component 1806 may receive the two portfolio representations from synthetic portfolio generator 1802. Bid-ask charge component 1806 may be configured to determine a bid-ask charge for the representative instrument positions for each of the two portfolio representations.

Liquidity risk charge component 1808 may be configured to receive the concentration charge (from concentration charge component 1804) and the bid-ask charge (from bid-ask charge component 1806). Liquidity risk charge component 1808 may be configured to determine the LRC value(s) based on a sum of the concentration charge and the bid-ask charge.

LRC model 1618 is described further below with respect to FIGS. 24-26.

Referring back to FIG. 16, report generator/distributer 1620 may be configured to receive one or more initial margins (from IRM 1616) and one or more LRC values (from LRC model 1618). In some examples, report generator/distributer 1620 may be configured to receive additional information from among one or more of database(s) 1624, synthetic data generator 1626, model calibration module 1628 and model testing module 1630. Report generator/distributer 1620 may be configured to create one or more summary risk reports from among the received information and may distribute the report(s) to one or more among data recipient(s) 1606 (via data recipient interface(s) 1622). The summary risk reports may include, for example, daily risk reports, periodically distributed reports (e.g., according to any predefined time interval) and/or reports based on one or more predetermined conditions (e.g., detection of an extreme event). In some examples, the report(s) may include one or more data analytics associated with one or more portfolios.

In some examples, report generator/distributer 1620 may be configured to distribute report(s) to particular ones of data recipient(s) 1606 at different distribution times (e.g., based on predetermined data recipient characteristic). In some examples, report generator/distributer 1620 may be configured to distribute reports to data recipient(s) 1606 at a same predetermined time. In some examples, report generator/distributer 1620 may be configured to format the risk report(s) for presentation on particular ones of data recipient(s) 1606 (including, in some examples, differently formatted report(s) for presentation on different user interfaces 1634 of different data recipient(s) 1606).

Data recipient interface(s) 1622 may comprise at least one interface (e.g., an electronic device including hardware circuitry, an application on an electronic device) for communication with data recipient(s) 1606 (e.g., via user interface 1634). In some examples, data recipient interface(s) 1622 may be configured to be specially formatted for communication with particular ones of data recipient(s) 1606. In some examples, data recipient interface(s) 1622 may be configured to receive user input from among data recipient(s) 1606 (e.g., via user interface 1634).

Database(s) 1624 may be configured to store any data that may be suitable for use by risk engine 1602. Data stored in database(s) 1624 may include, without being limited to, one or more among input data (e.g., risk factor data, volume data, open interest data, spread data, FX rate data) from among data source(s) 1604, one or more values derived by IRM 1616 and/or LRC model 1618, one or more parameters used by IRM 1616 and/or LRC model 1618, information associated with data source(s) 1604, information associated with data recipient(s) 1606, synthetic data generated by synthetic data generator 1626 and parameters of and/or values determined by one or more of model calibration module 1628 and model testing module 1630. Database(s) 1624 may be configured according to any suitable data structure.

Synthetic data generator 1626 may be configured to create one or more synthetic data sets. The synthetic data may be configured to model benign conditions as well as extreme events. In addition to utilizing realized market data, risk engine 1602 may be configured to create "synthetic" (i.e. simulated) data, in order to explore model behavior in a controlled environment. With realized data, statistical parameters describing the observed distribution must be estimated as the true population generating the data is not known. With synthetic data, the population and its statistical parameters are known as they are directly created. In an example embodiment, the synthetic market environments generated include: benign data and regime change data. The benign data may be configured to capture the state of the world where markets are well behaved. This represents a simplified view of the world where no extreme events occur day to day other than what the normal distribution will allow. Regime change data may be configured to capture the state of the world where the market is well behaved initially, then moves into stress abruptly, and then moves back to a well behaved market state. Synthetic data generator 1626 is described further below with respect to FIG. 27.

Model calibration module 1628 may be configured to calibrate one or more of IRM 1616 and LRC model 1618. In some examples, model calibration module 1628 may be configured to calibrate IRM 1616 and/or LRC model 1618 based on real data and synthetic data obtained from synthetic data generator 1626. Model calibration module 1628 is described further below.

Model testing module 1630 may be configured to test IRM 1616 across multiple categories. According to an example embodiment, the testing categories may include fundamentals testing, backtesting, pro-cyclicality testing, sensitivity testing (including a rolling backtest analysis and a parameter sensitivity analysis), incremental testing, model comparison with historical simulation and assumptions backtesting. In some examples, model testing module 1630 may be configured to test IRM 1616 based on real data and synthetic data obtained from synthetic data generator 1626. Model testing module 1630 is described further below.

Although not shown, risk engine 1602 may include one or more components of risk engine architecture 100 (FIG. 1). For example, risk engine 1602 may include one or more of a data filter (to clean erroneous data, fill gaps in data, convert raw data into a time series, etc.), portfolio bucketing and portfolio compression.

Some portions of the above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Those skilled in the art will appreciate that risk engine 1602 may be configured with more or less modules to conduct the methods described herein. As illustrated in FIGS. 19-25 and 27, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 19-25 and 27 may be performed by one or more specialized processing components associated with components 1602-1636 of system 1600 of FIG. 1. FIGS. 19-25 and 27 are described with respect to FIGS. 16-18. With respect to FIGS. 19-25 and 27, although these flowcharts may illustrate a specific order of method steps, it is understood that the illustrated methods are exemplary, and that the order of these steps may differ. Also, in some examples, two or more steps may be performed concurrently or with partial concurrence.

Figure 19:
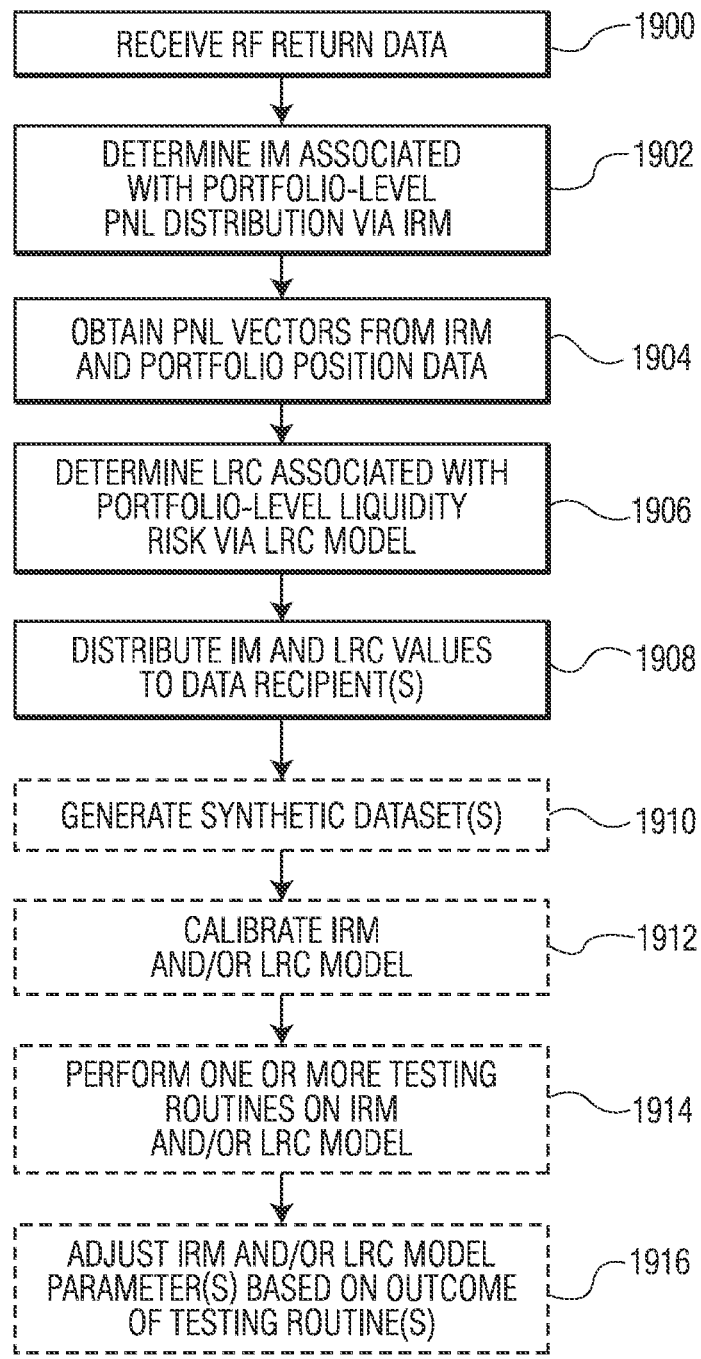
FIG. 19 is a flowchart diagram of an example method of determining risk exposure and adjust parameters of the model system shown in FIG. 16 according to the present disclosure.

Referring next to FIG. 19, a flowchart diagram illustrating an example method of operating model system 1614 to determine risk exposure and to adjust one or more parameters of model system 1614 is shown. At step 1900, model system 1614 may receive risk factor return data. As discussed above, the risk factor return data may be obtained from among data source(s) 1604 and/or via database(s) 1624. In addition to the risk factor data, model system 1614 may also obtain input data (e.g., trading volume information, open interest information, bid-ask spread information and spot FX rate information) for use by LRC model 1618 (e.g., from database(s) 1624 and/or data source(s) 1604).

At step 1902, at least one initial margin associated with a portfolio-level profit and loss (PNL) distribution may be determined, for example, by IRM 1616, based on the received risk factor return data. Step 1902 is described further below with respect to FIG. 20.

At step 1904, one or more profit and loss (PNL) vectors may be obtained by LRC model 1618, from IRM 1616. At step 1906, LRC model 1618 may determine one or more LRC values associated with a portfolio-level liquidity risk, for one or more portfolios. Steps 1904 and 1906 are described further below with respect to FIG. 24.

At step 1908, the initial margin(s) and LRC value(s) may be distributed to one or more among data recipient(s) 1606. For example, report generator/distributer 1620 may generate a risk report based on the initial margin(s) (determined at step 1902) and the LRC value(s) (determined at step 1906) and may distribute the risk report to data recipient(s) 1606 via data recipient interface(s) 1622.

At optional step 1910, one or more synthetic datasets may be generated, for example, by synthetic data generator 1626. In some examples, the synthetic dataset(s) may be generated based at least in part on user input (e.g., via risk dashboard 1636 of user interface 1634).

At optional step 1912, one or more of IRM 1616 and LRC model 1618 may be calibrated (e.g., various parameters and/or settings of IRM 1616 and/or LRC model 1618 may be set), for example, by model calibration module 1628. In some examples, one or more models of model system 1614 may be calibrated using at least one of real data and synthetic data (e.g., as generated at step 1910). In some examples, the calibration may be performed based at least in part on user input (e.g., via risk dashboard 1636 of user interface 1634).

At optional step 1914, one or more testing routines may be performed on at least one of IRM 1616 and LRC model 1618, for example, by model testing module 1630. In some examples, one or more models of model system 1614 may be tested using at least one of real data and synthetic data (e.g., as generated at step 1910). In some examples, the testing may be performed based at least in part on user input (e.g., via risk dashboard 1636 of user interface 1634). Example testing routines are described further below.

At optional step 1916, one or more parameters of IRM 1616 and/or LRC model 1618 may be adjusted based on outcome(s) of the testing routine(s) (determined in step 1914). In some examples, the adjustment may be performed based at least in part on user input (e.g., via risk dashboard 1636 of user interface 1634).

Generation of Initial Margin by the Margin Model

Figure 20:
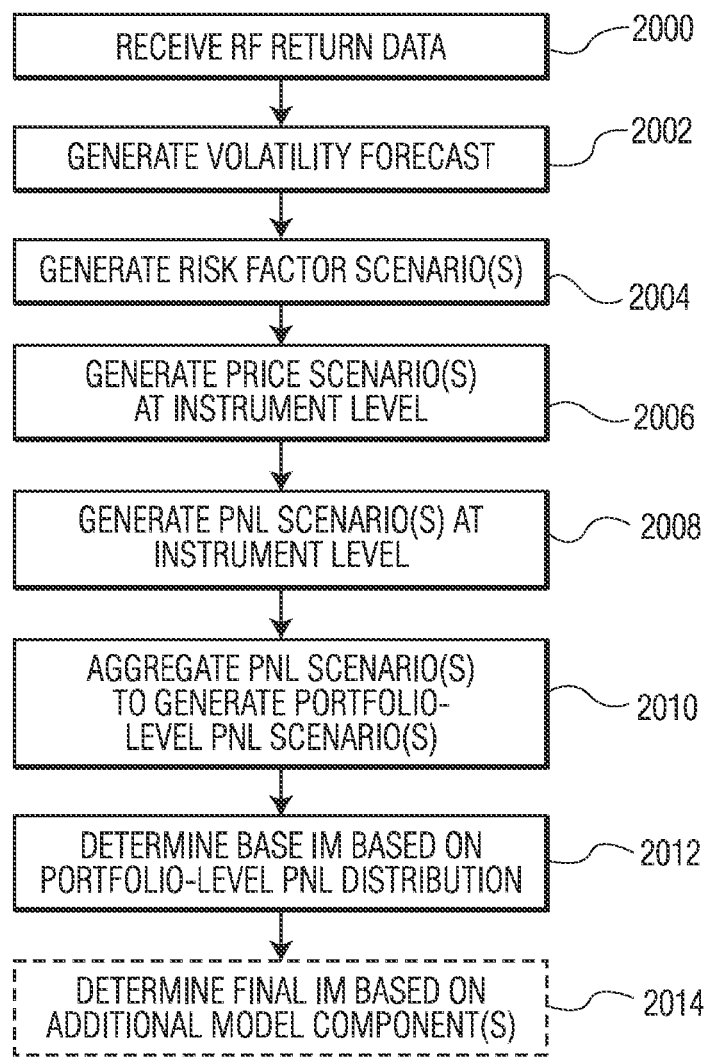
FIG. 20 is a flowchart diagram of an example method of determining at least one initial margin according to the present disclosure.

Referring next to FIG. 20, a flowchart diagram illustrating an example method of determining at least one initial margin (step 1902 in FIG. 19) is shown. The steps of FIG. 20 may be performed by IRM 1616. At step 2000, risk factor (RF) return data may be received by IRM 1616. At step, 2002, a volatility forecast may be generated, for example, by volatility forecaster 1702. In general, a volatility forecast may be generated by scaling the historical (raw) risk factor returns by volatility. Volatility forecasting is described further below.

At step 2004, one or more risk factor scenarios may be generated, for example, by scenario generator 1704. The risk factor scenarios may be based on the volatility forecast, and where risk factor scenarios may be generated based on current risk factor values, for example, by scenario generator 1704.

At step 2006, one or more price scenarios at the instrument level may be generated from the risk factor scenarios, for example, by scenario generator 1704. At step 2008, one or more profit and loss (PNL) scenarios at the instrument level may be generated, for example, relative to a current risk factor derived price.

At step 2010, the individual PNL scenario at the instrument level (step 2008) may be combined to obtain the profit and loss scenarios at the portfolio level, for example, by aggregator 1706. At step 2012, a base IM may be determined, for example, by base IM generator 1708, from a portfolio-level PNL distribution at a predefined percentile. The Portfolio-level PNL distribution may be determined from the portfolio-level PNL scenarios determined at step 2010. At optional step 2014, a final IM may be determined, for example, by one or more additional components 1710). For example, the final IM may be determined by applying one or more of a correlation stress component, a diversification benefit component, and a currency allocation component (described further below).

Figure 21:
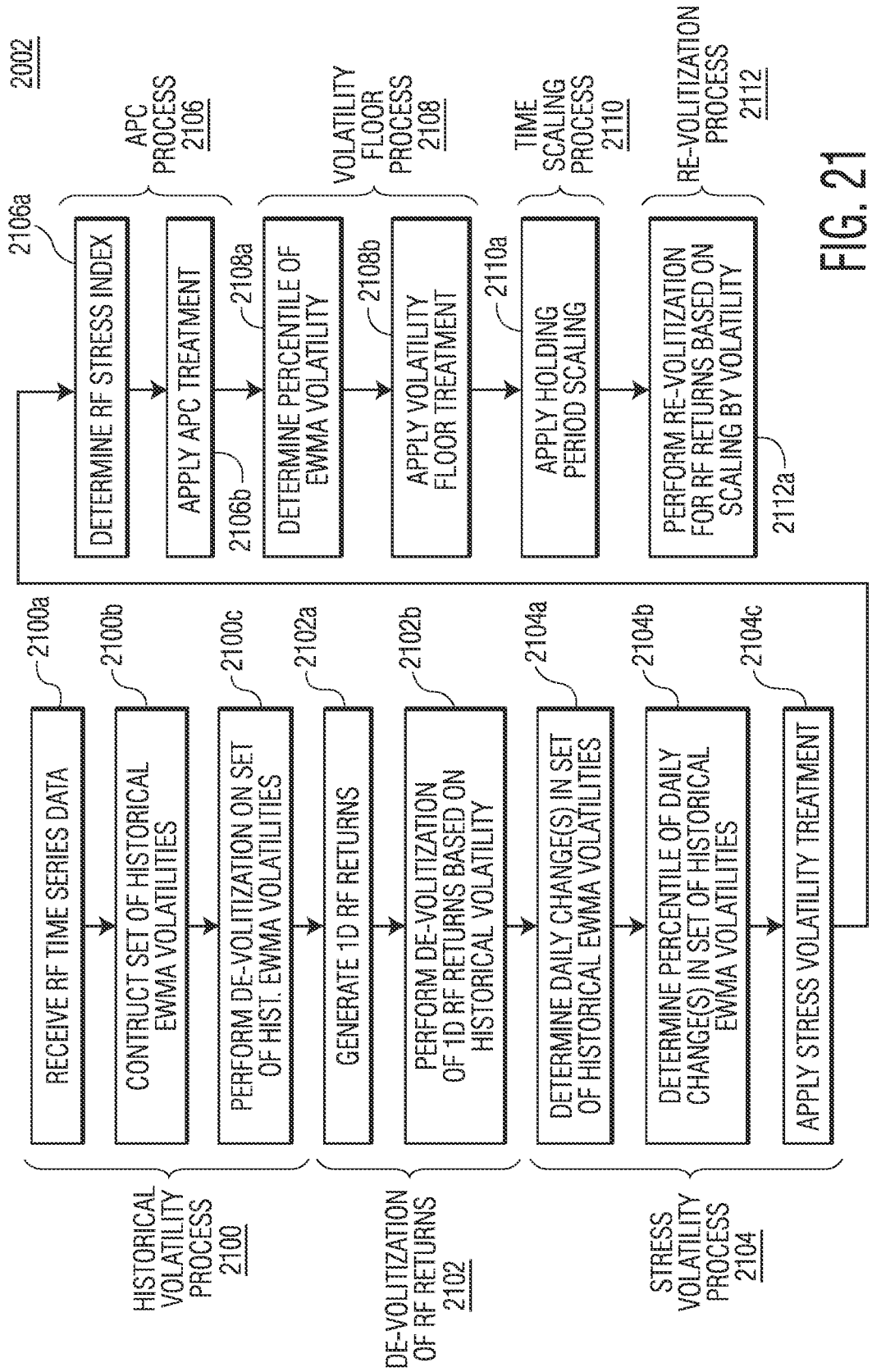
FIG. 21 is a flowchart diagram of an example method of generating a volatility forecast according to the present disclosure.
Figure 22:
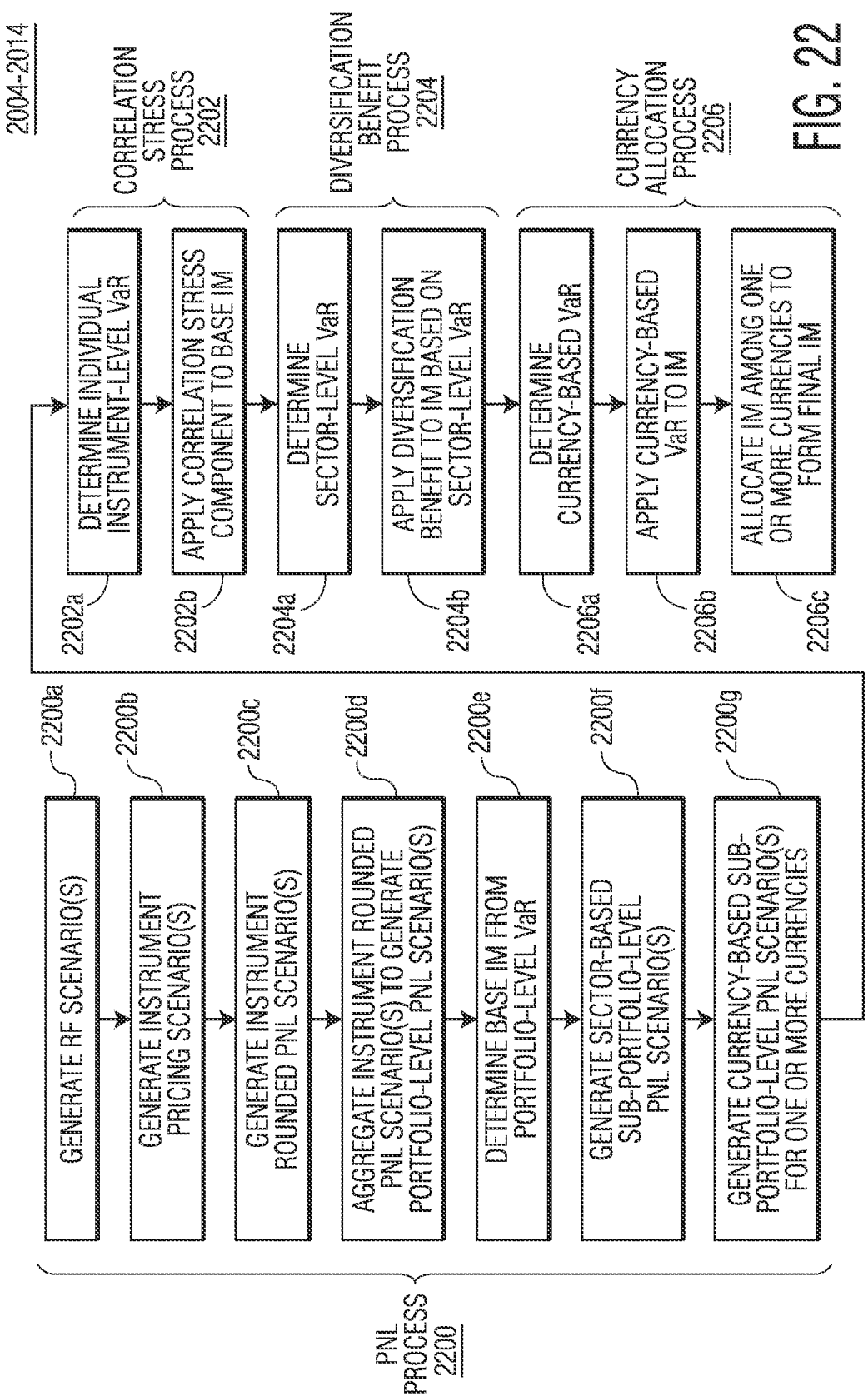
FIG. 22 is a flowchart diagram illustrating an example method of determining an initial margin based on a volatility forecast according to the present disclosure.
Figure 23A:
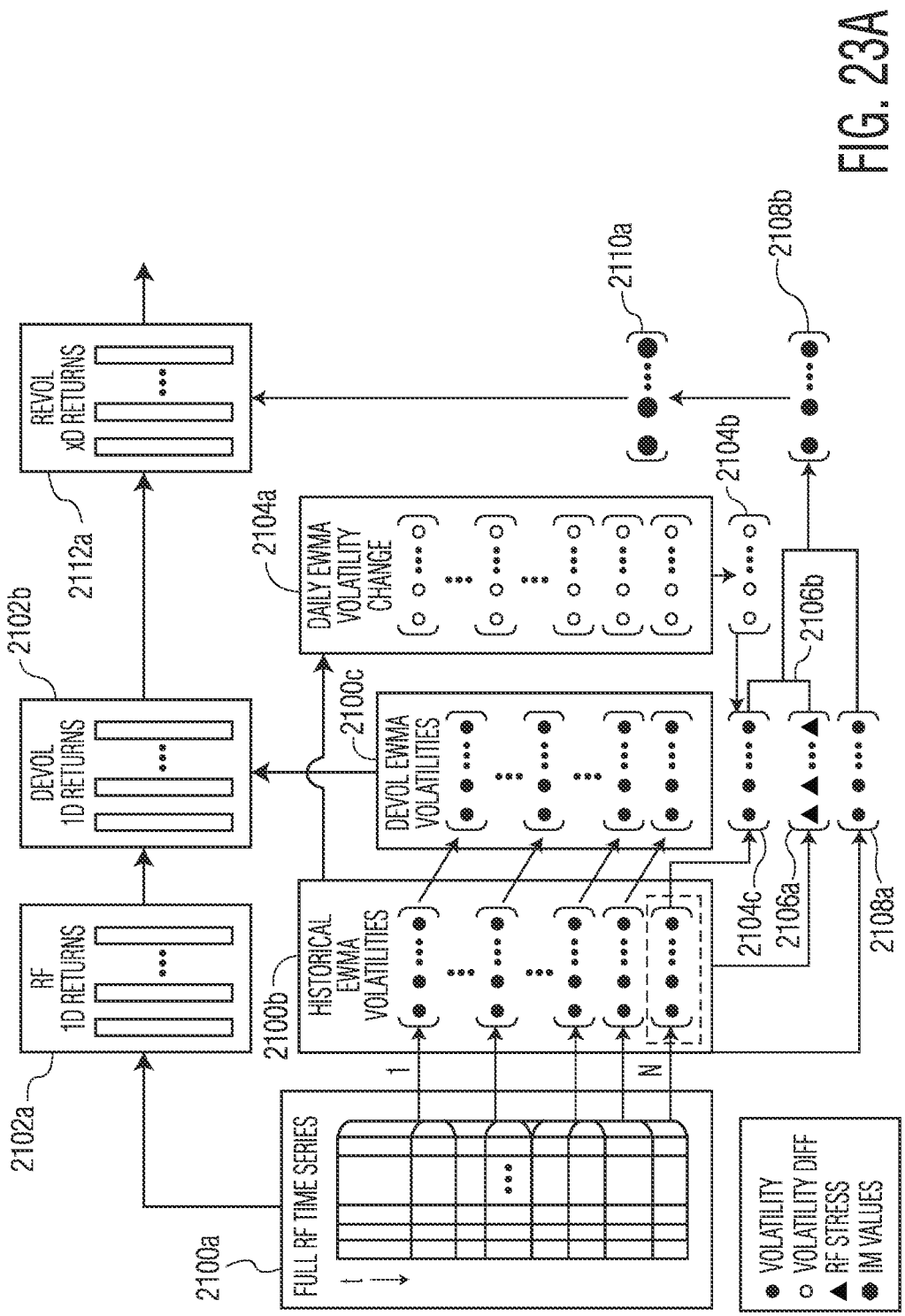
FIG. 23A is a functional block diagram of an example signal flow for determining the volatility forecast in connection with FIG. 21 according to the present disclosure.
Figure 23B:
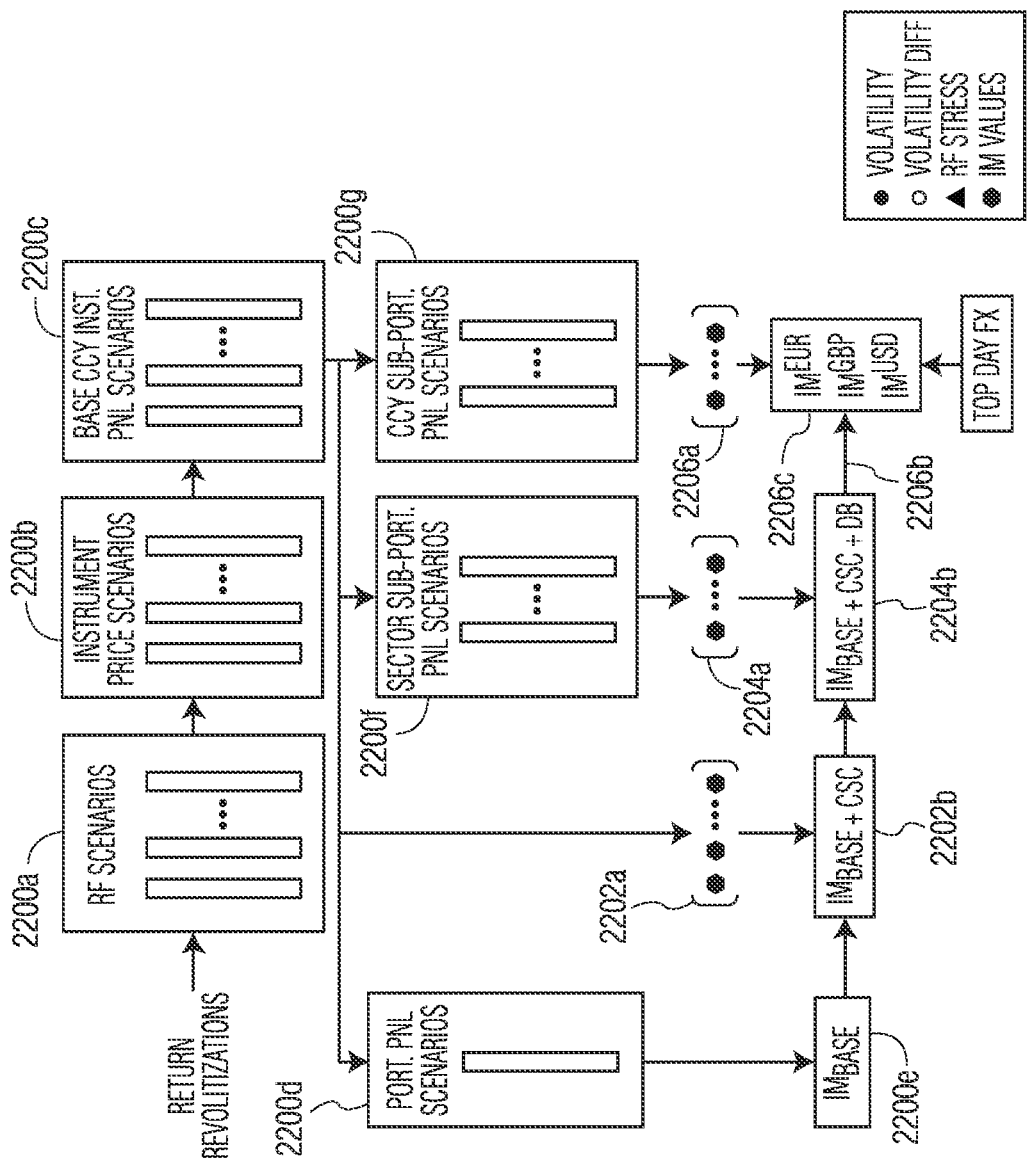
FIG. 23B is a functional block diagram of an example signal flow for determining an initial margin in connection with FIG. 22 according to the present disclosure.

Referring next to FIGS. 21, 22, 23A and 23B, a more detailed example method of determining an initial margin is shown. In particular, FIG. 21 is a flowchart diagram illustrating an example method of generating a volatility forecast (step 2002); FIG. 22 is a flowchart diagram illustrating an example method of determining the initial margin based on the volatility forecast (steps 2004-2014); FIG. 23A is a functional block diagram illustrating an example signal flow for determining the volatility forecast shown in FIG. 21; and FIG. 23B is a functional block diagram illustrating an example signal flow for determining the initial margin shown in FIG. 22. As a note, in some portions of the disclosure, volatility is described as "vol" solely for convenience in notation.

Referring to FIGS. 21 and 23A, generation of the volatility forecast (step 2002) is described. Regarding the volatility forecast (step 2002), the volatility forecast may involve a combination of historical volatility process 2100, de-volatilization of risk factor returns, 2102, stress volatility process 2104, APC process 2106, volatility floor process 2108, time scaling process 2110 and re-volitization process 2112, Processes 2100-2112 are described in greater detail below.

In general, historical volatility process 2100 may include step 2100a of receiving risk factor time series data for N time series (where N is greater than or equal to one), step 2100b of constructing a set of historical EWMA volatilities based on the set of N time series and step 2100C of performing de-volitization on the set of historical EWMA volatilities.

De-volitization of risk factor returns process 2102 may include step 2102a of generating one-dimensional (1D) risk factor returns and step 2102b of performing a de-volitization of the 1D risk factor returns, based on historical volatility(s) (based on step 2100c).

Stress volatility process 2104 may include step 2104a of determining one or more daily changes in the set of historical EWMA volatilities (determined at step 2100b), step 2104b of determining a percentile of daily change(s) in the set of historical EWMA volatilities (based on step 2104a), and step 2104c of applying a stress volatility treatment.

APC process 2106 may include step 2106a of determining an RF stress index and step 2106b of applying an APC treatment (based on step 2106a).

Volatility floor process 2018 may include step 2108a of determining a percentile of EWMA volatility, and step 2108b of applying a volatility floor treatment.

Time scaling processing 2110 may include step 2110a of applying holding period scaling. Re-volitization process 2112 may include step 2112a of performing re-volitization for the risk factor returns (determined at step 2102a) based on scaling by volatility.

In general, the volatility forecasting may involve a VaR approach. At a high level, a VaR approach involves measuring market risk whereby the return of a portfolio is forecasted using probability and statistical models. This type of statistical approach is in contrast to a "scenario analysis" approach to measuring market risk, where portfolio returns are forecasted for specific scenarios of input parameters. The advantage of using a VaR approach over a scenario analysis approach is that it describes a worst loss for a given probability.

The VaR technique includes several advantages. The VaR corresponds to an amount that could be lost with some chosen probability. It measures the risk of the risk factors as well as the risk factor sensitivities. It can be compared across different markets and different exposures. It is a universal metric that applies to all activities and to all types of risk. It can be measured at any level, from an individual trade or portfolio, up to a single enterprise-wide VaR measure covering all the risks in the firm as a whole. When aggregated (to find the total VaR of larger and larger portfolios) or disaggregated (to isolate component risks corresponding to different types of risk factor) it takes account of dependencies between the constituent assets or portfolios.

In general, the VaR may be determined by: specifying a confidence level q or alternatively the significance level (1−q), specifying a holding period h (also referred to as the risk horizon, or the Margin Period of Risk (MPOR)) in business days and identifying the probability distribution of the profit and loss (P&L) of the portfolio.

For IRM 1616. a full valuation approach is selected, meaning portfolios may be priced for the scenarios under consideration, rather than using a local valuation approach that approximates the change in the portfolio value using local sensitivities. A primarily non-parametric approach is also selected, meaning that the P&L distribution is constructed based on empirical data, rather than making a distribution assumption. In general, the choice of a full valuation approach may be preferred because approaches like the delta-normal approach capture linear risk exposures only. In addition, both the full valuation approach and non-parametric approach are feasible because a substantial risk factor history is stored from which to derive scenarios.

The particular resolution method chosen for IRM 1616 is a filtered Historical Simulation (FHS) approach. This approach allows for the modeling of these stylized properties. In describing the FHS resolution method, the Historical Simulation (HS) approaches are examined first and then it is distinguished how FHS improves on HS. How IRM 1616 is a specific variation of FHS is then shown.

For implementing historical simulation, consider a length of a lookback window, historical weighting for sampling, sampling scheme and any time scaling or time aggregation. The length of the lookback window refers to how many historical returns are used looking backward from the value date T in the construction of the P&L distribution. In general, the error of the VaR estimator decreases as the number of available observations increases. For example, computation of the 1% VaR using a distribution with only 100 empirical observations is subject to more estimation error than if 1,000 observations were available. For IRM 1616, the lookback window was chosen, in one example, to be 1,250. The potential drawback of a longer lookback window is that returns far back in the past have equal influence at the percentile calculation step compared to more recent observations.

A potential way to remedy this drawback is through the choice of historical weighting. A choice for equal weighting assigns the same probability to each past observation. For IRM 1616, equal historical weighting is selected, but note that FHS provides an alternate way to remedy the drawback of past history not representing more recent market conditions.

In an example embodiment, IRM 1616 uses a sampling without replacement technique. Sampling without replacement represents a straightforward approach, which builds the empirical distribution directly from the historical observations in a one-to-one manner. That is, if the lookback window contains 1,000 return observations, then the simulation results in an empirical P&L distribution containing 1,000 observations exactly reflecting each historical return observation.

For sampling without replacement, time scaling may be accomplished by estimating a 1-day VaR and scaling it up to the required h-day time horizon. This is due to limited data availability since estimating a multiday time horizon VaR with multiday returns typically requires a longer history. For IRM 1616, an option for time scaling is to scale a 1-day VaR up to a desired h-day time horizon.

One methodology for time scaling the VaR estimate, which essentially represents a quantile of an empirical return distribution, is using the square-root-of-time rule. For IRM 1616, the square-root-of-time rule is used only to scale the one-day volatility forecast to an h-day volatility forecast. For this case, the only assumptions made are that the one-day returns are uncorrelated and have constant variance over the holding period.

An enhancement to HS is Filtered Historical Simulation. FHS may be distinguished from HS by defining the term filtered to mean that rather than sampling from a set of raw returns, sampling is done from a set of shocks or innovations, $z_t$, that are filtered by a conditional volatility:

$$z_t = \frac{r_t}{\sigma_{cond;t}} \quad (69)$$

The conditional volatility $\sigma_{cond;t}$ can be estimated using various models, including the Exponentially Weighted Moving Average and the Generalized Auto-Regressive Conditional Heteroskedastic models. Note that the filtering volatility is the current estimated conditional volatility at the time of the return. To account for current market conditions the shocks are multiplied by the one-day ahead (T+1) volatility forecast estimated on the value date T. Thus a set of scaled returns $\tilde{r}_t$ would be constructed as follows:

$$\tilde{r}_t = \frac{\sigma_{cond;T+1}}{\sigma_{cond;t}} r_t \quad (70)$$

Note that this approach can be used for sampling with or without replacement. In the case of sampling with replacement, multiday returns can be generated using the sampled shocks and a modeled conditional volatility/mean updated at each time step. For sampling without replacement, the scaled returns are used to calculate the VaR directly by applying them to a portfolio on the value date T and calculating a P&L distribution. This filtering and forecasting process is referred to more generally as applying a volatility adjustment. The filtering and forecasting processes are also referred to as de-volatilization and re-volatilization. In IRM 1616, the EWMA conditional volatility is used for filtering returns at each time t. For forecasting, the EWMA conditional volatility is combined with a Stress Volatility Component and Volatility Floor to derive a T+1 volatility forecast.

Advantages of FHS are similar to HS, but with the additional advantages that it adjusts for the current market conditions and allows for a conditional volatility model which can account for heteroscedasticity of volatility (i.e. non-constant variance through time).

In summary, the VaR resolution method chosen for IRM 1616 includes the following basic features: historical simulation via equally weighted sampling without replacement; filtering via EWMA conditional volatility, volatility forecasting via EWMA conditional volatility, floor, and stress components; and time scaling of the volatility forecast via the square-root-of-time rule.

Indexing

The scaling operations described below are performed for all of the f=1, 2, . . . , F risk factors unless otherwise noted, with F denoting the total number of Risk Factors including foreign exchange (FX).

Indexing across time is somewhat more involved, but essentially involves five primary dates. These dates are:

The First Date (FD): the first date with Risk Factor return data available in history.

The Last Date (LD): the last date with Risk Factor return data available in history.

The First Value Date (FVD): the first date within the range {FD, . . . , LD} for which sufficient Risk Factor return data exist to compute an initial margin given a chosen VaR lookback window length.

The First Backtest Date (FBD): the first date within the range {FVD, . . . , LD} for which an initial margin calculation for backtesting purposes is performed.

The current Value Date (VD): a date in the range {FVD, . . . , LD} that represents the current calculation date for initial margin.

Importantly, the historical time period covered is identical across all Risk Factors in scope, such that any one row vector chosen from the data matrix represents the same date for all Risk Factors.

Historical indexing of time is defined with t=1, . . . , $T_{max}$ where t=1 is the first date available in history (FD) and $t=T_{max}$ is the last date available in history (LD). The current Value Date is denoted as t=T.

For operations with returns within the lookback window $\tau$=1, . . . , W are used. For dates where initial margin is calculated, W=$W_0$ where $W_0$ is the default VaR lookback window. For calculating EWMA volatility estimates on a given Value Date, W can be smaller than $W_0$ for a date prior to the FVD; in these cases W=t.

For initial margin calculation, $W_0$ Risk Factor scenarios may be based on $W_0$ daily Risk Factor returns. As such, the FVD is the first date t where $W_0$+1 daily Risk Factor returns are available, i.e. at time t=$W_0$+1.

For operations involving instruments, the instruments are indexed by i=1, 2, . . . , N where N is the total number of instruments in a given portfolio.

Risk Factor Return Time Series Generation

For each Risk Factor f at time t, the daily return is calculated. For Risk Factors which are interest rates (including cash rates, swaps, FRAs, STIR futures, Repo futures, and bond futures), what are generally known as one-day "absolute returns" are calculated, that is, one-day changes in yield levels $y_t$ so that $$r_t = y_t - y_{t-1} \quad (71)$$

At step 1208, message delay line system (e.g., message departure time module 212) may determine the TCC propagation delay by comparing the local timestamp (applied to the received message by timestamp module 210 via wall clock 204) to the remote timestamp included in the received message (applied by active CIP component 808). In other words, a difference between the local timestamp and the remote timestamp may be used to measure the TCC propagation delay for the message associated with a participant. Message departure time module 212 may store the TCC propagation delay in the participant record (in storage 218) as the participant delay offset.

For option volatility Risk Factors and FX Risk Factors, what are known as logarithmic, or log, returns are calculated as:

$$r_t = \ln\left(\frac{y_t}{y_{t-1}}\right) = \ln y_t - \ln y_{t-1} \tag{72}$$

as both volatility and FX are defined to be positive. To lighten the notation, any script references to risk factor f are omitted.

The return at position $\tau$ in the lookback window for historical date t is defined as:

$$r_{\tau,t} = r_{t-W+\tau} \ \forall \ \tau = 1, \ldots, W \tag{73}$$

De-Volatilization of Risk Factor Returns

The first step in the de-volatilization (DV) process is to obtain a set of historical next-day variance predictions $\{\sigma_{DV;t}^2\}$. For dates t=1, 2 . . . , M, the historical next-day variance predictions are calculated as the sample variance (ignoring the sample mean) based on the first M dates:

$$\sigma_{DV;L}^2 = \frac{1}{M} \sum_{\tau=1}^{M} r_\tau^2 \tag{74}$$

For each of the historical dates t=M+1, . . . , $T_{max}$ an EWMA variance updating process is used to perform EWMA de-volatilization. The initial seed for the EWMA de-volatilization on date t is set to be the sample variance (ignoring the sample mean) based on the lookback window W:

$$\sigma_{\tau=1,t}^2 = \frac{1}{W} \sum_{\tau=1}^{W} r_{t-W+\tau}^2 \tag{75}$$

For calculation of volatility estimates when t<$W_0$, W=t is set so that the EWMA process is run over a time period with less than $W_0$ returns. The EWMA variance updating process is written in its standard recursive form as $$\sigma_{\tau,t}^2 = \lambda \cdot \sigma_{\tau-1,t}^2 + (1-\lambda) \cdot r_{\tau-1,t}^2, \tag{76}$$

where $\tau=2, \ldots , W+1$ and where $0 \leq \lambda < 1$ is the EWMA Weighting (Lambda) parameter that assigns more weight to more recent observations (when it is strictly less than 1). The value of the EWMA variance $\sigma_{\tau,t}^2$ with $\tau=W+1$ is used to calculate the next-day variance prediction $\sigma_{DV;t}^2$ for historical date t:

$$\sigma_{DV;t}^2 = \sigma_{W+1,t}^2 \tag{77}$$

For a given Value Date T $\sigma_{DV;t}^2$ is computed for each t=T−W, T−W+1, . . . , T−1. Thus the set $\{\sigma_{DV;t}^2\}$ of historical next-day variance predictions and the corresponding set fa of historical next-day EWMA-DV volatilities are obtained.

As can be seen from the EWMA variance equation (76), the prediction for the next-day variance is a weighted average of two terms:

1. The Persistence term: This first term captures how much of the prior period volatility forecast should be used in the forecast for the next period. As an illustration, if 100% of the weight is assigned to this term ($\lambda$=1), the forecast volatility will remain static (at its prior level) regardless of the volatility experienced in the market today. In this case, if yesterday's forecast was for low volatility, and the market experienced high volatility today, the forecast would remain for low volatility.
2. The Reaction term: This second term captures how much current market volatility, as measured by the squared day-over-day return, should affect the volatility forecast. As an illustration, if 100% of the weight is assigned to this term (1−$\lambda$=1 so that $\lambda$=0), then the volatility forecast for tomorrow is always equal to today's market volatility. The lower the value of Lambda, the more reactive to today's market the volatility forecast becomes. This term serves as the updating term to incorporate a current view of volatility.

Both terms capture important features of the data, and neither extreme—Lambda zero or one—is typically justified in the interest rates market. A mixture of both is desirable.

Finally, each of the returns in the lookback window are scaled:

$$r_{DV;\tau,T} = \frac{r_{\tau,T}}{\sigma_{DV;T-W+\tau-1}} = \frac{r_{T-W+\tau}}{\sigma_{DV;T-W+\tau-1}}, \text{ for } \tau = 1, 2, \ldots , W \tag{78}$$

Re-Volatilization of Risk Factor Returns

The re-volatilization (RV) process applies the most current volatility estimate to each Risk Factor by scaling the returns using the Volatility Forecast. Unlike in the DV process, the RV forecast volatility is a constant that applies across the VaR window for a given Risk Factor f.

The RV process consists of the following three steps:
1) EWMA Volatility estimation for each Value Date
2) Forecast Volatility calculation, including calculation of the Volatility Floor, Stress Volatility Component and APC Treatment
3) Risk Factor return scaling using the Volatility Forecast.

EWMA Volatility Estimation

On any given Value Date t=T the EWMA-RV volatility estimate is the square root of the EWMA-DV variance estimate at time t=T:

$$\sigma_{RV;T} = \sqrt{\sigma_{DV;T}^2} = \sigma_{DV;T} \tag{79}$$

where $\sigma_{DV;T}^2$ is obtained using the EWMA process leading to equation (77) with t=T. The above EWMA volatility estimates are used in the previously described DV calculations as well as the subsequent calculations of the Volatility Floor and the Stress Volatility Component.

Volatility Floor

The volatility of the previous section is the margin model's prediction of future volatility to be realized over the holding period. To ensure overall a conservative margin estimate in a low market volatility environment, the forecast volatility is evaluated against a volatility floor on each value date.

The volatility floor $\sigma_{Floor}$ places a minimum value on the forecast volatility of each risk factor. In an effort to accommodate the unique volatility profiles of the risk factors, IRM 1616 provides each risk factor with its own volatility floor. The volatility floor is also anchored historically in that it always includes volatility estimates reaching back to the first date. In this way the volatility floor is also a function of time: as volatility increases (decreases), the volatility floor adapts to the current market environment by increasing (decreasing).

For a given value date T, the minimum is set so that the RV volatility never falls below a designated Volatility Floor percentile, $k_{floor}$, of the volatility estimates starting with the first estimate date where t=1 and moving up to the Value Date t=T:

$$\sigma_{Floor;T} = \text{percentile}(\{\sigma_{RV;t}\}_{1 \le t \le T}, k_{floor}), \quad T \ge M + K \tag{80}$$

Here K is a configurable parameter determining the minimum number of values needed for the percentile calculation (in one example, K is set at 750). Note that, in this example, percentile corresponds to the Microsoft Excel® (function=PERCENTILE.INC( )) with the percentile in this case set to $k_{floor}$.

To clarify, the volatility floor calculation is best illustrated with an example; for the purpose of illustration only the $k_{floor}$ percentile is set to 10%:

On the First Value Date there exist 1,251 individual $\sigma_{RV;T}$ estimates per Risk Factor. The 1,251 Value Date volatility estimates are ranked from smallest to largest, and the k*(n−1)+1=126$^{th}$ "observation" (rank) is chosen as the Volatility Floor for this First Value Date. The rank value in this case is calculated as the 126$^{th}$ smallest volatility.

On an arbitrary Value Date, Mar. 31, 2015, there exist 3,227 individual $\sigma_{RV;T}$ estimates per risk factor. The Volatility Floor is then calculated as the k*(n−1)+1=323.6$^{th}$ "observation" (rank), which is equal to the 323$^{rd}$ smallest sigma plus 0.6 times the difference between the 324$^{th}$ and 323$^{rd}$ smallest RV volatility.

Stress Volatility Component

IRM 1616 may be configured to ensure that, for the purpose of determining volatilities, periods of market stress are included.

The series of daily changes in the EWMA volatility estimates on each Value Date is defined as $\sigma_{RV;t} = \sigma_{RV;t} - \sigma_{RV;t-1}$. The percentile of these daily changes is computed to obtain:

$$\Delta\sigma_{RV;T} = \text{percentile}(\{d\sigma_{RV;t}\}_{2 \le t \le T}, k_{delta}), \quad T \ge M + K \tag{81}$$

where $k_{delta}$ is the Stress Volatility Update Percentile set to a level considered as stressed in financial markets. The term accounts for large daily changes in volatility.

The Stress Volatility Component for each risk factor f is calculated as follows:

$$\Delta\sigma_{stress;T} = \alpha_{APC;T} * \Delta\sigma_{RV;T} \tag{82}$$

where $\alpha_{APC;T}$ is the RF APC Index calculated as:

$$\alpha_{APC;T} = \begin{cases} 0 & \text{for } \sigma_{RV;T} \ge \sigma_{max;T} \\ \dfrac{\sigma_{max;T} - \sigma_{RV;T}}{\sigma_{max;T} - \sigma_{APC;T}} & \text{for } \sigma_{APC;T} < \sigma_{RV;T} < \sigma_{max;T} \\ 1 & \text{for } \sigma_{RV;T} \le \sigma_{APC;T} \end{cases} \tag{83}$$

$$\sigma_{max;T} = \max(\{\sigma_{RV;t}\}_{1 \le t \le T}), \quad T \ge M + K$$

$$\sigma_{APC;T} = \text{percentile}(\{\sigma_{RV;t}\}_{1 \le t \le T}, k_{APC}), \quad T \ge M + K$$

where $k_{APC}$ is the APC Index Percentile and where $\sigma_{max;T} > \sigma_{APC;T}$ at any T.

The RF APC Index $\alpha_{APC;T}$ acts in an anti-procyclical manner at the Risk Factor level, as can be seen in the definitions of the RF APC Index above: as the estimated volatility $\sigma_{RV;T}$ increases, the RF APC Index approaches and eventually reaches zero, so that the Stress Volatility Component also approaches and eventually reaches zero. At the same time, during periods of low volatility (up to the volatility threshold $\sigma_{APC;T}$), $\alpha_{APC;T}$ evaluates to 1 so that the full term $\Delta\sigma_{RV;T}$ applies.

It should be noted that IRM 1616 may not only rely on the Stress Volatility Component for its APC performance. Anti-procyclicality of initial margin is further achieved by implementing "Option (a)" of the EMIR RTS. This is discussed next.

Treatment of Procyclicality and Volatility Forecast

The Volatility Forecast in IRM 1616 is generated using one of the two configurations: APC Off and APC On. The Volatility Forecast in the APC On configuration is used to generate an initial margin that complies with the applicable anti-procyclicality regulatory requirements and that is used in production. The initial margin generated based on the APC Off Volatility Forecast may be used for testing purposes.

In the case of APC Off, the Volatility Forecast $\sigma_T$ on the Value Date T is calculated by applying the Volatility Floor and the Stress Volatility Component to the EWMA-RV volatility $\sigma_{RV;T}$ as follows:

$$\hat{\sigma}_T = \min(\sigma_{max;T}, \max(\sigma_{RV;T} + \Delta\sigma_{stress;T}, \sigma_{Floor;T})) = \tag{84}$$

$$\min(\sigma_{max;T}, \max(\sigma_{RV;T} + \alpha_{APC;T} * \Delta\sigma_{RV;T}, \sigma_{Floor;T}))$$

Note that the Volatility Forecast is capped at the maximum historical volatility $\sigma_{max;T}$ to avoid a situation where margin may be reduced as market conditions are deteriorating.

The APC treatment in IRM 1616 is implemented by applying a 25% minimum buffer at the risk factor level. Accordingly in the APC On configuration the Volatility Forecast $\hat{\sigma}_T$ is calculated as follows:

$$\hat{\sigma}_T = \min(\sigma_{max;T}, \max(\sigma_{RV;T} + \max(\Delta\sigma_{stress;T}, \alpha_{APC;T} \cdot APC_{buffer} \cdot \sigma_{RV;T}), \sigma_{Floor;T})) = \min(\sigma_{max;T}, \max(\sigma_{RV;T} + \alpha_{APC;T} \cdot \max(\Delta\sigma_{RV;T}, APC_{buffer} \cdot \sigma_{RV;T}), \sigma_{Floor;T})) \quad (85)$$

where $APC_{buffer}$ is set to a minimum value of 25%. The term $\alpha_{APC;T} \cdot APC_{buffer} \cdot \sigma_{RV;T}$ plays the role of a buffer similar to that of the Stress Volatility Component $\Delta\sigma_{stress;T}$. Accordingly, the maximum of these terms is taken in equation (85).

The election of the minimum buffer value (e.g., 25%) ensures that a buffer is applied at the Risk Factor level during periods of market calm, so that increases in the Volatility Forecast during periods of market stress can be more gradual as the buffer is designed to be exhausted as market stress (volatility) increases.

Scaling Risk Factor Returns by Volatility

As a final step in the RV scaling process, the raw returns are scaled by the ratio of the Volatility Forecast $\hat{\sigma}_T$ to the DV volatility:

$$r_{RV;\tau,T} = \hat{\sigma}_T \cdot r_{DV;\tau,T} = \frac{\hat{\sigma}_T}{\sigma_{DV;T-W+\tau-1}} r_{T-w+\tau}, \forall \tau \in [1, W] \quad (86)$$

This return scaling step applies to all Risk Factors, including, for example, linear Risk Factors, option Risk Factors, and FX Risk Factors. At this point there exist $W_0$ Risk Factor return scenarios, obtained by independently scaling the raw returns by their respective ratios of the Volatility Forecast to the DV volatility. The RF return scenarios are generated either in APC Off or APC On configuration by using equation (84) or equation (85) for Volatility Forecast $\hat{\sigma}_T$, respectively.

Example of Generating Scaled Return Scenarios

An example of the scaling calculations up to this point are provided to highlight the fact that IRM 1616 runs a separate EWMA process for each date within the lookback window. In this manner, IRM 1616 estimates variances consistently with the same process for each day, with each day in the lookback period using, for example, 1250 observations (subject to data availability in the early years).

An arbitrary Value Date of Aug. 12, 2008 is selected, which corresponds to T=1515 within the historical dataset. The process of scaling a single return at time t=1505 is illustrated, which is one of the 1250 returns within the lookback period for T=1515. Each of the days within a given lookback window are indexed by $\tau$ from 1 to W, so that $\tau$=1250 corresponds to the Value Date and $\tau$=1240 corresponds to the single return to be illustrated: $r_{\tau,t}=r_{1240,1515}$. Here the time indexing again shows that the $1240^{th}$ return targeted within the lookback period for the historical day T=1515.

For simplicity the illustration does not include computation of the Stress Volatility Component, the Volatility Floor or APC treatment.

The example process is as follows:
1. Unscaled Returns: Compute 1-day returns $r_t$ for t=1, 2, . . . , 1515 using equation (71) or (72).
2. Devolatilization: Generate the DV volatility to be applied to the return $r_{\tau,t}$.
   a. Compute the seed value $\sigma_{\tau=1,t}^2$ using equation (75) with W=1250 and t=1504.
   b. Run the EWMA variance updating scheme for $\tau$=2, . . . , W+1 using equation (76).
   c. Obtain the next-day variance prediction $\sigma_{DV,t}^2$ using equation (77) with t=1504.
   d. Obtain $\sigma_{DV,t}$ by taking the square root of $\sigma_{DV,t}^2$ with t=1504.
3. Volatility Forecasting: Generate the volatility forecast for T=1515:
   a. Run the EWMA variance updating scheme for $\tau$=2, . . . , W+1 using equation (76) to obtain the next-day variance prediction $\sigma_{DV,t}^2$ for t=1515 using equation (77).
   b. Compute $\sigma_{RV;T}$ using equation (79) with T=1515 and take it as the Volatility Forecast $\hat{\sigma}_T$. Note that the Volatility Forecast is the same for any time $\tau$ return within the lookback period.
4. Scaling Risk Factor Return by Volatility: Obtain a scaled return for t=T−W+$\tau$=1505 using equation (86) with $\tau$=1240, W=1250, T=1515. Note that T−W+$\tau$−1=1504, and that $\sigma_{DV;T-W+\tau-1}$ was computed in Step 2d.

The four step process above is performed for each T=1, . . . , W. Thus W scaled returns are obtained for a given Value Date T.

Accommodating Different Holding Periods

The returns are calculated as daily price changes (either absolute returns or log returns). To accommodate different holding periods, the 1-day holding period Volatility Forecast is scaled by the square-root-of-time rule:

$$\hat{\sigma}_{h;T} = \hat{\sigma}_{h=1;T} \cdot \sqrt{h} \quad (87)$$

The time-scaling of volatility is applied at the RV stage detailed above. Therefore the h-day holding period equivalent of the EWMA-RV return may be re-written as:

$$r_{RV,h;\tau,T} = \sqrt{h} \cdot r_{RV;\tau,T} \quad (88)$$

All remaining calculations above continue to be conducted on 1-day returns as previously stated.

Next, referring to FIGS. 22 and 23B, determination of at least one initial margin based on the volatility forecasting (steps 2004-2014) is described. Regarding determination of the initial margin(s), the determination may involve a combination of profit and loss (PNL) process 2200, correlation stress process 2202, diversification benefit process 2204 and currency allocation process 2206. Processes 2200-2206 are described in greater detail below.

In general, profit and loss process 2200 may include step 2200a of generating one or more risk factor scenarios, step 2200b of generating one or more instrument pricing scenarios, step 2200c of generating instrument rounded profit and loss scenarios, step 2200d of aggregating the instrument rounded profit and loss scenarios to generate one or more portfolio-level profit and loss scenarios, step 2200e of determining at least one base initial margin from a portfolio-level VaR, step 2200f of generating one or more sector-based sub-portfolio-level profit and loss scenarios and step 2200g of generating one or more currency-based sub-portfolio-level profit and loss scenarios for one or more currencies.

Correlation stress process 2202 may include step 2202a of determining individual instrument-level VaR and step 2202b of applying a correlation stress component to the base initial margin(s) (step 2200e).

Diversification benefit process 2204 may include step 2204a of determining sector-level VaR (based on step 2200f) and step 2204b of applying a diversification benefit to the base initial margin(s) (step 2200e) based on the sector-level VaR (step 2204a).

Currency allocation process 2206 may include step 2206a of determining currency-based VaR (based on step 2200g), step 2206b of applying the currency-based VaR to the initial margin (after applying the diversification benefit of step 2204b) and step 2206c of allocating the initial margin (after step 2206b) among one or more currencies to form the final initial margin.

Risk Factor Scenarios

A Risk Factor Scenario refers to the application of RF returns to the risk factor level on a given Value Date. The purpose of this process is to create a distribution around the RF level that is consistent with the EWMA volatility scaling of returns discussed above.

For Risk Factors using absolute returns (i.e. linear Risk Factors), the h-day scenarios for a given Risk Factor f are constructed by adding the h-day Risk Factor returns to the Risk Factor level $y_T$ on the Value Date T as follows:

$$RF\ Scenario_\tau = \widehat{RF}_\tau = y_T + r_{RV,h;\tau,T} \tag{89}$$

For Risk Factors using log returns (i.e. option Risk Factors and FX rates), the h-day scenarios for a given Risk Factor f are constructed by applying the h-day Risk Factor returns to the Risk Factor level $y_T$ on the Value Date as follows:

$$RF\ Scenario_\tau = \widehat{RF}_\tau = y_T \cdot e^{r_{RV,h;\tau,T}} \tag{90}$$

No pricing occurs at this stage. The RF scenarios are generated either in APC On or APC Off configuration using equation (84) or equation (85) for Volatility Forecast $\hat{\sigma}_T$, respectively ($\hat{\sigma}_T$ is used in the calculation of the RF return scenarios $r_{RV,h;\tau,T}$).

Instrument-Level Price Scenarios

This step in the margin model process uses pricing functions on the Risk Factor Scenarios to calculate base prices at the instrument level as well as price scenarios. Pricing functions are denoted by PF to provide only a high level overview of the basic pricing steps.

Regarding base prices: for instrument i the base price on Value Date VD=T is calculated as:

$$p_{i,T} = PF(\{y_T\}, T) \tag{91}$$

The Risk Factor level $y_T$ is in constant time to maturity space with respect to Pricing Date (the Value Date T in this case). Accordingly an interpolation on the $\{y_T\}$ curve occurs in the pricing function PF to calculate the RF level corresponding to the time to expiry.

Regarding price scenarios: for an instrument i the set of price scenarios indexed by $\tau$ on the Value Date T is calculated as:

$$p_{i,\tau}^{(\widehat{RF})} = PF(\{\widehat{RF}_\tau\}, VD_h) \tag{92}$$

Here $VD_h$ is the business date after the Value Date such that the number of business days between VD and $VD_h$ is equal to h (the holding period) if the instrument expiry is at the end of the holding period or later. For instruments expiring within the holding period, $VD_h$ is set to the expiry date of the instrument. An interpolation in the pricing function PF is performed here at the RF scenario level $\widehat{RF}_\tau$.

An exception to the above base prices and price scenarios may apply to bond futures: bond future implied yields are used instead of bond yields derived from the Risk Factors as pricing based on the latter may result in a mismatch with settlement prices. Specifically, the base price is calculated as:

$$p_{i,T} = PF(\{y_{i,T}^S\}, T) \tag{93}$$

where $y_{i,T}^S$ is the Bond Future Implied Yield that results in $p_{i,T}$ being the end-of-day settlement price of the bond futures instrument on the Value Date T.

The set of price scenarios for bond futures indexed by $\tau$ is calculated as:

$$p_{i,\tau}^{(\widehat{RF})} = PF(\{y_{i,T}^S + \hat{r}_{RV,h;\tau,T}\}, VD_h) \tag{94}$$

Here $\hat{r}_{RV,h;\tau,T}$ is the yield return scenario obtained by linear interpolation (with flat extrapolation) on the government bond yield RF returns $\{r_{RV,h;\tau,T}\}$ (e.g., with maturities 2Y, 5Y, 10Y, 30Y), corresponding to the instrument's time to expiry. Only the RF scenario returns $\{r_{RV,h;\tau,T}\}$ are interpolated in this case since $y_{i,T}^S$ is already at the Expiry Date of the instrument.

It should be noted that for scenarios all instruments are priced on Value Date $VD_h$: the values for each Risk Factor scenario and the date $VD_h$ are inputs to the pricing function so that the output is the instrument price for the given scenario. Since the future realized fixings are not available until the date $VD_h$, implied fixings computed based on the yield curve (constructed on the Value Date VD) are used as the corresponding forward rates.

For each instrument there now exist $W=W_0$ scenarios in price space. No P&L is calculated at this stage, and no CVF or contract count is attached.

Instrument-Level P&L Scenarios

This step in the margin model process calculates the Profit & Loss scenario for each instrument i separately. Let $p_{i,\tau}^{(\widehat{RF})}$ be the price scenario and let $p_{i,T}$ be the base price on Value Date T for instrument i. The P&L for a given instrument i and scenario i is then calculated as follows:

$$PnL_{i,\tau} = (p_{i,\tau}^{(\widehat{RF})} - p_{i,T}) * CVF_i \tag{95}$$

where $CVF_i$ is the Contract Value Factor specific to instrument i. Only the P&L at the individual instrument level exists, including its CVF. The position size is not included at this stage.

In the subsequent Sections, bold symbols to refer to a vector of scenario values indexed by τ, e.g.:

$$PnL_i = \begin{bmatrix} PnL_{i,\tau=W} \\ \ldots \\ \ldots \\ PnL_{i,\tau=1} \end{bmatrix} \quad (96)$$

P&L Rounding at the Instrument Level

IRM 1616 may be configured to generate high levels of decimal accuracy. This is convenient for the purpose of calculating a large number of portfolio values to a high degree of accuracy. However, financial markets typically quote the prices of financial instruments to a much lower resolution (i.e. to fewer decimal points).

To ensure that Variation Margin (VM), due to reported settlement price changes, and instrument level P&L, due to Model price changes, are consistent with each other, the P&L at the instrument level may be rounded to the nearest minimum increment:

$$PnL_{round;i,\tau} = \left\lceil \frac{PnL_{i,\tau}}{\Delta_i} \right\rceil * \Delta_i \quad (97)$$

where $P\&L_{i,\tau}$ is the Profit and Loss vector for instrument i at scenario τ, $\Delta_i$ is the instrument-specific minimal increment, and where the bracket operator $\lceil \cdot \rceil$ represents the function that rounds up the value away from zero to the nearest integer (corresponding to =ROUNDUP(·,0) in Microsoft Excel®) with one exception. In some examples, if the absolute value within the square brackets is less than 1/100, i.e. $P\&L_{i,\tau}$ is within $1/100^{th}$ of a tick size of zero, then the function will round the value to zero. Note that Δ=CVF*ticksize.

Portfolio-Level P&L Scenarios and Base IM

For single currency portfolios, the Portfolio Level P&L vector is calculated by summing the Instrument Level P&L vectors (multiplied by their respective quantities):

$$PnL_\Pi = \sum_i Q_i \cdot PnL_{i;\Pi} \quad (98)$$

where the summation is across all instruments in portfolio Π, and where $Q_i$ is the quantity (position) held of instrument i (which can be positive or negative to indicate a long or short position). This produces a single distribution for the P&L of a given portfolio.

Given a VaR confidence level q, the Base IM for portfolio Π is obtained by taking the percentile 1-q of the P&L distribution:

$$IM_\Pi = \min(\text{percentile}(PnL_\Pi, 1-q), 0) \quad (99)$$

Note that percentile corresponds to the Microsoft Excel® function=PERCENTILE.INC( ). The Initial Margin $IM_n$ may be capped at zero as margin is concerned with collateralizing potential losses, rather than gains.

Multi-Currency Portfolio Base IM Via Currency Allocation Component

For single currency portfolios the model steps are as described above. No FX conversion takes place. Multi-currency portfolios receive the additional steps to convert from the various local currencies (the currencies in which any given trades are settled) to the IM Base Currency (the single currency in which Initial Margin is calculated), which may be handled by a currency allocation component (e.g., a component of additional model component(s) 1710 of IRM 1616).

FX conversion as implemented in IRM 1616 not only allows for the aggregation of risk for multi-currency portfolios and for the subsequent collection of the initial margin in a single currency, it also accounts for the market risk inherent in FX rates (albeit in a univariate manner). Each currency pair is treated as a Risk Factor and as such is scaled in the same manner as any RF as described above.

The Portfolio P&L vector in Base currency is calculated by applying the appropriate scaled FX rate as follows:

$$\begin{bmatrix} PnL_{\Pi;\tau=W} \\ \ldots \\ \ldots \\ PnL_{\Pi;\tau=1} \end{bmatrix} = \sum_i Q_i \cdot \begin{bmatrix} FX^B_{L;\tau=W} \cdot PnL_{i,\tau=W} \\ \ldots \\ \ldots \\ FX^B_{L;\tau=1} \cdot PnL_{i,\tau=1} \end{bmatrix} \quad (100)$$

where $Q_i$ is the quantity (position) held of instrument i, $FX_{L,\tau}^B$ is the scaled FX rate (corresponding to scenario τ) that converts instrument P&L from its local currency L to Initial Margin Base currency B. Using the pairwise product operator $\langle \cdot, \cdot \rangle$ that represents pairwise multiplication across corresponding scenarios, the above equation can be rewritten more compactly as $$PnL_\Pi = \sum_i Q_i \cdot \langle PnL_i, FX^B_L \rangle \quad (101)$$

here $FX_L^B$ represents a vector of FX rate scenarios $\{FX_{L,\tau}^B\}_{\tau=1}^W$. The Initial Margin $IM_\Pi$ expressed in Base currency is then obtained using equation (99) with P&L vector $PnL_\Pi$. As stated following equation (99), the Initial Margin may be capped at zero.

Currency-Based Risk Weights for Margin Allocation

For multicurrency portfolio there may also be an additional step of allocating initial margin for each local currency group. This step calculates currency-based risk weights, which may be performed by the currency allocation component.

The local currency P&L vectors $PnL_i$ may be used and may be separated by their local currency groups. The Portfolio level P&L of all positions in the same currency L=l is:

$$PnL_{\Pi;l} = \Sigma_i Q_i \cdot \langle PnL_i, PX^B_L \rangle \cdot 1_{L=l} \quad (102)$$

where $1_{L=l}$ is the indicator function that takes on a value of one when the local currency is l and zero otherwise. As a check, the Portfolio level P&L should equal the sum of the P&L vectors separated by their original Local currencies:

$$PnL_\Pi = \Sigma_l PnL_{\Pi;l} \qquad (103)$$

The Initial Margin $IM_{\Pi;l}$ for each local currency group l in the Base currency is obtained as the percentile at the level 1-q of its P&L vector $PnL_{\Pi;l}$.

The Initial Margin $IM_{\Pi;l}$ for each currency group l may be computed, and the currency-based risk weights may be generated according to the simplified formula:

$$A_l = \frac{IM_{\Pi;l}}{\sum_l IM_{\Pi;l}}, \quad \sum_l A_l = 1 \qquad (104)$$

The weights $A_l$ are later used to calculate the final Initial Margin for each Local currency group L=l.

Treatment of Correlation Risk by Correlation Stress Component (CSC)

The portfolio based Initial Margin described above assumes that the historical correlation over the VaR lookback window is expected to be relatively stable. This is somewhat justified by the choice of the relatively long lookback window. There exists, however, the risk that the realized correlations deteriorate over the holding period. This risk may be accounted for by IRM 1616 with the estimation of the Correlation Stress Component (CSC) (e.g., a component of additional model component(s) 1710 of IRM 1616) described below.

The net effect on risk of any correlation changes may depend on the composition of the portfolio. A decrease in realized correlation tends to decrease portfolio risk where positions are directional and tends to increase portfolio risk where positions are primarily long/short, hedged. Thus a change to realized correlation could either make the portfolio more diversified (less risky), or it could make the portfolio less diversified (more risky). The empirically observed diversification may fail to materialize over the holding period, so that instead of acting in a diversified manner the portfolio becomes riskier.

Directional portfolios where the P&L vectors of each position are highly correlated are expected to receive low diversification benefits, which makes the correlation risk insignificant in comparison to the volatility risk for such a portfolio. To illustrate using an extreme case, a directional portfolio where the realized P&L correlation across all of its individual positions is 100% can be expected to receive no diversification benefits from IRM 1616. Such a portfolio would not require an additional method to account for correlation risk—any change to realized correlation can only reduce the risk of the portfolio.

On the other hand, hedged portfolios carry a risk of becoming less correlated over the holding period. The Correlation Stress Component takes such conditions into account, by estimating the portfolio IM under conditions of zero correlation between the individual instrument positions within the portfolio. Analogous with a variance calculation of a sum of uncorrelated variables, the sum of the squares of the IM of individual instrument positions is determined, and the square-root of this sum is obtained. This provides the estimate for a totally un-correlated scenario, denoted as $IM_{CS}$:

$$IM_{CS} = -\sqrt{\sum_{i=1}^{N}(IM_{\Pi;i})^2} \qquad (105)$$

Each $IM_{\Pi;i}$ is calculated using equation (99) from the position PnL vector within the portfolio: $PnL_{\Pi;i}=Q_i \cdot (PnL_i, FX_L^B)$. The Initial Margin with the Correlation Stress Component is then calculated as follows:

$$IM_{\Pi;CS} = IM_\Pi + \min(0, w_{CS} \cdot (IM_{CS} - IM_\Pi)) \qquad (106)$$

where $w_{CS}$ is the Correlation Stress Weight calibrated as discussed further below. Note that the same instrument P&L scenarios are used in the calculation of $IM_\Pi$ and $IM_{CS}$.

As is clear from equation (106), the CSC will increase when the volatility levels increase while the correlation among instruments does not change substantially. This is related to the fact that at increased volatility levels the cost and risk of de-correlation becomes higher. Moreover, the CSC does not react immediately to changes or breaks in correlation; instead it provides a buffer against a potential correlation break.

It should be noted that the CSC does not address the correlation risk for directional portfolios where the P&L vectors of the individual instruments are correlated only at moderate or low levels. Such portfolios could become more correlated over the holding period. However, typically the correlation risk for such portfolios is dominated by the volatility risk that is accounted for by IRM 1616.

Diversification Benefits Component

IRM 1616 further limits the amount of portfolio offsets for multi-product portfolios via a diversification benefits component (e.g., a component of additional model component(s) 1710 of IRM 1616). By limiting the Diversification Benefits (DB), IRM 1616 helps mitigate the risk that the correlation to be realized in the future over the margin period turns out to be "worse" (riskier) than what is contained in the historical data. As recognition of diversification benefits is an advantage of the margin model (IR 1616) that helps to allocate risk capital more efficiently, the purpose is not to reduce DB excessively or to eliminate it.

In some examples, the DBs may be considered, according to regulatory guidelines, as being that the amount of "margin reduction" should be no greater than a predefined percentage (e.g., 80%) of the sum of the Initial Margins calculated with no offset. Moreover, it is recognized by regulatory guidelines that within certain predefined groups of financial instruments, in some examples, 100% DB are permitted as products are sufficiently similar to provide a highly effective risk offset.

To limit the multi-product portfolio offsets to a predefined percentage (e.g., 80%) the sum of the Initial Margins across all defined product group sub-portfolios is determined:

$$IM_{DB} = \sum_g IM_{\Pi;g} \qquad (107)$$

where $IM_{\Pi;g}$ is the Initial Margin for the product group g sub-portfolio, calculated using equation (99) with the position P&L vector:

$$PnL_{\Pi;g} = \sum_i Q_i \cdot \langle PnL_i, FX_L^B \rangle \cdot 1_{G=g} \qquad (108)$$

where $1_{G=g}$ is the indicator function that takes on a value of 1 when the product group is g, and is zero otherwise.

The Initial Margin with the Correlation Stress Component and the Diversification Benefit Component is then the calculated as follows:

$$IM_{\Pi;CS+DB} = \min(IM_{\Pi;CS}, w_{DB} \cdot IM_{DB}) \qquad (109)$$

where $w_{DB}$ is the Diversification Benefit Weight set to a predefined percentage (e.g., 20%).

Final Initial Margin and Margin Allocation

The Initial Margin (IM) can now be rewritten as follows:

$$\begin{aligned} IM_{\Pi;CS+DB} &= \min(IM_{n;CS}, w_{DB} \cdot IM_{DB}) \qquad (110) \\ &= \min(IM_\Pi + \min(0, w_{CS} \cdot (IM_{CS} - IM_\Pi)), w_{DB} \cdot IM_{DB}) \\ &= IM_\Pi + \min(0, w_{CS} \cdot (IM_{CS} - IM_\Pi), w_{DB} \cdot IM_{DB} - IM_\Pi) \end{aligned}$$

The final Initial Margin may be generated either in the APC Off or APC On configuration. In the APC Off (respectively, APC On) configuration, all margins that appear in equation (110) are calculated using APC Off (respectively, APC On) scenarios. The APC On configuration may be configured to comply with the applicable anti-procyclicality (APC) regulatory requirements. In some examples, the APC Off configuration may be used for testing purposes.

The Initial Margin $IM_\Pi$ computed using equation (99) may be capped at zero, and this ensures that the Initial Margin computed using equation (110) may also be capped at zero.

To allocate the Initial Margin for each currency group L=1, the Initial Margin $IM_{\Pi;CS+DB;L=l}$ for each Local currency group L=1 is allocated using the weights computed by equation (104):

$$IM_{\Pi;CS+DB;L=l} = A_l \cdot IM_{\Pi;CS+DB} \cdot FX_{B;T}^{L=l} \qquad (111)$$

where $FX_{B;T}^{L=l}$ is the FX rate for converting from Base Currency B to Local on the Value Date T.

Generation of LRC Value(s) by LRC Model

Figure 24:
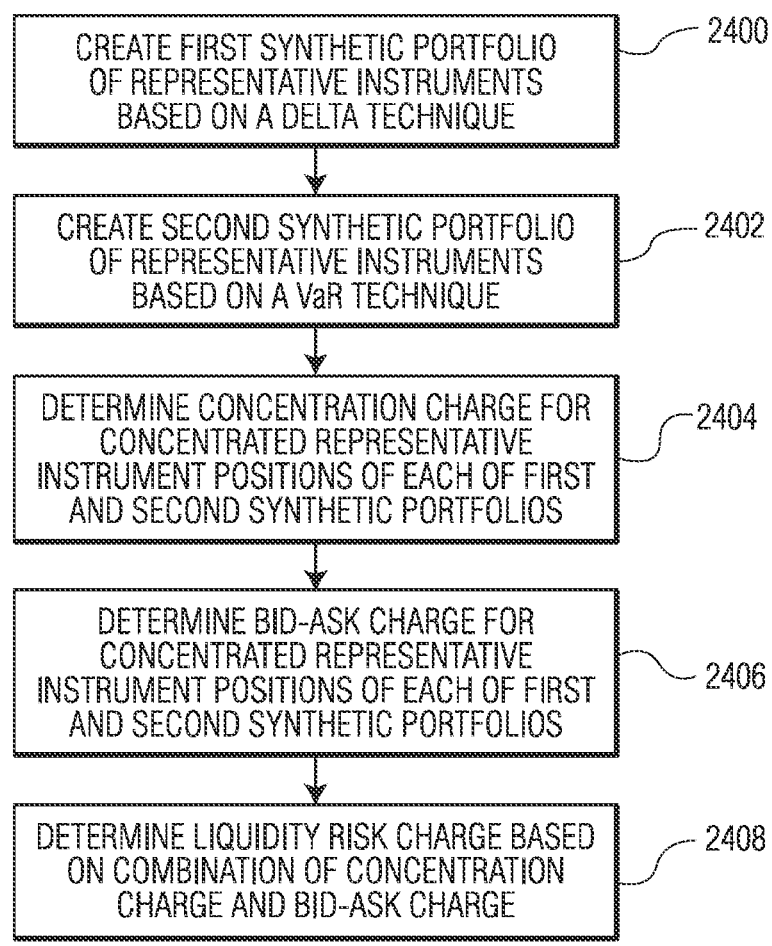
FIG. 24 is a flowchart diagram illustrating an example method of determining an LRC value for at least one portfolio according to the present disclosure.
Figure 25:
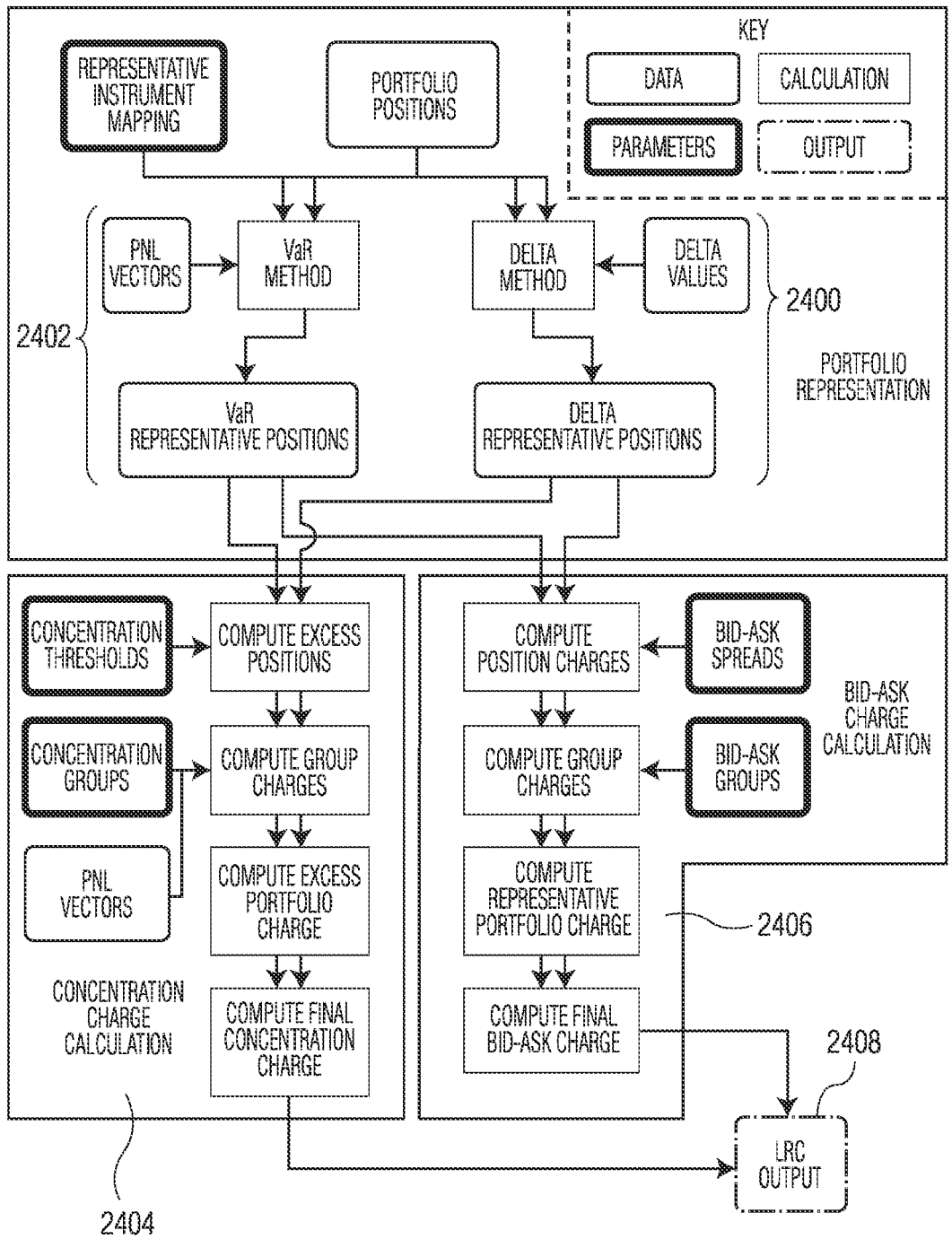
FIG. 25 is a functional block diagram of an example signal flow for determining an LRC value by an LRC model according to the present disclosure.
Figure 26:
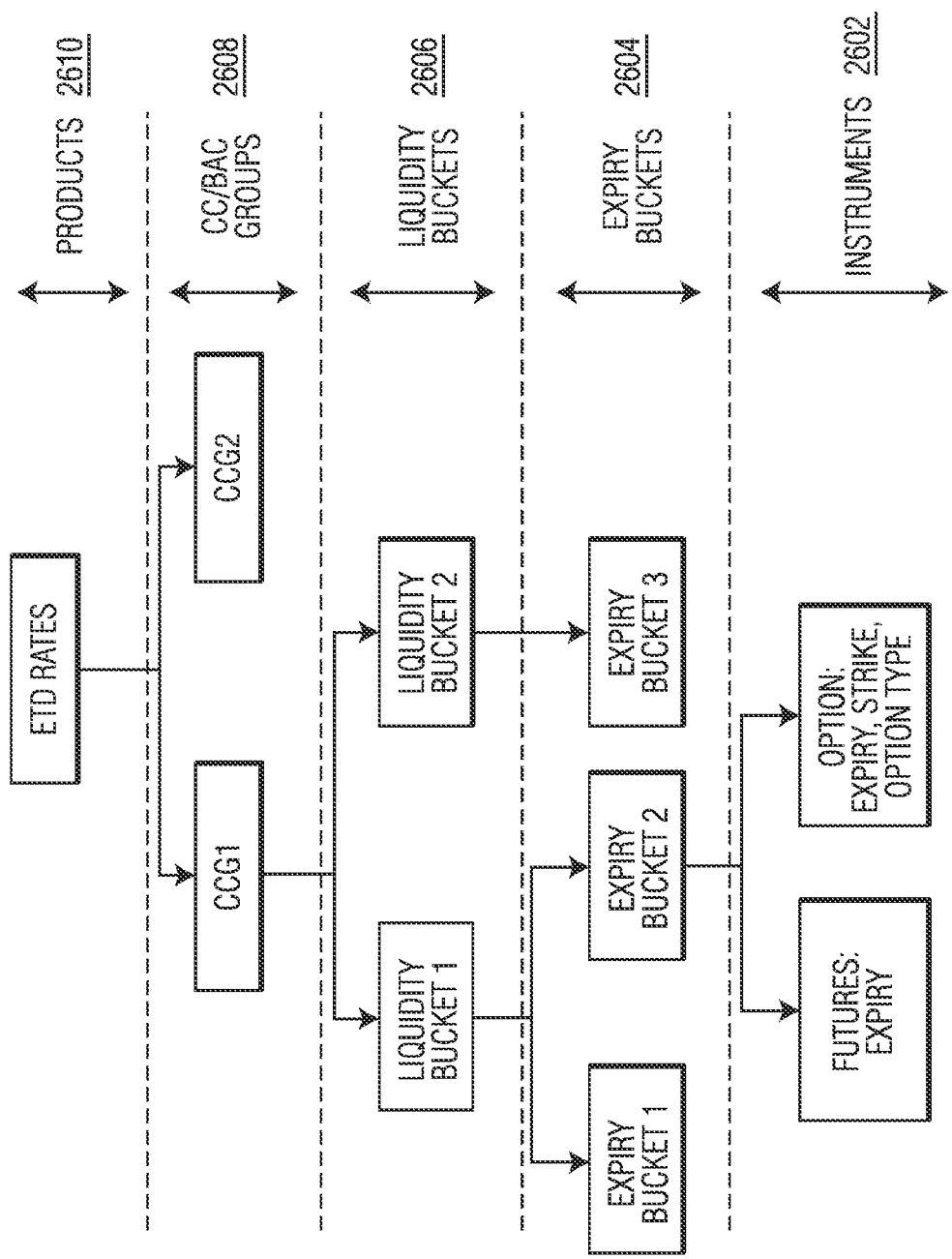
FIG. 26 is an illustration of example grouping methods for determining the LRC value according to the present disclosure.

Referring next to FIGS. 24-26, LRC model 1618 is described, with respect to steps 1904-1906 (FIG. 19). In particular, FIG. 24 is flowchart diagram illustrating an example method of determining an LRC value for at least on portfolio; FIG. 25 is a functional block diagram illustrating a more detailed signal flow of the process for determining the LRC value by LRC model 1618; and FIG. 26 is an example illustration of grouping methods for determining the LRC value, according to a non-limiting embodiment.

The LRC value is the sum of a Concentration Charge (CC) levied against relatively large cleared positions and a Bid-Ask Charge (BAC) applicable to all positions. The LRC itself is additive to the IRM 1616 and may be expressed in the same currency as the IRM 1616 for single currency portfolios, or a base currency for multi-currency portfolios.

As an overview, an example method of determining an LRC value by LRC model 1618 may include, performing the following method steps, illustrated in FIG. 24 and in more detail in FIG. 25. At step 2400, a first synthetic portfolio of representative instruments may be created based on a delta technique, for example, by synthetic portfolio generator 1802. At step 2402, a second synthetic portfolio of representative instruments may be created based on a VaR technique, for example, by synthetic portfolio generator 1802. Thus, by steps 2400 and 2402, for any given portfolio, two portfolio representations may be created using representative Instruments (RI) (with one based on the Delta method and the other based on the VaR method).

At step 2404, a concentration charge may be determined (for example by concentration charge component 1804) for the concentrated representative instrument positions, for each of the first and second synthetic portfolios (created at respective steps 2400 and 2402).

At step 2406, a bid-ask charge may be determined (for example, by bid-ask charge component 1806) for the representative instrument positions, for each of the first and second synthetic portfolios (created at respective steps 2400 and 2402).

At step 2408, an LRC value may be determined, for example, by liquidity risk charge component 1808. The LRC value may be determined as the sum of the concentration charge and the bid-ask charge.

In the event of a clearing member's default, a central counterparty will need to eventually close out the defaulter's portfolio as part of the default management process. However, the CCP may not be able to do so without incurring additional liquidation losses if, for example, the portfolio contains concentrated positions. To mitigate this liquidation risk, CCPs need to require members to post additional collateral in the form of an add-on to the Initial Margin.

For LRC model 1618, a zero-impact approach may be adopted for determining the add-on value. Specifically, the Liquidity Risk Charge may be calculated under the assumption that positions are gradually liquidated at a constant rate without impacting the market. However the exact liquidation strategy is not known ex ante. Under the zero-impact approach, it is assumed that liquidation of the position happens over a period of sufficient length to ensure that liquidation costs are negligible. In this approach, there is no price impact, but there is increased market risk, as the liquidation period is extended relative to the MPOR. Under the zero-impact approach, the following may be estimated:
  i. the amount of daily position liquidation that will not cause any substantial price impact;
  ii. the additional market risk incurred by the extension of the liquidation period.

The theoretical foundations of the LRC model are first-order price sensitivities (delta) and Value-at-Risk (VaR), which are used to build risk-equivalent portfolios of instruments called Representative Instruments. Portfolio concentration and bid-ask spreads are evaluated at the Representative Instrument level.

Grouping Methods

The mapping of instruments and the subsequent grouping of portfolios is a fundamental part of LRC model 1618. The modelling approach for LRC is risk-based as it assesses liquidation cost at the portfolio group level, rather than at the level of each individual instrument. This makes the risk modelling approach of LRC model 1618 similar to that of IRM 1616.

LRC model 1618 uses a grouping method for the risk equivalence technique defined further below. FIG. 26 illustrates an example grouping method according to an exemplary embodiment. As shown in FIG. 26, one or more instruments 2602 are grouped within LRC model 1618 first into one or more expiry buckets 2604, then grouped into one or more liquidity buckets (LB) 2606, and finally grouped into one or more concentration charge (CC)/bid-ask charge (BAC) groups 2608. Once instrument(s) 2602 are grouped, LRC value(s) may be determined for one or more products 2610 (e.g., ETD interest rate products). From most granular to least, the grouping hierarchy is as follows:

Instrument 2602: an exchange traded contract specified by its underlying reference, expiry schedule, as well as strike price and maturity in the case of an option.

Expiry Bucket 2604: a collection of instruments such that the expiry of each underlying instrument maps to the same nearest relative expiry.

Liquidity Bucket 2606: a collection of instruments from one or more Expiry Buckets that can be represented by a single instrument, referred to as the Representative Instrument, in the sense of price risk equivalence.

Group (CC or BAC) 2608: a collection of instruments from one or more Liquidity Buckets.

Specifically, consider Instrument i that is part of Clearing Member portfolio Π on any given Value Date (VD). A Representative Instrument R (i) is any instrument that is deemed to appropriately represent Instrument i. The risk equivalence approach is to construct a position in R(i) that has the same amount of risk as the set of Instrument positions that are being mapped to it. Risk, in this context, is assessed in two ways for this purpose: Delta and VaR, each method producing its own equivalent portfolio.

Every Representative Instrument is associated with a unique Liquidity Bucket defined as $B_r = \{i | R(i) = r\}$. That is, $B_r$ is the group of all instruments that map to the same Representative Instrument. Every instrument maps to a unique R(i), and trivially every R(i) maps back to itself.

Portfolio Representation

As mentioned above, LRC model 1618 is based on two distinct assessments: the Delta approach and the VaR approach. The rationale for both is to approximate the price risk, in the sense of Delta or VaR, between any given Liquidity Bucket sub-portfolio and its Representative Instrument position.

In particular, using portfolio representations allows aggregation of the risk associated with instruments with different levels of liquidity, by choosing a representative instrument that provides for an appropriate price risk equivalent representation and is actively traded.

Using both approaches provides for some degree of conservatism in the calculation of the charge. In particular, using the Delta method helps to account for extreme price movements of deep out-of-the-money options whereas using the VaR method helps to take into account volatility and correlation risk.

Portfolio Representation Delta Method

The purpose of the Delta method is to reproduce the first order (delta) price risk of any given portfolio using only Representative Instruments.

At a summary level, the steps in the Delta method are to calculate the first-order price sensitivity for each instrument position of the portfolio, aggregate the sensitivities across all instruments within the relevant liquidity bucket, then create a synthetic position in a Representative Instrument with the same aggregate delta sensitivity. At this stage the portfolio of the instruments in the liquidity bucket has the same delta as the Representative Instrument position. This is repeated for all liquidity buckets.

First-order price sensitivity may be determined as follows:

1. If i is a futures derivative Instrument, its Instrument Delta is calculated as $$\Delta_i = DV01_i \tag{112}$$

where $DV01_i$ is the cash P&L impact of a one basis point parallel shift of the underlying risk-factor curve, and where the quantity held in i is a single lot.

2. If i is an option derivative Instrument, the Instrument Delta is calculated as $$\Delta_i = DV01_{U(i)} \cdot \text{sign}(\Delta_\%) \cdot \max(|\Delta_\%|, \Delta_{\%\ min}) \tag{113}$$

where $\Delta_\%$ is the Option Delta that represents the number of units of the underlying U(i) that is held to remove the first-order risk of one unit of the option instrument i calculated using standard analytical formulas; and $\Delta_{\%\ min}$ is a floor on $\Delta_\%$.

With price sensitivities $\Delta_i$ defined for each instrument in a Liquidity Bucket $B_r$, the quantity $Q_r^{(D)}$ (number of lots) for the Representative Instrument assigned to $B_r$ may be determined so that $$Q_r^{(D)} \cdot \Delta_r = \sum_{i \in B_r} Q_i \cdot \Delta_i \tag{114}$$

where $Q_i$ is the quantity, positive for a long position and negative for a short position, of Instrument i held in Liquidity Bucket $B_r$. (Here, representative instruments may be selected to have the same denominate currency as the instruments they represent.) The quantity-weighted Instrument Delta of a Representative Instrument r is equated to the aggregated quantity-weighted delta of the group of Instruments that map to the same R(i). At this, stage the positions of the individual instruments in the Liquidity Bucket are represented by a single position in the Representative Instrument.

This technique is repeated for each liquidity bucket, so that a synthetic portfolio is created that is comprised entirely of representative instrument positions that each have the same delta as the group of instrument positions they represent.

Portfolio Representation-Value-at-Risk

The VaR method for constructing synthetic representative instrument portfolios is next described. The purpose of the VaR method is to represent the liquidity bucket sub-portfolios in a risk-based way that takes into account volatility and correlation. Note that unlike in the Delta method, option positions are included directly (in the P&L vector) instead of being represented by their corresponding underlying future delta position.

The VaR method, denoted as Risk Measure (RM), is defined as the $1^{st}$ percentile of the P&L vector, or =PER- CENTILE.INC(PnL$_i$, 1−q) in the language of Microsoft Excel®, where q is the VaR confidence level.

For each instrument i in a portfolio, the 1-day P&L vector PnL$_1$ is computed on the Value Date using the IRM 1616 Baseline parameter settings, as described above:

$$PnL_i = \begin{bmatrix} PnL_{i,\tau=W_0} \\ \cdots \\ \cdots \\ PnL_{i,\tau=1} \end{bmatrix}. \tag{115}$$

where $W_0$ is the VaR lookback window.

The P&L vectors that belong to the same Liquidity Bucket are aggregated as follows:

$$PnL_{\Pi;B_r} = \sum_{i \in B_r} PnL_i \cdot Q_i \tag{116}$$

where $Q_i$ is the quantity of instrument i held in portfolio Π and $B_r$ is the Liquidity Bucket defined above. That is, for all Instruments assigned to the same Liquidity Bucket, the aggregate P&L is the sum of the individual P&L vectors weighted by the instrument quantities.

The quantity in the Representative Instrument is denoted by $Q_r^{(V)}$ and is calculated to have the equivalent RM as the Instrument positions it represents. There are two possible solutions for this quantity: a long position or a short position. The chosen solution is based on matching the Risk Measure as well as portfolio directionality. Regarding directionality, a long or short position in the Representative Instrument is selected so that its P&L vector is positively correlated with that of the liquidity bucket sub-portfolio.

The quantity in the Representative Instrument r is thus chosen so that the following two conditions are satisfied:

$$RM(PnL_{\Pi;B_r}) = RM(Q_r^{(V)} \cdot PnL_r), \tag{117}$$
$$\text{Correlation}(PnL_{\Pi;B_r}, Q_r^{(V)} \cdot PnL_r) \geq 0$$

The correlation for any two P&L vectors PnL$_i$ and PnL$_j$ is the Pearson product-moment correlation and corresponds to the =CORREL(PnL$_i$, PnL$_j$) function in Microsoft Excel®. The sub-portfolio P&L for the liquidity bucket and the P&L of the Representative Instrument held in quantity $Q_r^{(V)}$ are required to be equivalent in terms of the Risk Measure and directionality.

The quantity $Q_r^{(V)}$ in the Representative Instrument satisfying conditions (117) is given by $$Q_r^{(V)} = \begin{cases} \dfrac{RM(PnL_{\Pi;B_r})}{RM(PnL_r)}, & Corr_r \geq 0 \\ -\dfrac{RM(PnL_{\Pi;B_r})}{RM(-PnL_r)}, & \text{otherwise} \end{cases} \tag{118}$$

where $Corr_r$=Correlation(PnL$_{\Pi;B_r}$, PnL$_r$) is the correlation between the Representative Instrument P&L (1 unit long) and the Liquidity Bucket portfolio P&L.

Once Representative Instrument quantities have been estimated for each liquidity bucket under each method, these quantities are used in the CC and BAC determinations.

Concentration Charge

The Concentration Charge is calculated twice for each group: once using the Delta method portfolio representation, and then again using the VaR method portfolio representation—both as described herein.

It is assumed for each portfolio that price risk, ignoring concentration risk, is covered within the MPOR used in IRM 1616. Any Representative Instrument position that is expected to take longer than the MPOR to be liquidated, referred to as Excess Quantity $Q_r^{(E)}$, is calculated as $$Q_r^{(E)} = \text{sign}(Q_r) \cdot \max(|Q_r| - h \cdot CT_r, 0) \tag{119}$$

where h is the holding period as per IRM 1616, $CT_r$ is the Concentration Threshold (CT) for instrument r (for simplicity, in the notation of $Q_r$, the Portfolio Representation method used (Delta or VaR) is suppressed). The Concentration Threshold $CT_r$ represents the quantity that can be traded in one day without any price impact. The calibration of CT is described below.

To determine the period of time for the liquidation of Excess Quantity $Q_r^{(E)}$, the Liquidation Period (LP) for an individual Representative Instrument excess position is obtained as the Excess Quantity divided by the CT:

$$LP_r = \min\left(\frac{|Q_r^{(E)}|}{CT_r}, \max(0, timeToExpiry_r - h)\right) \tag{120}$$

where LP is expressed in units of days and where CT, in some examples, is floored at a strictly positive constant. The Liquidation Period is capped by the time-to-expiry (defined as the number of days between the value date and the expiry date) of the Representative Instrument, except for Representative Instruments with physical delivery, which are not capped since such instruments continue to have risk after expiry.

The Concentration Charge is assessed at the Concentration Charge Group (CCG) level. For each CCG a synthetic portfolio of Excess Quantities in Representative Instruments is constructed. Portfolio offsets are allowed between positions within the CCG.

The Concentration Charge at the CCG level is calculated under the assumption that the portfolio positions are gradually liquidated at a daily rate equal to the level of Concentration Threshold $CT_r$. Analogous with a variance calculation of a sum of uncorrelated variables, the Concentration Charge is calculated as the square root of the sum of squared Risk Measures of the remaining portfolio on each day in the maximum Liquidation Period:

$$CC_{CCG_k} = \sqrt{\sum_{t=0}^{LP_{max}^{CCG_k}-1} \left(RM\left[\sum_{r \in CCG_k} (Q_r^{(E,t)} \cdot PnL_r)\right]\right)^2} \tag{121}$$

where $Q_r^{(E,t)}$ represents the remaining quantity of the Representative Instrument r on day t of the maximum Liquidation Period:

$$Q_r^{(E,t)} = \text{sign}(Q_r^{(E)}) \cdot \max(0, |Q_r^{(E)}| - t \cdot CT_r) \tag{122}$$

$LP_{max}^{CCG_k}$ denotes the maximum Liquidation Period across the Representative Instruments in $CCG_k$ rounded up to the nearest integer:

$$LP_{max}^{CCG_k} = \lceil \max_{r \in CCG_k}(LP_r) \rceil \quad (123)$$

where $\lceil \cdot \rceil$ is the ceiling operator rounding the value up to the nearest integer.

A special treatment in equation (121) may be applied to cash-settled Representative Instruments that expire within the corresponding maximum Liquidation Period for some index $t=t_{exp}$ (corresponding to the expiry day) such that $t_{exp} < LP_{max}^{CCG_k}$. Since such instruments do not represent any risk after expiry, they may be excluded from the calculation in equation (121) for $t > t_{exp}$ by setting $Q_r^{(E,t)} = 0$ for $t > t_{exp}$. In some examples, this treatment may not apply to Representative Instruments with physical delivery (e.g., bond futures).

The Concentration Charge for a given portfolio is calculated as $$CC_\Pi = \sum_k \max(CC_{CCG_k}^{(D)}, CC_{CCG_k}^{(V)}). \quad (124)$$

That is, the Concentration Charge is the sum across all Concentration Charge Groups, where each of the charges is represented by the maximum of two monetary values calculated using the VaR and the Delta method.

Note that the choice of the maximum of the two CC values calculated using the Delta and VaR method is one of conservatism. Additional conservatism is also achieved by the fact that offsets between Representative Instrument positions are not allowed across the different CCGs.

Bid-Ask Charge

The BAC component captures a different aspect of liquidity risk that is not addressed by CC. This is why BAC is fully additive to any Concentration Charges. It is possible at any given time for the CCP to face portfolio liquidation costs regardless of the level of instrument position concentration. This motivates BAC as a separate and distinct charge.

As with the CC component, BAC is computed using two separate risk assessments—one based on the Delta and one based on the VaR representations of the portfolios.

For a given portfolio H, the Bid-Ask Charge is calculated for each Bid-Ask Charge Group (BACG), once $Q_r^{(D)}$ and $Q_r^{(V)}$ are calculated for each Representative Instrument. In contrast with the CC calculation, BAC is not based on the excess quantity beyond a threshold, but rather the entire position (in the Representative Instrument) qualifies for BAC because the risk associated with the bid-ask spread is not taken into account in the IRM 1616 model.

The BAC calculation separately treats long and short positions in the Representative Instruments. The first argument inside the max operator applies to long portfolios, the second to short:

$$BAC_{BACG_k}^{(m)} = \max \begin{bmatrix} \sum_{\substack{r \in BACG_k, \\ Q_r^{(m)} > 0}} \left( Q_r^{(m)} \cdot FX_{L;r}^B \cdot \frac{BA_r}{2} \right), \\ \sum_{\substack{r \in BACG_k, \\ Q_r^{(m)} < 0}} \left( -Q_r^{(m)} \cdot FX_{L;r}^B \cdot \frac{BA_r}{2} \right) \end{bmatrix}. \quad (125)$$

where m=D or V, depending on whether the Delta or VaR method is used for portfolio representation, $Q_r^{(m)}$ is the quantity, $FX_{L;r}^B$ is spot exchange rate from the local currency of Representative Instrument r to the Base Currency B, and $BA_r$ is the Bid-Ask spread parameter for Representative Instrument r.

The division by two in $BA_r/2$ is used to get from the mid-price to either bid or ask price. Taking the maximum in equation (125), of long only and short only positions, is appropriate as positions may be traded as a strategy as opposed to individual positions.

The BAC assessed on portfolio $\Pi$ is the sum of the individual pairwise maxima of the BAC Group charges:

$$BAC_\Pi = \sum_k \max(BAC_{BACG_k}^{(D)}, BAC_{BACG_k}^{(V)}). \quad (126)$$

Note again that the choice of the maximum of the two BAC values calculated using the Delta and VaR method is one of conservatism. Additional conservatism is also ensured because offsets between Representative Instrument positions are not allowed across different BACGs.

Total Liquidity Risk Charge

The total Liquidity Risk Charge assessed on portfolio H is the sum of the Concentration Charge and the Bid-Ask Charge:

$$LRC_\Pi = CC_\Pi + BAC_\Pi. \quad (127)$$

Synthetic Data Generation by Synthetic Data Generator

Next, the generation of synthetic datasets is discussed. In some examples, the synthetic datasets may be generated by synthetic data generator 1626.

The use of synthetic data in testing an initial margin model has several practical advantages including: providing data sets that can be designed to emulate historical data; providing multiple sets of out-of-sample data for testing; and that the data sets themselves may be technically unlimited (e.g., an arbitrarily large sample size).

Synthetic data provides the flexibility to create customized data sets that explore model behavior under conditions that may be controlled by an analyst. This can take the form of creating data sets that match the historical data record on one or more desired metrics, for example volatility or other given moments of a distribution including cross-moments; or creating data that exhibit the characteristics of pre-defined events such as stress scenarios. The model may then calibrated to the synthetic data and evaluated using backtesting to determine whether model performance continues to be acceptable.

The Benign Normal dataset is well behaved with respect to volatility (constant), autocorrelation (none), correlation (constant), and return distributions (normal). It represents a baseline dataset used as part of the backtesting framework that IRM 1616 is expected to pass. The Regime Change dataset aims to simulate the characteristics that may be observed in the historical data, for example, volatility clustering, autocorrelation in returns, heavy tails in the distributions, but controls at any time specifically the regime where the stress event is isolated to start, for example, at the $2001^{st}$ observation and end at the $2500^{th}$ observation. Both synthetic data sets may be designed for testing at the risk factor level, therefore certain features of the data such as restrictions on the levels or movements of the yield curve may not be preserved.

Figure 27:
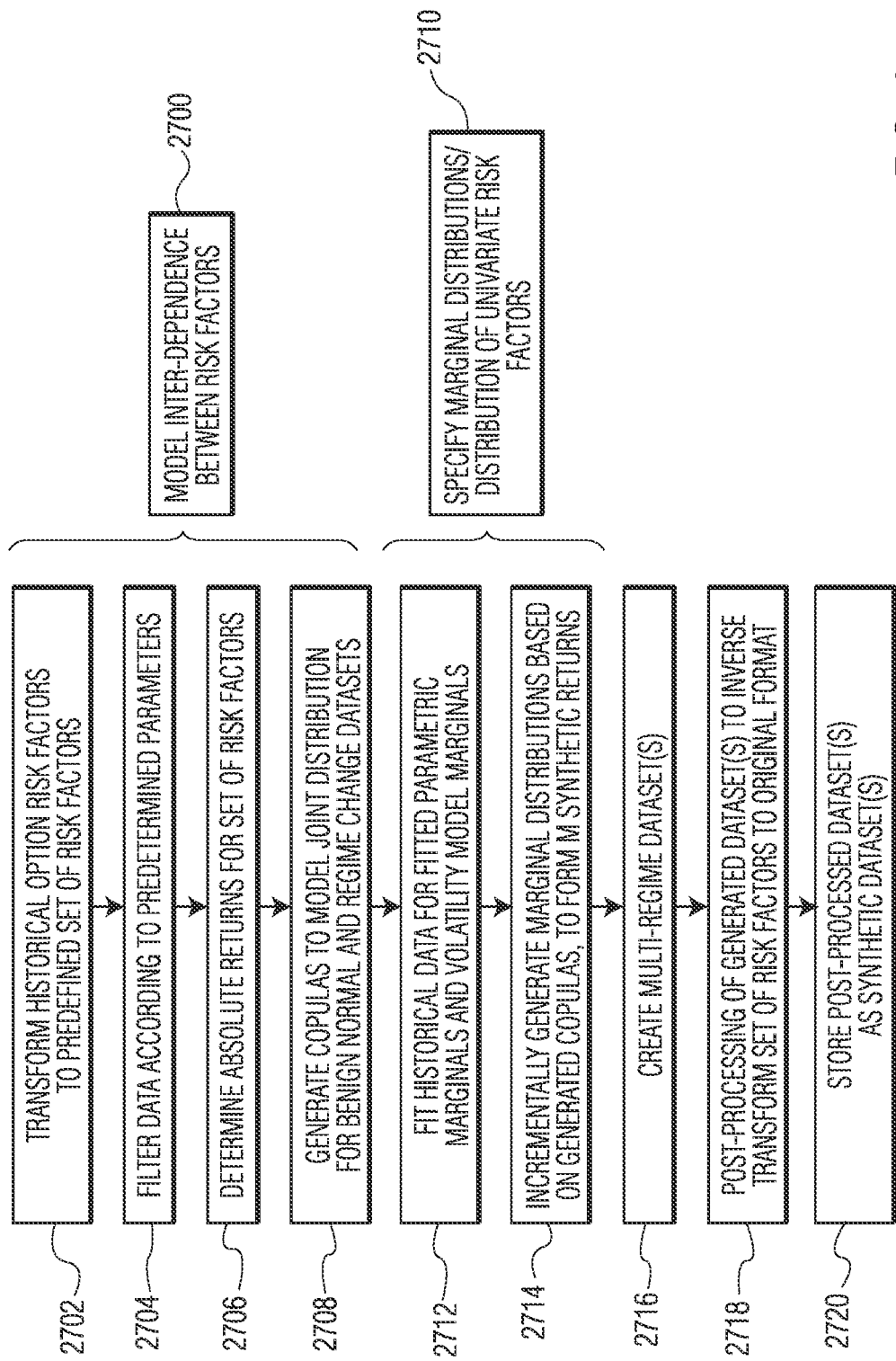
FIG. 27 is a flowchart diagram of an example method of generating synthetic data according to the present disclosure.

Both linear and non-linear (option) risk factors may be generated using the same basic methodology. Referring next to FIG. 27, a flowchart diagram illustrating an example method of generating synthetic data is described. At step 2700, inter-dependence between all risk factors is modeled with a copula function. This is also referred to as specifying the joint distribution or multivariate distribution. Step 2700 includes sub-steps 2702-2708, described further below).

The second step (step 2710), includes specifying the marginal distributions or the distribution of the univariate risk factors themselves. This can be performed either by specifying a parametric distribution or by using a volatility model. Step 2710 includes sub-steps 2712-2714, described further below).

Note that the process of generating the option risk factors is subject to the following constraints: meaningful correlation (positive definite, as well as term structure) and volatility (term structure) of underlying future RFs and volatility RFs; reasonable shape for the volatility smile at each expiry; and non-arbitrage relation in time along the ATM strikes To achieve the first constraint, the correlation and volatility structure from historical risk factor data is used in step 2700. The second constraint and third constraint are achieved by enforcing arbitrage free conditions on the volatility smile at each expiry which is done in step two (step 2710). The second step (step 2710) may be performed such that the final dataset can be tailored for needs of a particular analysis. For example, a dataset can be constructed to test how an initial margin model handles abrupt changes in volatility.

At step 2716, one or more multi-regime datasets may be created. At step 2718, post-processing of the generated dataset(s) may be performed to inverse transform a set of risk factors to an original format. At step 2720, the post-processed dataset(s) may be stored as synthetic dataset(s), for example, in database(s) 1624.

Specification of the Joint Distribution

For the specification of the joint distribution (as part of step 2700), the following high level steps are performed. At sub-step 2702, transformation of historical option risk factors to a predefined set of risk factors may be performed. Sub-step 2702 may include transforming option risk factors into their forward volatility, risk reversal, and butterfly representations. Step 2700 may also include creating a copula to model joint distribution, including defining a historical period for fitting, calculating a dependence measure and selecting and generating the copula.

Transformation of historical option risk factors (sub-step 2702) may be used to maintain a reasonable shape for the smile curve at each tenor and also to capture a non-arbitrage relation in time along the ATM strikes. At sub-step 2702, the option risk factors may be transformed to a new (predefined) set of risk factors including: forward vol $v_{E;t}$, risk reversal $r_{E;t}$ and butterfly $b_{E;t}$. The forward vol for the first tenor (shortest tenor) is the ATMF risk factor at the same tenor:

$$v_{E_1;t} = \sigma_{0,E_1;t} \tag{128}$$

The forward volatility risk factor for the subsequent tenors is the following:

$$v_{E_i;t} = \sqrt{\frac{E_i \cdot (\sigma_{0,E_i;t})^2 - E_{i-1} \cdot (\sigma_{0,E_{i-1};t})^2}{E_i - E_{i-1}}}, i = 2, 3, 4 \tag{129}$$

The risk reversal risk factor is calculated for each tenor $E_i$ as follows:

$$r_{E_i;t} = \sigma_{1,E_i;t} - \sigma_{-1,E_i;t}, i = 1,2,3,4 \tag{130}$$

The butterfly risk factor is calculated for each tenor $E_i$ as follows:

$$b_{E_i;t} = \sigma_{1,E_i;t} - 2 \cdot \sigma_{0,E_i;t} + \sigma_{-1,E_i;t}, i = 1,2,3,4 \tag{131}$$

Thus after the transformation, instead of option risk factors at 3 strikes for each tenor, a forward volatility, risk reversal, and butterfly risk factor at each tenor are generated.

Regarding copulas, in general, an n-dimensional copula can be described as a multivariate distribution function defined on the unit cube $[0,1]^n$, with uniformly distributed marginal. In an example embodiment, a Gaussian copula is selected for the Benign Normal dataset and a t-copula is selected with the number of degrees of freedom set to 5 (e.g., to ensure a reasonably strong tail dependence) for the Regime Change dataset.

The following equations describe the Gaussian copula and t-copula:

$$C_R^{Ga}(u) = \Phi_R^n(\Phi_1^{-1}(u_1), \dots, \Phi_n^{-1}(u_n)) \tag{132}$$

$$C_{R,v}^t(u) = \Psi_{R,v}^n(\Psi_v^{-1}(u_1), \dots, \Psi_v^{-1}(u_n)) \tag{133}$$

The dependence measure chosen in constructing the copulas is linear correlation (Pearson correlation). Given a historical time period for fitting, the Pearson's correlation is computed for the matrix R. The method by which a linear correlation matrix R is applied to the joint distribution to enforce dependence is the Cholesky decomposition. This technique is performed for both the Benign Normal and Regime Change datasets.

To create the copula representing the joint distribution:
1. Transform option risk factors into their forward vol, risk reversal, and butterfly representations (sub-step 2702).
2. Filter the data appropriately given the input date range for historical fitting period (sub-step 2704).

3. Calculate absolute returns for the risk factors (sub-step 2706). Mean center and scale the returns to variance=1.
4. Calculate the dependence measure, the Pearson's correlation matrix R (e.g., for the historical return data).
5. Generate copulas for N synthetic draws (sub-step 2708)—either Gaussian copulas or t-copulas:
    a. For each draw, generate a random multivariate distribution. For a Gaussian copula, this is generated from the multivariate normal distribution. For a t-copula, this is generated from the multivariate t distribution.
    b. Apply the linear correlation R to the multivariate distribution with Cholesky decomposition.
    c. Transform the multivariate distribution to have uniform marginal distributions using the appropriate pdf.

Specification of Marginal Distributions

For the specification of the marginal distributions (step 2710) the following high level steps may be performed:
1. Fit the historical data for the fitted parametric marginals and the volatility model marginals (sub-step 2712).
2. Use the copula to generate the marginal distributions incrementally (sub-step 2714)
    a. Calculate synthetic return for a single day
    b. For option risk factors
        i. Apply mean reverting algorithm (only for the Regime Change dataset)
        ii. Check for constraints and no-arbitrage conditions. If a violation exists, discard return and simulate another set of returns. If no violation exists, move to simulate the next date.

For an example methodology, an unconditional mean model is chosen where the mean is set to zero. The GJR-GARCH(1,1) model is also chosen for the volatility model. Thus the equations for generating the Regime Change synthetic data are:

$$X_t = \mu_t + \varepsilon_t \text{ where } \varepsilon_t = \sigma_t Z_t \quad (134)$$

$$\mu_t = 0 \quad (135)$$

$$\sigma_t^2 = \omega + \alpha_1 \varepsilon_{t-1}^2 + \gamma_1 I_{t-1} \varepsilon_{t-1}^2 + \beta_1 \sigma_{t-1}^2 \quad (136)$$

In the fitting process for this model, the following parameters are found by MLE for each time series: $\omega$, $\alpha_1$, $\beta_1$, $y_1$. The shape and skew parameters to specify the NIG innovations are also found for each time series in the fitting process.

Mean Reverting Component and No Arbitrage Conditions for Option Risk Factors

To maintain meaningful correlation of volatility of underlying future RFs and volatility RFs, the dynamics of the simulated forward vol risk factor $\tilde{v}_{E;t}$ may be modeled as a time-dependent Wiener process with a mean-reverting component. In contrast, the risk reversal $\tilde{r}_{E;t}$ and butterfly $\tilde{b}_{E;t}$ risk factors may be simulated directly from the fitted parametric distribution or the volatility model return output without the mean-reverting component. For the forward vol risk factor, first the simulated return $d\tilde{v}_{E;t}$ are determined at the current time step. The mean of the historical forward vol risk factor $\bar{v}_E$ is then used to calculate the mean reverting component:

$$\tilde{v}_{E_i;t} = \tilde{v}_{E_i;t-1} + d\tilde{v}_{E_i;t} + \alpha_{MR} \cdot (\bar{v}_{E_i;t} - \tilde{v}_{E_i;t-1}), i=1,2,3,4 \quad (137)$$

Here $\alpha_{MR}$ is a mean reverting parameter set, for example, to 0.05. For simulation with no mean-reverting of the forward vol risk factor, set $\alpha_{MR}=0$. Once the simulated forward vol, risk reversal, and butterfly risk factors are computed, the constraint and no-arbitrage checks are performed. These checks include the following:

$$\tilde{v}_{E_i;t} > minvol \quad (138)$$

$$\tilde{b}_{E_i;t} > 0 \quad (139)$$

$$\tilde{\sigma}_{S=-1,E_i;t} > minvol \quad (140)$$

$$\tilde{\sigma}_{S=1,E_i;t} > minvol \quad (141)$$

The minimum volatility value minvol is set to 0.

Applying Marginal Distributions to Generate Synthetic Data Incrementally

To generate the synthetic data incrementally (sub-step 2714), the following process may be performed:
1. For the fitted parametric marginals:
    a. Fit each historical risk factor return series to the chosen parametric distribution using maximum likelihood estimation (MLE). This would result in the fitted parameters for either a normal distribution (location and scale parameters) or the NIG distribution (location, scale, shape, and skew parameters).
2. For the volatility model marginals:
    a. Fit each historical risk factor return series to the GARCH(1,1) model. This would result in the GARCH parameters for the volatility model and the parameters for the innovations (shape and skew parameters for NIG innovations).
3. Using the previously generated copula, generate M synthetic returns incrementally.
    a. Select an initial risk factor level for all risk factors.
    b. Using the copula uniform marginals generate a set of returns for a single day
        i. For the fitted parametric marginals:
            1. Apply the inverse CDF of the parametric distribution given the fitted parameters found in 1(a) to simulate the risk factor return. In the case of generating the benign normal dataset, the mean is set to zero and the MLE fitted standard deviation is used. (Alternatively, for the benign normal dataset, the simulated returns can be directly calculated by multiplying the correlated multivariate normal by either the MLE fitted standard deviation or a sample standard deviation for each risk factor.) In addition, the transformed option volatility risk factor returns may be multiplied by a constant (e.g., 0.01). (For the benign normal dataset, the volatility of the option risk factors may be reduced so that the constant volatility of the underlying is reflected, i.e., the volatility of the implied volatility is relatively small)
        ii. For the volatility model marginals:
            1. Create the corresponding innovations from the uniform copula marginals using the innovation parameters found in 2(a) by applying the inverse CDF and then simulate the risk factor return using the GARCH(1,1) model and the innovation.

c. Apply mean reverting algorithm for option risk forward vol risk factors.
    i. Compute historic forward vol return mean.
    ii. Adjust simulated forward vol returns with mean-reverting component.
d. Check for option risk factor constraints. If a violation occurs, discard the returns generated in 3(b). If no violation occurs then keep these returns, calculate the current risk factor level by adding the return to the previous date's risk factor level, and move to simulating the next date.
e. Repeat steps 3(b) to 3(d) until M returns that satisfy the given constraints are generated. Note that since some of the copula innovations are discarded because of violations, more than M innovations (e.g. M+1250) are required to create M returns.

Inverse Transformation Back to Volatility Risk Factors

For post processing (step 2718), the option risk factors may be transformed back to their original format.

Once the forward volatility, risk reversal, and butterfly option risk factors are simulated, an inverse transformation is applied to obtain synthetic option risk factors in their original format:

$$\sigma_{0,E_1;t} = \tilde{v}_{E_1;t} \tag{142}$$

$$\sigma_{0,E_i;t} = \sqrt{\frac{E_{i-1} \cdot (\sigma_{0,E_{i-1};t})^2 + (E_i - E_{i-1})(\tilde{v}_{E_i;t})^2}{E_i}}, i = 2, 3, 4 \tag{143}$$

$$\sigma_{-1,E_i;t} = \frac{(\tilde{b}_{E_i;t} + 2 \cdot \sigma_{0,E_i;t} - \tilde{r}_{E_i;t})}{2}, i = 1, 2, 3, 4 \tag{144}$$

$$\sigma_{1,E_i;t} = \frac{(\tilde{b}_{E_i;t} + 2 \cdot \sigma_{0,E_i;t} + \tilde{r}_{E_i;t})}{2}, i = 1, 2, 3, 4 \tag{145}$$

Model Calibration Module

Next, the calibration of model parameters for IRM 1616 is discussed. In some examples, the calibration of the model parameters may be performed by model calibration module 1628. Wo model parameters, the EWMA Lambda parameter and the Correlation Stress Weight, are discussed in detail below. However, it is understood that calibration of any other suitable parameters of IRM 1616 may be performed by model calibration module 1628. As discussed above, calibration may be performed by a user (e.g., an analyst, an administrator, etc.) in communication with model calibration module 1628 via user interface 1634.

In some examples, model calibration module 1628 may IRM 1616 calibrate the Lambda ($\lambda$) parameter of IRM 1616 associated with the EWMA process on an in-sample basis. Lambda may be used to adapt IRM 1616, for example, to current market volatility dynamics as per the EWMA process. IRM 1616

Once Lambda is calibrated, model calibration module 1628 may calibrate the Correlation Stress Weight ($w_{CS}$) parameter of IRM 1616. Thus, the calibration of Lambda and $w_{CS}$ may be performed, in some examples, sequentially rather than jointly. This may be appropriate as Lambda is designed to process univariate Risk Factors, while $w_{CS}$ targets the dependence structure between Risk Factors. Additionally, the EWMA volatility estimates $\sigma_{RV;t}$ for a given value date may be recalculated after calibration.

On any given value date in production, a user (e.g., a risk analyst) using IRM 1616 can take the calibrated values into account as one factor in determining the desired values of Lambda and Correlation Stress Weight. The user, via user interface 1634, can either accept or reject the calibrated values to update the parameters for IRM 1616, for example, based on current market conditions and any impact on clearing member portfolios.

The lambda parameter ($\lambda$) may be calibrated to meet a set of specified objectives within sample, and may be evaluated for performance on those same metrics out of sample. In an example configuration, P&L Rounding is set to off, the Volatility Floor is set to on, the Stress Volatility Component is set to on, the APC is set to off, the Range of $\lambda$ is set to 0.965 to 0.995, the Calibration increment is set to 0.005, the In-Sample Period is set to 500 days, the Calibration Frequency is set to 60 days and the Holding Period is set to 1 day. Once the calibration is completed, the calibrated Lambda is used for a predefined time period (e.g., the next 60 days). At the end of the time period (e.g., 60 days) another 500 day in-sample calibration may be completed with the calibration period ending on the current value date. In this manner, the Model may perform in-sample calibration at intervals corresponding to the calibration frequency. In this example, the portfolios used for the A calibration are the outright linear Risk Factor portfolios, with a total of 688 portfolios of this type (344 long and 344 short).

The calibration may be subject to the following two risk management constraints being satisfied:
   Basel Traffic Light (BTL) Reds: that the number of BTL Red portfolios does not exceed the threshold PA$^{(Red)}$ given by equation (155).
   Basel Traffic Light Yellows: that the number of BTL Yellow portfolios does not exceed the threshold PA$^{(Yellow)}$ given by equation (156).

The calibration objective may be formulated as follows:
   Average Coverage Ratio Minimization: that IRM 1616 seek a value of 2 that minimizes the average Coverage Ratio (described further below) across the calibration portfolios.

One purpose of the calibration is to find the set of parameters, first Lambda then the Correlation Stress Weight, that meet predefined risk management constraints—that is, to ensure with a high degree of certainty (e.g., at least 99%) that the initial margin exceeds in magnitude the realized variation margin over a margin period of risk. In an example embodiment, in the calibration procedure, the primary risk management concerns become the constraints, while the secondary objective related to the Coverage Ratio becomes the objective function.

Constraint Relaxation Process

In cases where the constraints identified above cannot be satisfied over the admissible range of parameters, the calibration process may be adjusted as follows:
   Relaxation #1:
      Objective function: minimize the number of BTL Yellows above the threshold PA$^{(Yellow)}$. In case of a tie, i.e., if the number of BTL Yellows is the same for several Lambda values, choose the Lambda value that yields the smallest Average Coverage Ratio.
      Constraint: Number of BTL Reds does not exceed the threshold PA$^{(Red)}$.

If the constraint in Relaxation #1 can be satisfied, a calibrated value of Lambda may be obtained. Otherwise, the following may be considered:
   Relaxation #2:
      Objective function: minimize the number of BTL Reds above the threshold PA$^{(Red)}$. In case of a tie, i.e., if this number is the same for several Lambda values, choose the value for which the number of the BTL Yellows above the threshold $PA^{(Yellow)}$ is smallest. If there is still a tie, i.e., if the number of the BTL Yellows is the same for several Lambda values, choose the Lambda value that yields the smallest Average Coverage Ratio.

No Constraints

Since Relaxation #2 does not contain any constraints, it is guaranteed that a calibrated value of Lambda may be obtained. Empirically it has been observed that relaxations occur infrequently. In one example, in calibrating Lambda based on historical data, relaxations were not been triggered in any of a 37 calibration periods.

A process similar to the Lambda calibration may be followed for the calibration of the Correlation Stress Weight $w_{CS}$. The differences between calibration of Lambda and the Correlation Stress Weight are in the calibration configuration and the calibration portfolios. In an example configuration, P&L Rounding is set to off, the Volatility Floor is set to on, the Stress Volatility Component is set to on, the APC is set to off, the Range of $w_{CS}$ is set to 1% to 5%, the Calibration increment is set to 0.5%, the In-Sample Period is set to 500 days, the Calibration Frequency is set to 60 days and the Holding Period is set to 1 day. In this example, the portfolios used for the Correlation Stress Weight $w_{CS}$ calibration include Risk Factor portfolios representing adjacent spread and butterfly strategies (both long and short). The use of spread and butterfly strategies may help to generate values of $w_{CS}$ that appropriately take account of non-directional risk portfolios. In this example, the Risk Factors include STIR, Bond Yield, Repo, OIS Swap, and Vanilla Swap Risk Factors.

Generally, the error of the VaR (percentile) estimator decreases as the number of available observations increases, which supports a longer, multi-year period lookback period. Moreover, for shorter VaR windows (e.g., 500 days), the initial margin is likely to exhibit unstable behavior. A longer lookback window further allows IRM 1616 to capture a greater range of market conditions (including periods of stress).

The slope of the margin curve above is treated as proxy for margin procyclicality. If the margin level is insensitive to the market stress level (a slope of zero), the margin may be considered to be non-procyclical. The desired margin behavior may be configured to meet the following constraints:

As market stress levels are increasing, the total amount of margin should not decrease. That is, downstream systems such as a Clearing House systems should not be actively returning margin as market conditions are deteriorating.

When the market stress level is above the level corresponding to the APC Index percentile (i.e. when the APC buffer begins to be eroded), the procyclicality of the final IM should be no worse than that of Base IM.

Model Testing Module

Model testing module 1630 may be configured to perform one or more tests over one or more testing categories for IRM 1616. In a non-limiting example embodiment, model testing module 1630 may be configured to perform one or more tests from among seven (7) testing categories. The seven testing categories may include:

1) Fundamentals Testing: Testing to explore the fundamental characteristics of the data and IRM 1616 components.
2) Backtesting: Comparing the IRM 1616 output (the IM) with actual market outcomes (calculated VM). The Backtesting process may be configured to assess model performance using out-of-sample data (e.g. data not used during the calibration process).
3) Procyclicality Testing: Backtesting using metrics designed to assess how well IRM 1616 addresses procyclicality.
4) Sensitivity Testing:
    a. Rolling Backtest Analysis: Assesses a performance of IRM 1616 over changing market conditions including periods of stress via backtesting with a rolling window.
    b. Parameter Sensitivity Analysis: Assesses changes in the output of IRM 1616 due to a change in an input parameter.
5) Incremental Testing: Starting from a most basic model, the impact on the output of IRM 1616 may be evaluated from the incremental addition of model components.
6) Model Comparison with Historical Simulation: Comparison of the output of IRM 1616 with the output of the historical simulation model.
7) Assumptions Backtesting: Backtesting related to specific Model assumptions.

Table 2 indicates how testing categories are paired with portfolios, as well as data that may be used for the various testing. Additional description of the different portfolios tested is provided below.

TABLE 2

Testing Overview of IRM 1616

| Testing Category | Portfolios | Data |
|---|---|---|
| Fundamentals | RF | Historical |
| Backtesting | RF, Synthetic Instruments, Real Instruments | Historical, Synthetic |
| Procyclicality | RF, Synthetic Instruments, Real Instruments | Historical, Synthetic |
| Sensitivity | Real Instruments | Historical |
| Incremental | Real Instruments | Historical |
| Comparison with Historical Simulation | Real Instrument | Historical |
| Assumptions | Real Instrument | Historical |

Synthetic datasets are created from random draws from a specified distribution. This is described in detail above. In the example, the datasets are created to mimic historical Risk Factors and are designed for specific testing purposes. There are two types of synthetic data sets used in testing:

Benign Normal Datasets (Backtesting only)—The benign synthetic data has the same number of Risk Factors as the historical Risk Factor data. The data is generated from a multi-variate normal distribution with empirically observed constant volatilities and a constant correlation. This data is designed to test the Initial Margin Model with no shocks coming from the data.

Regime Change Datasets (Backtesting only)—The regime change synthetic data also has the same number of Risk Factors as the historical Risk Factor data. This data is generated using a t-copula for the joint distribution and a GARCH model for the marginal distributions. The data contains a regime of volatility stress based on the historical time period 2007-2009 surrounded by regimes of relative calm. The dataset is designed to test the Initial Margin Model with a scenario of changing volatility and changing correlation.

The construction of testing portfolios follows a "building-block" approach. This approach aims to test particular parts of the model workflow to ensure proper functionality as well as to expose IRM 1616 to real world portfolios. The portfolios range from simple constructions to more complex: the most basic portfolios are Risk Factor "outright" portfolios, which test how IRM 1616 handles single risk factors with no complexities related to pricing. One set of the more complex portfolios are the clearing member portfolios which help ensure proper initial margin coverage at an aggregated level.

Portfolio groups may include synthetic risk factor, synthetic (non-linear) instrument and real instrument groups. With synthetic risk factor groups, Risk Factor portfolios may contain outright Risk Factors or linear combinations thereof. In the example, pricing functions are not used to generate P&L distribution with these portfolios. The VM on day t is calculated by subtracting the Risk Factor value on day t from the Risk Factor value corresponding to the day at the end of the holding period.

With synthetic instrument groups, stylized theoretical option instruments may be created to mimic a constant time to maturity and delta risk profile. The portfolio holdings may be rolled back on each day to their specified time to maturities (e.g., 3M to expiry) and to their specified relative strike (e.g., ATM+1). For VM calculations the portfolio holdings may be fixed over the holding period, i.e. the absolute strikes are kept unchanged. The VM on day t is calculated by subtracting the portfolio value on day t from the portfolio value corresponding to the day at the end of the holding period. In some examples, IRM 1616 may perform a full revaluation, so that each option for each scenario may be fully repriced.

With real instrument groups, portfolios may contain exchange listed contracts (e.g., "real instrument positions") rolling through time but having consistent exposure (e.g. W1, W2, etc.). Pricing functions may be used to generate P&L distribution. Position holdings may be rolled to the next expiry 2 days ahead of the respective nearest contract expiry (e.g. STIR futures may roll monthly or quarterly, repo futures may roll monthly). Absolute option strikes may be adjusted daily as specified by their relative strikes (e.g. ATM+1). For VM calculations, the portfolio holdings may be fixed over the holding period (for example, absolute strikes may be kept unchanged for option instruments). The VM on day t is calculated by subtracting the portfolio value on day t from the portfolio value corresponding to the day at the end of the holding period.

In some examples, IRM 1616 may be evaluated against three types of portfolios: one or more stylized strategies, one or more random portfolios and one or more real clearing member(s) (CM) portfolios.

For stylized strategies, theoretical portfolios may be composed by risk factors, synthetic and/or real instruments, which may follow a specific trading strategy throughout their existence so as to be comparable over time. In some examples, some of the items of the theoretical portfolios (e.g., risk factors, synthetic instruments, real instruments) may also be designed based on the positions of one or more CMs.

For random portfolios, hypothetical portfolios may be configured that could conceivably be exposed to, but that might not be represented by, actual observed portfolios or specific stylized strategies. The portfolio weights in random portfolios may be generated randomly according (for example) to a uniform distribution with $weight_i \sim U[-1,1]$, and with positive (negative) values indicating a long (short) position. Once generated, the weights in a random portfolio may remain fixed to allow for meaningful comparison over time. The portfolio components include synthetic Risk Factors and/or instruments.

For real CM portfolios, positions as observed historically in the accounts of one or more clearing members may be used. This set of portfolios may be useful to assess the performance of IRM 1616 as if it had been in place at the clearing house system during the testing period.

The available days for backtesting a portfolio may vary depending on the portfolio type. In general, portfolio types may be tested against the entire history available. For certain portfolios or product types, the period for backtesting may be reduced because of the availability of data related to portfolio construction and/or data related to VM. For example, bond futures may have less data available for VM than other products and the backtest period may be much shorter for other products.

The following symbols are used to denote different backtest periods of the historical data for a non-limiting example of testing of IRM 1616:

$B_0$ as the (full) available backtest period (Sep. 3, 2007 to Feb. 14, 2018)

$B_{CM}$ as the (full) available backtest period for Clearing Member backtests (May 1, 2013 to Feb. 14, 2018)

$B_S$ as the backtest period for a chosen stress period (Sep. 3, 2007 Aug. 10, 2009)

Fundamentals Testing Category

Fundamentals testing may be used to analyze key properties of the Risk Factor time series data on which IRM 1616 is based, and may provide evidence that modeling choices are consistent with the data. Properties of the Risk Factor time series data may include, without being limited to, autocorrelation, volatility clustering, heavy tails, weak stationary and zero versus non-zero mean. For example, (linear) autocorrelations of return time series are often insignificant. Regarding volatility clustering, time series of squared returns (and magnitudes of returns) typically show significant autocorrelation. Regarding heavy tails, return series are typically leptokurtic (or heavy tailed). Regarding weak stationarity, returns are typically (weakly) stationary, which may allow for meaningful forecasting. Regarding zero vs. non-zero mean, the conditional mean of returns is often statistically insignificant. Accordingly the one-day (unsealed) RF return time series may be analyzed in light of the above characteristics. In the example, log returns are used for option RFs and FX RFs whereas absolute returns are used for all linear RFs.

The RF returns are assessed to determine whether the returns exhibit significant autocorrelation based on the 1250 day period from Apr. 17, 2013 to Feb. 16, 2018. The Ljung-Box test with 10 lags is used to test the null hypothesis that all autocorrelations up to lag 10 are zero.

The RF returns are assessed to determine they the returns exhibit volatility clustering, which is manifested as the positive autocorrelation in the squared returns based on the 1250 day period from Apr. 17, 2013 to Feb. 16, 2018. The significance of these autocorrelations at the 5% level of significance is tested using the Ljung-Box test with 10 lags.

The one-day RF returns are assessed to determine whether the returns exhibit heavy tails by examining the (unconditional) excess kurtosis computed based on the period from Sep. 25, 2002 to Feb. 16, 2018. Together with the presence of autocorrelation in squared returns, the heavy tails are indicative of volatility clustering, which suggests that a filtering approach is appropriate (i.e., as opposed to the simpler Historical Simulation approach).

The RF returns are assessed to determine whether the returns are weakly stationary, i.e., if they maintain a constant unconditional mean, variance and autocorrelation, computed based on the period from Sep. 25, 2002 to Feb. 16, 2018. The presence of weak stationarity is important for meaningful volatility forecasting.

Unit root tests are used including the Phillips-Perron and augmented Dickey-Fuller (ADF) test with 10 lags. The null hypothesis for both unit root tests is that the time series has a unit root, so that a small p-value supports stationarity. For each of the 476 RFs, the p-values for both of the unit root tests applied are significant at the 5% significance level, supporting weak stationarity.

The RF returns are assessed to determine whether the returns exhibit statistically significant means using a rolling analysis over the period from Aug. 3, 2007 to Feb. 16, 2018 with a window of 1250 days. The Student's t-test is applied to the (unsealed) RF returns at the 5% significance level. The null hypothesis for the test is that the true mean return is zero; hence a small p-value would indicate a significant non-zero mean.

The presence of volatility clustering and heavy tails of the RF returns suggests that a filtering approach may be desired to explain the observed volatility behavior and produce an accurate volatility forecast. The EWMA filtering approach may be compared with the more general GARCH(1,1) filtering approach by performing the residuals diagnostics for the fitted models and by applying the Akaike Information Criterion.

In the case of EWMA, the model equations are used:

$$r_t = \mu + \sigma_t \varepsilon_t, \quad \sigma_t^2 = \lambda \sigma_{t-1}^2 + (1-\lambda) r_{t-1}^2 \quad (146)$$

whereas in the case of GARCH the model equations are used:

$$r_t = \mu + \sigma_t \varepsilon_t, \quad \sigma_t^2 = \omega + \beta \sigma_{t-1}^2 + \alpha r_{t-1}^2 \quad (147)$$

where the error term $\varepsilon_t$ is assumed to be normally distributed with mean 0 and variance 1 in both models.

The EWMA model and GARCH model are fitted to each of the RF return time series using the Maximum Likelihood Estimation (MLE) principle, so that each RF has its own set of fitted model parameters. The 1250 day period from Apr. 17, 2013 to Feb. 16, 2018 is used. For both EWMA and GARCH, the model parameter $\mu$ is fitted. For EWMA an additional parameter A is fitted and for GARCH(1,1), the three additional parameters $\alpha, \beta, \omega$ are fitted.

To test the assumption of independence of the residuals $E_t$, the Ljung-Box test is used with 10 lags (for the absence of autocorrelation) at the 5% significance level. The test is applied to the residuals and squared residuals, respectively. Both models help to reduce substantially the number of significant autocorrelations in the squared residuals when compared to the no filtering model The Kolmogorov-Smirnov test at the 5% significance level is used to assess if the residuals follow the distribution specified in the model (e.g., normal distribution). The null hypothesis for the Kolmogorov-Smirnov test is that the two distributions under consideration are the same.

The two models are further compared using the Akaike Information Criterion (AIC), which evaluates the model's goodness-of-fit adjusted for the number of model parameters. The AIC formula is used with normalization by the sample size N:

$$AIC = -\frac{\log(\text{likelihood})}{N} + \frac{2k}{N},$$

where k is the number of model parameters. The AIC criterion implies that a more complex model with a larger number of parameters is justified if the difference in optimized log likelihoods is bigger than the number of additional parameters.

In comparing the EWMA with GARCH(1,1) models, both EWMA and GARCH(1,1) generally help to explain the RF behavior. It is observed that GARCH(1,1) performs better in some aspects of model evaluation (e.g., autocorrelation in squared residuals) while EWMA has a comparable performance in some other aspects (e.g., goodness-of-fit, AIC). Thus overall EWMA appears to be an adequate parsimonious model. EWMA may be more desirable from the point of view of operational simplicity, as the parameters of the GARCH(1,1) model would likely need to be adjusted on the individual RF basis (in contrast with EWMA where the same calibrated Lambda can be applied for all RFs) and may need more frequent recalibration.

Next, the use of a single Lambda across all RFs in EWMA filtering is demonstrated as being appropriate and that the basic EWMA model with a single Lambda (without any additional components) performs reasonably well at the univariate RF level. Specifically, the basic EWMA model (described above) is considered (e.g., without any such additional model components 1710 as volatility floor, stress volatility, etc.) with A fitted for each Risk Factor using the Maximum Likelihood Estimation principle. In this example, the error term is assumed to have Student's t-distribution with the number of degrees of freedom set equal to 3, and) is re-fitted on each backtest day. This model is compared with the basic EWMA model based on a single Lambda set equal to 0.98 across all RFs an all backtest days.

The volatility forecast $\sigma_T$ is capped at the maximum historical volatility $\sigma_{max;T}$. It is examined how often the volatility cap kicks in by being the smaller of the two arguments of the minimum function, i.e., how often it is observed that $$\sigma_{max;T} < \max(\sigma_{RV;T} + \Delta\sigma_{stress;T}, \sigma_{Floor;T}) \quad (148)$$

in the APC Off configuration, and $$\sigma_{max,T} \quad (149)$$
$$< \max(\sigma_{RV;T} + \alpha_{APC;T} \cdot \max(\Delta\sigma_{RV;T}, APC_{buffer} \cdot \sigma_{RV;T}), \sigma_{Floor;T})$$

in the APC On configuration. The study is performed for the historical data set across all RFs in the APC On and APC Off configurations, over the period from Sep. 3, 2007 to Feb. 14, 2018.

It is determined that the volatility cap does not kick in for any of the RFs in the APC Off configuration.

The treatment with de-meaning and re-meaning vs. no mean treatment (the adopted treatment in IRM 1616) are compared for the purpose of RF scenario generation. Since one of the objectives of de-meaning is to remove the drift/mean from the returns, a t-test for zero mean is applied to a set of the RF scenario returns computed with de-meaning and a corresponding set of the RF scenario returns computed without any mean treatment. The null hypothesis for the test is that the mean is zero; hence a small p-value would indicate a significant non-zero mean.

The EWMA formula for the variance term uses an initialization, or "seed" value, for the first variance term at time $\tau=1$ to start the recursion process. The initial return at that same time also appears in the equation but does not need an initialization as the first available data point in FD is already defined in terms of returns.

Different seed values could conceivably result in different volatility estimates, leading to different Initial Margin estimates as the scenario distributions are affected by volatility estimates. The choice of the seed value and whether the seed value may cause a statistically significant difference (at the standard 5% significance level) in the distribution of the Risk Factor scenarios are examined.

The hypothesis that a different seeding method does not produce a statistically different distribution of the Risk Factor scenarios is tested. As a reasonable alternative seeding method, the seed value is set equal to the square of the initial return within the lookback window. The Kolmogorov-Smirnov test is applied to compare the distribution of the RF scenario returns computed with the adopted EWMA seeding method and the alternative method. The null hypothesis for the Kolmogorov-Smirnov test is that the two distributions under consideration are the same. The analysis is performed over the period from Sep. 3, 2007 to Feb. 14, 2018, with $W_0=1250$ scenarios on each day.

The adopted square-root-of-time time scaling rule (discussed above)) may be justified in the absence of autocorrelations in the risk factor returns. As observed above, some of the RFs exhibit significant autocorrelations. However, the performance of the chosen time scaling method is still expected to be adequate since for the majority of the RFs the magnitude of autocorrelation coefficients is small or only moderately large.

Accordingly, a 2-day Risk Factor backtesting of the basic EWMA model (with a fixed Lambda of 0.98) is performed where the time scaling is performed using the square-root-of-time rule.

Next, the behavior of the RF APC indices during high volatility and low volatility conditions is examined.

To further assess the adequacy of the RF APC Indices, the procyclicality profiles of the basic EWMA vol $\sigma_{RV;T}$ vs. EWMA vol are compared with the APC buffer $\sigma_T$ defined as:

$$\hat{\sigma}_T = \sigma_{RV;T} + \alpha_{APC;T} \cdot APC_{buffer} \cdot \sigma_{RV;T} \quad (150)$$

As a measure of procyclicality an analog of the APC Expected Shortfall is used (with the initial margins being replaced with volatilities in equation (168)). It may be observed that the APC buffer indeed helps to improve the procyclicality profile as manifested in the reduced APC Expected Shortfall for all Risk Factors.

Correlation analysis is conducted to assess the reliability and significance of correlations between different interest rate instruments over time. An instrument is understood here as a set of contracts grouped by product category and currency. The statistical properties of products corresponding to the same interest rate instrument are considered as indicative of reliable and significant correlations, including resilience during stressed historical periods. The reliability of the correlation between two instruments may be measured by the change in the correlation between the corresponding representative products over the holding period. Two instruments are significantly correlated if the correlation between the corresponding representative products is statistically significant (from zero).

Pairs of representative products may selected that are part of any desired types of products for use with IRM 1616. In this example, two sets of pairs are considered: one set where the two instruments belong to the same ESMA Margin Group, and the other set with pairs where the two instruments belong to different ESMA Margin Groups.

The correlation analysis is conducted for 1-day instrument returns on a rolling (overlapping) window basis over the historical period from Sep. 3, 2007 to Feb. 14, 2018, inclusive of available stress events. The length of the rolling window is set to 1250 days in line with the choice of the lookback window $W_0$ in IRM 1616. Settlement data for instrument returns is used when available; otherwise instrument returns derived from the Risk Factors is used. Both Pearson correlation levels and changes in Pearson correlation over the 2-day holding period are examined.

Next, the impact of the scaling process on correlations among the Risk Factor returns is examined. In particular, this scaling process includes the Volatility Floor and Stress Volatility components of IRM 1616. For the analysis, Risk Factor pairs corresponding to spreads in the set of Stylized Synthetic (Linear) Risk Factor portfolios are considered, limiting the analysis to the spreads that contain exactly two RFs. In this example, the total number of such spreads is 247.

For each RF pair, Pearson and Kendall tau correlations are determined before and after for each business date from Sep. 3, 2007 to Feb. 14, 2018. Whereas the Pearson correlation measures the degree of linear dependency, the Kendall tau correlation measures the ordinal association (i.e., rank correlation) between the two quantities. The scaled correlations for each date are computed based on the 1,250 RF return scenarios scaling (APC On, 1-day holding period) on that date; the unscaled correlations are evaluated based on the 1-day RF returns in a lookback window of 1,250 days for the corresponding date.

Next the proportion of static arbitrage instances (including call/put spread arbitrage, butterfly arbitrage, and calendar arbitrage) in the option RF scenarios (APC On, 2-day holding period) is determined across all dates from Sep. 3, 2007 to Feb. 14, 2018 and all 129 option Risk Factors. This proportion is compared to the corresponding proportion of arbitrage instances in the settlement data used to generate the RFs.

Next, what types of returns (absolute or logarithmic) are appropriate for each group of the RFs (linear RFs, option RFs, and FX) are determined. Specifically, it is examined for what return type the scaled RF returns exhibit better stationarity, homoscedasticity (constant variance) and have less autocorrelation. This study is non-parametric and is thus consistent with the fact IRM 1616 does not impose any parametric constraints of the distribution of the RF returns.

Two sets of 1250 RF return scenarios are generated on the backtest date (Feb. 14, 2018): one set is obtained using absolute returns for all RFs and the other is obtained using log returns for all RFs. As some linear RFs may be negative, in which case log returns may be undefined, only those linear RFs for which a full set of scaled log returns on Feb. 14, 2018 are available are examined.

To assess weak stationarity, the Phillips-Perron test is used. The null hypothesis for the test is that the time series has a unit root, so that a small p-value supports weak stationarity. To assess the significance of autocorrelations, the Ljung-Box test with 10 Lags is applied to the scaled RF returns. To assess homoscedasticity, the Ljung-Box test with 10 lags is applied to the squared RF return scenarios. In the presence of homoscedasticity, it is expected to observe zero autocorrelation in the squared RF return scenarios, in which case a small p-value is not observed.

Backtesting Category

The backtesting framework compares the Initial Margin (determined by IRM 1616) calculated for portfolios to the realized variation margin for data that is out-of-sample, i.e. not used in the calibration of IRM 1616. The expected coverage of IRM 1616 is related to the VaR confidence level. As per applicable regulatory requirements for ETD products, the confidence level may be set to 99%, which implies that the VM can be expected to exceed the IM (in magnitude) 1% of the time. The expected exceedance probability is denoted as p=1-0.99. When the VM is strictly smaller than the IM this is termed synonymously as an exceedance, or a breach. In order to evaluate if the observed performance of IRM 1616 is aligned with expectation, all portfolios (in some examples) are backtested with several metrics calculated.

Let D denote the total number of backtest days and let $d \in \{1, \ldots, D\}$ be the backtest day index. The backtest days form the backtest period [FBD,LD]. The variation margin $VM_d$ on backtest day d is defined as the portfolio P&L over the margin period of risk, i.e., the difference between the portfolio value at the end of the MPOR and the portfolio value on day d.

Let $\{IM_d\}_{d=1}^D$ and $\{VM_d\}_{d=1}^D$ be the series of Initial Margins and variation margins, respectively, calculated for a portfolio over the backtest period. The breach indicator variable $\{I_d\}_{d=1}^D$ is defined as $$I_d = \begin{cases} 1 \text{ if } IM_d > VM_d \\ 0 \text{ if } IM_d \leq VM_d \end{cases} \quad (151)$$

for $d \in \{1, 2, \ldots, D\}$. It is noted that IM≤0 so that a breach occurs where IM is larger than VM. Let $n_1$ be the number of exceedances so that $n_1 = \Sigma_{d=1}^D I_d$ and let $n_0 = D - n_1$ be the number of non-exceedances.

The Breach Size on backtest date d is defined as follows:

$$BS_d = \frac{VM_d}{IM_d}, \text{ if } I_d = 1 \quad (152)$$

The metric is defined only for $I_d=1$, i.e. only on day d when a breach occurs. If $IM_d$ is zero then Breach Size is undefined.

To construct the time series of breach events, two time-series aggregation methods are used: the overlapping method and the non-overlapping method. Let $h \in \{1,2\}$ denote the holding period expressed in days, and let $IM_d$ and $VM_d$ denote the initial and variation margin correspondingly on backtest date d, where $d \in \{1, 2, \ldots, D\}$. The two aggregation methods are then defined as follows.

If the overlapping data method is applied, the pairs ($IM_d$, $VM_d$) of h-day IM and VM for successive backtest dates will be used to determine whether a breach event occurs. Although such method does not reduce the original sample size, it creates dependency in the data. This method is defined only if h>1.

The non-overlapping method is used for h≥1. Aggregate the original overlapping VM and IM time series into h groups of non-overlapping time series, beginning from the earliest date in the backtest period. If D is a multiple of h then the size of each group is given by $$N = \frac{D}{h} \quad (153)$$

If D is not a multiple of h then let r be the remainder after dividing D by h. Then the size of the groups 1 through r is $$\left\lfloor \frac{D}{h} \right\rfloor + 1$$

and the size of the remaining groups is $$\left\lfloor \frac{D}{h} \right\rfloor$$

(here $\lfloor \cdot \rfloor$ denotes the floor operator that rounds the number down to the nearest integer). For example, when h=2 and D=7 (where d includes dates d=1, 2, 3, 4, 5, 6 and 7), four (4) first groups (d=1, 3, 5 and 7) alternating with three (3) second (remaining) groups (d=2, 4 and 6) are created. The non-overlapping method does lead to the reduction of the effective sample size; however, in contrast with the overlapping method, it does not create dependency in the data and thus standard statistical tests can be applied to evaluate the performance.

Based on the portfolio composition for the IM calculation and the chosen source of VM, three types of backtesting may be performed: Risk Factor, settlement VM (SM VM) and risk factor derived VM (RF VM). The Risk Factor type of backtesting may include Risk Factor Portfolio P&L/IM and/or Risk Factor VM (RF Portfolios). In the Risk Factor type of backtesting, the VM is calculated directly from Risk Factor levels rather than from actual instrument prices. In some examples, P&L rounding may not be applicable to the Risk Factor portfolios since price ticks are not defined. SM VM and RF VM are both a type of Instrument backtesting. The Instrument backtesting may include Instrument Portfolio P&L/IM. For the Settlement VM type (e.g., many Real Instrument Portfolios), the VM is calculated directly from instrument prices. For the Risk Factor Derived VM (e.g., Synthetic Instrument and select Real Instrument Portfolios), the SM VM may be used for portfolios where Settlement VM may not exist or may not be tested. For consistency of the test, P&L rounding may not be applied.

The following two large-scale configurations are defined when executing a complete backtest run (in the example below):

APC On or APC Off—Backtest with APC component turned on versus turned off

1Day or 2Day—Backtest with holding period set to 1 day versus being set to a regulatory mandated 2 day ETD holding period.

Using these two configuration choices, the following four combinations of backtest runs can be performed for all portfolios: 1 Day-APC Off, 1 Day-APC On, 2 Day-APC Off, 2 Day-APC On, with the exception of Risk Factor Portfolios and Non-Linear Synthetic Portfolios for which only 1 Day-APC Off, 1 Day-APC On runs are performed.

For the backtesting metrics, two types of metrics may be distinguished: Primary and Investigative. Primary metrics are assigned thresholds on a Red-Amber-Green (R-A-G) evaluation scale. Investigative metrics are additional metrics that may further explain backtesting results.

For primary metrics, a Red-Amber-Green (R-A-G) evaluation scale is provided. A "Green" outcome indicates the backtesting result does not suggest an issue with the quality of the IRM 1616. An "Amber" outcome suggests that while the IRM 1616 has an adequate performance overall, an investigation may be performed for that portfolio; while a "Red" outcome indicates that there may exist a potential model issue and additional analysis may be performed. It is noted that portfolios where the total count of "Amber" is below the PA metric (discussed below; where applicable) are considered to perform within the accepted statistical tolerance.

One of the primary metrics to evaluate IRM 1616 backtest results is the Basel Traffic Light (BTL) metric. The Basel Committee on Banking Supervision developed an evaluation framework for the probability of observing a particular number breaches. The rationale behind using this test is to assess whether the unconditional coverage of the initial margin model does not exceed the target breach probability.

The breach event on a backtest date can be modeled as a Bernoulli random variable. Hence, the cumulative number of breaches can be modelled as a binomial random variable. Given a confidence level 1−p (or equivalently, given the breach probability p), the probability of observing a number of breaches not exceeding $n_1$ over D backtest days is given by $$F(n_1; D, p) = \sum_{i=0}^{n_1} \binom{D}{i} p^i (1-p)^{D-i} \quad (154)$$

where F is the binomial cumulative distribution function with parameters D, p. Three zones defined in the BTL test are Green, Yellow, and Red, with each zone corresponding to a range of the cumulative probability for the binomial distribution:

Green: if $F(n_1; D, p) < 95\%$, i.e., $n_1$ corresponds to a cumulative probability below 95%, then the portfolio passes;
Yellow: if $95\% \leq F(n_1; D, p) < 99.99\%$, i.e., $n_1$ corresponds to a cumulative probability at or above 95% but below 99.99%, then the portfolio may require further investigation;
Red: if $F(n_1; D, p) \geq 99.99\%$, i.e., $n_1$ corresponds to a cumulative probability at or above 99.99%, then the portfolio fails the test.

The BTL test is used in combination with either the non-overlapping method or the overlapping aggregation method. The application of the BTL test may be straightforward when the overlapping aggregation method is used. For the non-overlapping aggregation method, the BTL test procedure described above is applied to each of the h groups of non-overlapping time series. The outcome is then determined based on the average value of the cumulative probability across the groups.

Table 3 shows BTL zones expressed in terms of the cumulative probability thresholds as well as in terms of the number $n_1$ of breaches for a 500-day sample (assuming overlapping aggregation method) at the 99% VaR confidence level. If the true coverage probability of the model is 1%, it is expected that for a 500 day sample, there will be less than 9 breaches for 95% of the portfolios tested (Green), assuming the independence of all outcomes.

TABLE 3

BTL Outcomes on the R-A-G Scale

| R-A-G | BTL Zone | Cumulative Probability Thresholds | Number of Breaches 500 day sample, 99% VaR |
|---|---|---|---|
| G | Green | <95% | $n_1 < 9$ |
| A | Yellow | >=95% and <99.99% | $9 \leq n_1 < 15$ |
| R | Red | >=99.99% | $n_1 \geq 15$ |

Since the power of the test is low in small sample sizes, the following rules apply for different sample sizes:
  $D \geq 500$—the test can be applied both in the case of 1-day and 2-day holding period
  $250 \leq D < 500$—the test can be applied in the case of 1-day holding period, or in the case of 2-day holding period provided the overlapping aggregation method is used
  $D < 250$—the test will not be conducted
The BTL test is one-tailed and hence may not be operational to detect models with unconditional coverage that is too conservative.

The BTL test is used in combination with either non-overlapping or overlapping aggregation method. Each method may have some limitations. The use of the non-overlapping aggregation method may result in the reduction of the effective sample size when h>1. At the same time the breach series can be assumed to be independent with this approach. On the other hand, the overlapping aggregation method may create dependence in the data although it does not reduce the original sample size. In the case of 2-day holding period, the BTL results are reported based on the non-overlapping aggregation method unless stated otherwise.

Next, a method to aggregate BTL results of a group of portfolios (e.g., RI-Real CM, SI-Random, etc.) and determine whether the observed numbers of Yellow and Red portfolios are acceptable is described.

For a group of portfolios, let $n^* > 1$ be the total number of portfolios and let $N^{(Yellow)}$ and $N^{(Red)}$ be the observed number of Yellow and Red portfolios, respectively. By assuming independence of BTL results across different portfolios, the theoretical thresholds for the number of Yellow and Red portfolios may be derived at the confidence level $p' = 99.99\%$. Specifically, the thresholds "Yellow Portfolios Allowed" ($PA^{(Yellow)}$) and "Red Portfolios Allowed" ($PA^{(Red)}$) are defined as:

$$PA^{(Red)} = \lfloor F^{-1}(p'; n^*, 0.0001) \rfloor \quad (155)$$

$$PA^{(Yellow)} = \lfloor F^{-1}(p'; n^*, 0.05) \rfloor - \lfloor F^{-1}(p'; n^*, 0.0001) \rfloor \quad (156)$$

where $F^{-1}$ is the inverse binomial cumulative distribution function and $\lfloor \cdot \rfloor$ denotes the floor operator that rounds the number down to the nearest integer. In one implementation of the inverse cumulative distribution function of the binomial distribution, this function is in line with the Microsoft Excel® 2013 function binom.inv( ).

The observed numbers of Yellow and Red portfolios are considered as acceptable (at p'=99.99%) if the following inequalities are satisfied:

$$N^{(Yellow)} \leq PA^{(Yellow)} \quad (157)$$

$$N^{(Red)} \leq PA^{(Red)} \quad (158)$$

A possible limitation of this approach is that it does not take into account the existence of possible relations in the portfolio group.

Investigative metrics may be used when additional analysis of backtesting results is desired. The R-A-G thresholds are assigned where appropriate to identify any outliers for further investigation. Portfolios where the total count of either Red or Amber is below the relevant PA metric are considered to perform within the accepted statistical tolerance.

The Kupiec test for unconditional coverage (also referred to as the proportion of failures test, or POF test) evaluates whether the observed number of breaches is consistent with the desired coverage probability p. While serving a similar purpose to the BTL Test, Kupiec's POF Test can provide an additional assessment of whether the model IM is too conservative.

The null and alternative hypothesis to be tested is as follows:

$$\begin{cases} H_0: E[I_d] = p \\ H_1: E[I_d] \neq p \end{cases} \quad (159)$$

Under the null hypothesis the coverage is correct when the expectation of $I_b$ equals the coverage probability. The test statistic is given by $$LR_{uc} = -2\log\left(\frac{L(p)}{L(\hat{\pi})}\right) = -2\log\left(\frac{(1-p)^{n_0} p^{n_1}}{(1-\hat{\pi})^{n_0} \hat{\pi}^{n_1}}\right) \quad (160)$$

where $$\hat{\pi} = \frac{n_1}{n_0 + n_1}$$

is an estimate of p. The test statistic $LR_{uc}$ is asymptotically distributed as the chi-square distribution $\chi^2(1)$ with 1 degree of freedom as the number of backtest days D→∞. Note that this test is two-tailed and that a failure can occur if the number $n_1$ of breaches is too high (fails aggressively implying $E[I_d] > p$) or too low (fails conservatively implying $E[I_d] < p$). A failure occurs when the test statistic exceeds the $\chi^2(1)$ threshold value for a chosen significance level.

The p-value associated with the calculated test statistic $LR_{uc}(p, \hat{\pi})$ is found as follows:

$$p\_value_{LR_{uc}} = Pr(LR_{uc} \geq LR_{uc}(p, \hat{\pi})) \quad (161)$$

The test is performed at the 5% significance level and the following three possible outcomes are considered:
  Pass if the p-value computed using equation (161) is greater than or equal to 5%,
  Fail Aggressive if the p-value is less than 5% and the observed breach proportion $\hat{\pi}$ is above p=1%, and
  Fail Conservative if the p-value is less than 5% and the observed breach proportion $\hat{\pi}$ is below p=1%.

The Fail Conservative outcome is not regarded as an indication of an inappropriate model; instead, it suggests the model behavior is conservative as the realized breach probability is below 1%. Accordingly, the R-A-G scale shown in Table 4 may be preferred for reporting the Kupiec test results.

TABLE 4

R-A-G Threshold for Kupiec Test

| R-A-G | Threshold |
|---|---|
| G | p-value ≥ 5% or $\hat{\pi}$ < 1% |
| A | 0.01% ≤ p-value < 5% and observed breach proportion $\hat{\pi}$ > 1% |
| R | p-value < 0.01% and $\hat{\pi}$ > 1% |

The Kupiec test is used in combination with either non-overlapping or overlapping aggregation method. In case when the non-overlapping aggregation method is used, the test procedure described above is applied separately to each of the h groups of non-overlapping time series, and the outcome is determined based on the average p-value taken across the groups. The Kupiec test results for multiple portfolios can be aggregated using a method analogous to the overlapping/non-overlapping aggregation methods described above.

Possible limitations of the Kupiec test may include that the Kupiec test has limited power for small sample sizes and may fail to detect VaR measures that systematically under-report risk. Therefore, in some examples, the test may not be conducted if the sample size is less than 250 observations. Moreover, the chi-square approximation used in the test may be inaccurate for small coverage probabilities (equivalently, high confidence levels) and only moderately large sample sizes. As a result, the actual significance level of the test, in some examples, may be higher than the nominal (5%) significance level.

The Christoffersen test of independence is a likelihood ratio test aiming to assess if breach events are independent of each other. If not, the breaches can cluster (especially in periods of stress).

The Christoffersen test for independence tests whether the sequence of breaches is independent, i.e. that the occurrence of a breach on day d is independent of the occurrence of a breach that occurs on day d−1. The null and alternative hypothesis to be tested are thus specified as follows:

$$\begin{cases} H_0: \pi_{01} = \pi_{11} \\ H_1: \pi_{01} \neq \pi_{11} \end{cases} \quad (162)$$

where $\pi_{ij} = Pr(I_d = j | I_{d-1} = i)$. The null hypothesis states that the probability of a breach on day d is the same regardless of whether a breach occurred on day d−1. The alternative is that a breach is less or more likely to happen on day d if a breach occurred on day d−1. The test statistic is the following likelihood ratio:

$$LR_{ind} = -2\log\left(\frac{L(\Pi_2)}{L(\Pi_1)}\right) = -2\log\left(\frac{(1-\hat{\pi}_2)^{n_{00}+n_{10}}\hat{\pi}_2^{n_{01}+n_{11}}}{(1-\hat{\pi}_{01})^{n_{00}}\hat{\pi}_{01}^{n_{01}}(1-\hat{\pi}_{11})^{n_{10}}\hat{\pi}_{11}^{n_{11}}}\right) \quad (163)$$

The term $n_{ij}$ is designated as the number of observations with value i followed by j, $$\hat{\pi}_{01} = \frac{n_{01}}{n_{00}+n_{01}}, \text{ and } \hat{\pi}_{11} = \frac{n_{11}}{n_{10}+n_{11}}.$$

Note that $$\hat{\pi}_2 = \frac{n_{01}+n_{11}}{n_{00}+n_{01}+n_{10}+n_{11}}$$

and that if the first observation is ignored, then $$\hat{\pi}_2 = \hat{\pi} = \frac{n_1}{n_0+n_1}$$

as previously defined. The test statistic $LR_{ind}$ is asymptotically distributed as the chi-square distribution $\chi^2(1)$ with 1 degree of freedom as $D \to \infty$.

The p-value associated with the calculated test statistic $LR_{ind}(\hat{\pi}_2, \hat{\pi}_{01}, \hat{\pi}_{11})$ is computed as follows:

$$\text{p\_value}_{LR_{ind}} = Pr(LR_{ind} \geq LR_{ind}(\hat{\pi}_2, \hat{\pi}_{01}, \hat{\pi}_{11})) \quad (164)$$

The test can be performed at the 5% significance level and the following possible outcomes are considered:
Pass if the p-value computed using equation (164) is greater than or equal to 5%; and
Fail if the p-value is less than 5%.
The following R-A-G scale shown in Table 5 is preferred for reporting the Christoffersen test results.

TABLE 5

| R-A-G Threshold for Christoffersen Test | |
| --- | --- |
| R-A-G | Threshold |
| G | p-value ≥ 5% |
| A | 0.01% ≤ p-value < 5% |
| R | p-value < 0.01% |

In the case of 2-day holding period, the Christoffersen test may be used in combination with the non-overlapping aggregation method. The test procedure is then applied separately to each of the h groups of non-overlapping time series, and the outcome is determined based on the average p-value taken across the groups.

There are cases when the test statistic in equation (163) may be undefined, most notably when $n_{11}$ is zero, i.e., when there are no two consecutive breaches. For 1-day holding period, a p-value of 1 may be formally reported and assigned Pass to the outcome of the test (or Green on the R-A-G scale) in such cases. For 2-day holding period, a p-value of 1 may be assigned to each of the groups for which the test statistic is undefined; however, the outcome may be determined based on the smallest p-value across the groups in this case (rather than the average p-value).

The Christoffersen test results for multiple portfolios can be aggregated using a method analogous to the overlapping/non-overlapping aggregation methods described above.

In general, the Christoffersen test tests the null hypothesis of independence against the first-order Markov property (rather than all forms of dependence in general). It is possible that the chi-square approximation may be inaccurate for small breach proportions (equivalently, high confidence levels) and only moderately large sample sizes. As a result, the actual significance level of the test may be much higher than the nominal specified significance level.

A purpose of the coverage ratio is to report the average IM coverage of a particular portfolio, or group of portfolios, across time, regardless of whether a breach has occurred or not. The coverage ratio may be used to assess if IRM 1616 is acting in an excessively conservative manner. This test is distinct from passing the backtest, which could be achieved simply by charging excessive margin.

The coverage ratio may be used by model calibration module 1628 in the calibration process of IRM 1616. The coverage ratio may also be used, for example, for comparing the performance of IRM 1616 across different portfolio groups, in different model configurations and/or to some benchmarks.

The coverage ratio quantifies how much of a margin cushion that IRM 1616 provides on average compared to realized VM. The coverage ratio (CR) is calculated as:

$$CR = \left\{\frac{\sum IM_d}{\sum VM_d}\right\}_{VM_d<0} \quad (165)$$

Here the summation runs over the backtest days for which the variation margin is negative, i.e., $VM_d<0$.

A possible limitation might arise as a result of aggregating over multiple backtest days. The coverage ratio may not provide information about how extreme the difference between $IM_d$ and $VM_d$ might be on any given day.

The breach fraction is a metric that may be used to calculate the realized coverage over the backtesting period for a particular portfolio.

The breach fraction for a portfolio is defined as follows:

$$BF = \frac{n_1}{D} \quad (166)$$

The value of the breach fraction BF should be close to the coverage probability p if the model coverage is correct.

Next, the breach severity metric is described. A purpose of the breach severity metric is to capture and assess the average severity of the occurred breaches of a single portfolio. In addition to the average, the maximum breach size of a single portfolio may also be provided.

Let $\{d_1, d_2, \ldots, d_u\}$ denote the set of dates where a breach event occurs and let $BS_d$ be the breach size as defined in equation (152) on backtest date d. The breach severity metric is defined as:

$$BreachSeverity = \frac{1}{u}\sum_{d \in \{d_1, d_2, \ldots, d_u\}} BS_d \quad (167)$$

In addition to breach severity, the maximum breach size defined as $\max(BS_d)_{d \in \{d_1, d_2, \ldots, d_u\}}$ may also be considered for further investigation. For the purpose of calculating these metrics, all days for which the Breach Size $BS_d$ is undefined due to the $IM_d$ being equal to zero may be excluded.

In some examples, the Breach Severity values may be large due to the IM being small whereas the breaches may have low materiality (in terms of the number of portfolio ticks).

In an example portfolio evaluation matrix for testing IRM 1616, across all of the portfolios tested, IRM 1616 generates zero Basel Traffic Light "Red" instances, as well as an "Amber" count that is, depending on portfolio, either zero or low. The Real and Stylized Clearing Member portfolios have zero instances of "Amber." The observed number of Amber instances in all cases is well below the number of Amber Portfolios Allowed.

The conclusion of this test based on the metrics is that the coverage achieved by IRM 1616 is very likely to be 99% or greater across all portfolios and for the full time period backtested. It is noted that similar results and similar conclusions have been determined for testing in the APC On configuration.

IRM 1616 passes the investigative Kupiec test, with zero instances of "Red" and, depending on the portfolio set, either zero or very few instances of "Amber." The observed number of Amber instances for all portfolios is well below the number of Amber Portfolios Allowed. These results are expected in view of the BTL results as shown above. The conclusion is that with a high degree of likelihood, IRM 1616 is able to achieve 99% coverage or greater, based on the full backtest period.

A substantial portion of breach clusters tend to be event driven, where a given macro event or meaningful announcement may cause IRM 1616 to breach for more than one day in a row. Across Red and Amber portfolios, the majority of breach clusters are clusters of 2 sequential breaches only, and the number of clusters does not exceed 3 in most cases.

From a model design perspective, there exists a tradeoff between sufficient reactivity to avoid sequential breaches versus making IRM 1616 overly reactive. IRM 1616 can be made more reactive, e.g. by reducing the Lambda parameter. However, increasing the reactivity may be undesirable from an overall margin stability or from an anti-procyclicality perspective.

Finally, to the extent significant macro events extend beyond a single business day, it can be expected that one or more Risk Factor or instrument portfolios might breach for the duration in the same way that a single-day market shock creates a single day breach. This occurs in the testing setup in a non-mitigated manner, that is, without the consideration of intra-day IM calls.

In this example, sequential breach clustering remains a relatively uncommon occurrence for IRM 1616: it occurs primarily for a narrow set of Risk Factor portfolios at identifiable macro-economic stress events. Overall Model performance is therefore deemed acceptable. Also, the results suggest that IRM 1616 is generally able to "learn" from recent market events and is sufficiently reactive to prevent breach clustering for the significant majority of portfolios.

Procyclicality Testing Category

An initial margin model is desirably reactive to changes in market conditions. However, it is undesirable for IRM 1616 to exhibit large step changes in the IM, especially during periods of stress. As specified by applicable regulations, it is desirable for IRM 1616 to behave in an anti-procyclical manner. To test the procyclicality, two categories of metrics are used: primary and investigative metrics.

The primary metrics generally assess whether IRM 1616 is procyclical based on IM changes over a predetermined time period (in this example, a 5-day horizon) during a pre-defined market period of stress. More specifically, the APC Expected Shortfall (APC ES) metric is evaluated over the period $B_S$ of the market stress defined as the 500-day period from Sep. 3, 2007 to Aug. 10, 2009. This period is selected based on the average values of the EWMA volatility (generated with EWMA Lambda equal to 0.98) taken across all linear Risk Factors.

To compute the APC Expected Shortfall, the relative IM changes are first calculated as follows:

$$\Delta IM_{5D;d} = \frac{IM_d}{IM_{d-5}} - 1 \qquad (168)$$

for d=6,7, ..., D. Then the APC Expected Shortfall metric is calculated as $$ES_{APC} = ES_{5D;95\%}(\Delta IM_{5D;6 \leq d \leq D}) \qquad (169)$$

where the $ES_{5D;95\%}(\cdot)$ is the Expected Shortfall operator at the $95^{th}$ percentile level that computes the average of the largest relative 5-day IM increases at the $95^{th}$ percentile level and higher. Note that the APC metric is concerned with relative IM increases, not relative IM decreases.

To calculate the APC Expected Shortfall, all days are excluded for which the relative IM change $\Delta IM_{5D;d}$ is undefined due to the $IM_{d-5}$ being equal to zero in rare cases.

Moreover, since the metric is affected by rolling to a new contract (causing the risk profile to change), the rolling dates are excluded from the metric computation. The exception is made for RI-CM Stylized portfolios since excluding the rolling dates for these portfolios may result in only a small number of days left for the metric computation.

In this example, the calculation of the APC Expected Shortfall metric is based on overlapping 5-day changes in the IM that exhibit serial dependency. Consequently, one large spike may affect 5 consecutive values of the APC Expected Shortfall. This may result in an increased error of the Expected Shortfall operator. It is also noted that the reported changes may appear large as they are stated in percentage terms, but may be small in magnitude (i.e. have low materiality, in tick terms). For dynamic types of portfolios the IM can change due to changes in the portfolio risk profile and therefore the metric may not be applied to such portfolios.

The investigative metrics, in general, complement the APC Expected shortfall metric as there is not a single "industry-standard" method to quantify procyclicality. The metrics considered are the n-day Procyclicality metric and Peak-to-Trough metric. These metrics are referred to as BoE APC metrics.

For the n-day Procyclicality, let the n-day relative IM change be denoted as:

$$\Delta IM_{nD;d} = \frac{IM_d}{IM_{d-n}} - 1 \qquad (170)$$

The n-day Procyclicality metric is then defined as the maximum of the n-day relative IM changes over a given period of time:

$$Procyclicality^{(n)} = \max_d \Delta IM_{nD;d} \qquad (171)$$

Similarly to the APC Expected Shortfall metric, the n-day Procyclicality metric is applied during period $B_S$ of stress.

To calculate n-day Procyclicality, all days are excluded for which the relative IM change $\Delta IM_{nD;d}$ is undefined due to the $IM_{d-n}$ being equal to zero. The rolling dates of contracts are excluded from the computation, with an exception being made for RI-CM Stylized portfolios (by analogy with the APC Expected Shortfall computation).

The Peak-to-Trough metric is defined as the ratio of the maximum margin requirement to the minimum margin requirement over a given period of time:

$$PeakToTrough = \frac{\max_d (-IM_d)}{\min_d (-IM_d)} \qquad (172)$$

The Peak-to-Trough metric is applied during the period $B_S$ of stress. To calculate this metric, all days are excluded for which $IM_d$ is equal to zero (however, rolling dates are not excluded).

The n-day Procyclicality metric is obtained as the maximum of the relative IM changes and hence may be very sensitive to outliers. In some examples, the Peak-to-Trough may be large even if the peak $$\max_d (-IM_d)$$

occurs prior to the through $$\min_d (-IM_d);$$

however, such cases do not present a concern since they correspond to decreases in margin requirements.

Regarding the portfolio evaluation matrix, note that the APC metrics may be applicable to a subset of portfolios with static positions and slowly changing risk profiles between expiry dates (relevant for Real Instruments). Assessing IRM 1616 for procyclicality includes careful consideration as it can be difficult to attribute margin changes to IRM 1616 itself or to the risk profile changing due to the passage of time, or in the case of options when the underlying price diverges to, or converges from, the strike level.

In this example of testing, in the group of RI-Stylized, the following non-option instrument portfolios are excluded from the APC assessment: portfolios with front contracts in STIR, Repo or SONIA/EONIA Futures since such portfolios have rapidly changing risk profiles due to monthly/quarterly cycle; and ERIS portfolios based on fixed expiries since such portfolios have changing risk profiles when approaching expiry.

In the groups of RI-Stylized and SI-Non-Linear Stylized, the option portfolios included in the APC assessment are outright ATM option portfolios where the underlying is not the front month expiry. ATM outright option portfolios are included in the assessment since the option portfolios were constructed based on relative strike, which could cause risk profile jumps due to the reconstruction of the portfolio for testing rather than IRM 1616 reacting to changes in volatilities (for example). Option portfolios where the underlying is the front month expiry are excluded from the (example) assessment as the underlying has a materially changing risk profile when approaching expiry.

RI-CM Real portfolios are excluded from the (example) APC assessment as the portfolio risk profile is not held constant over time due to positions changing potentially on a daily basis. In the group of RI-CM Stylized portfolios, all portfolios are included for the APC assessment. Since the APC metric results for these portfolios may be affected by rolling effects, such cases are carefully investigated and noted.

Overall, the testing results for the APC Expected Shortfall metric are deemed acceptable for the Real Instrument portfolios, as well as for the Risk Factor and Synthetic Instrument portfolios. Thus, it may be concluded that for all portfolios tested, IRM 1616 is able to generate Initial Margin during stress periods that is consistent with the expectation of anti-procyclicality.

In addition to the procyclicality testing results based on the historical data provided above, the procyclicality results are illustrated for the two synthetic datasets. For the Benign synthetic dataset, the APC ES metric indicates zero instances of Red and very few instances of Amber. For the Regime Change synthetic dataset, there are six Reds in total across the example 5,895 portfolios analyzed.

Sensitivity Testing Category

A purpose of sensitivity testing is to evaluate the change in model outputs due to a change in model inputs, parameter values, or market conditions. Two types of sensitivity testing are described below: Rolling Backtest Analysis and Parameter Sensitivity Testing. The rolling backtest analysis may be used to assess the performance of IRM 1616 over changing market conditions, including periods of stress.

In this example, the test is conducted using a 500-day rolling lookback window both in the APC On and APC Off configurations. The first lookback window covers the period from Sep. 3, 2007 to Aug. 10, 2009. The window is then shifted by one day with the last window covering the period from Mar. 10, 2016 to Feb. 14, 2018. A total of 2200 rolling windows are considered.

The backtesting allows assessment of the average performance of IRM 1616 over a long backtesting period. The rolling backtest allows detecting whether IRM 1616 underperforms in some time periods more than others.

The Basel Traffic Light Test is the Primary Metric that is applied to the Rolling Backtest Analysis. The APC Expected Shortfall metric is also examined. Each metric is evaluated for each of the lookback windows. In this example, the metrics are be applied to Real Instrument Stylized portfolios.

In this example, the power of the statistical tests (such as the BTL) applied to each of the 500-day lookback windows is lower as compared to the power of the tests applied in the full period backtesting due to a smaller sample size. This possible limitation may be mitigated by the fact that multiple (a total of 2200) lookback windows are considered.

The performance of IRM 1616 based on the BTL metric applied on a rolling 500-day window is therefore deemed acceptable. A similar performance is also determined when IRM 1616 is running in the APC on configuration.

For the parameter sensitivity testing analysis, the model input parameters are modified by varying a given parameter value from its baseline level. A comparison is then made, holding all other parameters constant at their Baseline values, of the backtesting output using the backtesting metrics described below. Sensitivity testing is designed to assess the robustness of performance of IRM 1616 to changes in the input parameters.

In this example, the parameter ranges are set to be relatively wide in order to explore the stability of IRM 1616 for the different parameter settings. The explored parameter ranges can and do violate both regulatory permitted parameter levels (e.g., holding period of one day, confidence level of less than 99%) as well as the parameter recommendations and ranges (Lambda equal to one).

In a production environment, in some examples, IRM 1616 may be parameterized in a manner that meets regulatory requirements. However, from a research perspective it is important to understand the model behavior over a wide range of parameter values to understand model stability to parameter selections in the neighborhood of (above and below) any values required by regulation.

The Basel Traffic Light Test, APC Expected Shortfall, and Breach Fraction metrics may be applied to sensitivity testing. Note that all of these metrics may not be applied across all portfolios for sensitivity testing.

In this example, the following Real Instrument portfolios are evaluated as part of sensitivity testing:
  Stylized Strategies: full period and rolling period testing is conducted
  Real CMs and Clients: full period is conducted for Basel Traffic Light Test and Breach Fraction metric only.
  Stylized CMs and Clients: full period for Basel Traffic Light Test and Breach Fraction and stress period testing for APC Expected Shortfall is conducted.

In this example, the model calibration process described above is not re-run when parameter changes are applied. Any dependencies between parameters that may impact the calibration process results are not considered.

Model sensitivity testing shows that IRM 1616 generally does not exhibit a high degree of sensitivity to the set of parameter inputs that are being evaluated.

The EWMA Weight (Lambda) parameter leads to reduced IRM 1616 performance when the parameter is set outside the recommended bound to $\lambda=1$. The number of both BTL Amber and Red instances increases with this setting. Similarly, when the Correlation Stress weight is reduced to zero, i.e. outside of the recommended range, the performance of IRM 1616 on the BTL metric is somewhat deteriorated.

Incremental Testing Category

Incremental testing may help to evaluate the change in model outputs due to the addition of model components. The progressive nature of the testing allows for the isolation of potential model issues to a particular component of IRM 1616. The testing starts with the most basic configuration and gradually adds additional model components. Comparison of backtesting metrics across the configurations is performed. In this example, portfolios for the incremental testing include Real Instrument Stylized portfolios.

The following configurations show an example progression of adding model components:
  Configuration A: The Volatility Forecast does not include the Volatility Floor or Stress Volatility Component. APC treatment, Correlation Stress Component, and Diversification Benefit Component are not included in the IM calculation.
  Configuration B (Configuration A+Stress Volatility Component+APC): The Volatility Forecast accounts for the Stress Volatility Component and APC Treatment.
  Configuration C (Configuration B+Volatility Floor): The Volatility Forecast accounts for the Volatility Floor.
  Configuration D (Configuration C+CSC+Diversification Benefits): The final IM calculation accounts for the Correlation Stress Component and Diversification Benefit Component.

In this example, P&L rounding is not applied in the incremental testing, in order to better isolate the impact of other model components. Accordingly, the Risk Factor VM is used in the tests for consistency. This allows for the full period backtesting as there is no dependency on the availability of the settlement VM for the instruments.

In this example, the Basel Traffic Light Test, Breach Fraction, and APC Expected Shortfall are applied to incremental testing.

The Lambda parameter is calibrated for the final configuration (Configuration D). In this example, the model calibration process is not re-run for each configuration.

Model Comparison with Historical Simulation Category

The Initial Margin for a VaR-based Historical Simulation model is calculated for Real Instrument Stylized portfolios and compared to the IM of IRM 1616. Historical Simulation amounts to using unscaled returns to generate the P&L distribution for the IM calculation. The length of the lookback window for Historical Simulation is set to $W_0$ days to match that of IRM 1616. In this example, time scaling is excluded from this testing (e.g., 1-day MPOR is used) to allow for a more direct comparison at a basic level between IRM 1616 and Historical Simulation.

In this example, the Basel Traffic Light Test, APC Expected Shortfall, and Breach Fraction metrics are used for the comparison.

Assumptions Backtesting Category

The impact of the chosen rounding treatment at the P&L level is compared with an alternative treatment which rounds the final IM rather than the P&L. The alternative rounding treatment is as follows. Consider a portfolio with N instruments, and let $Q_i$, $i=1, \ldots, N$ denote the quantity of each instrument held, multiplied by the contract value factor, and let $T_i$ denote the instrument minimum tick. After calculating the initial margin, without P&L rounding, denoted by $IM_{model}$, the following rounding treatment is applied:

$$IM_{final} = \left\lceil \frac{|IM_{model}|}{\tau} \right\rceil \cdot \tau, \quad \tau = \max_{i=1,\ldots,N} |Q_i T_i| \qquad (173)$$

where $\lceil \cdot \rceil$ denotes the ceiling operator that rounds the number up to the nearest integer. In particular, the method takes as its minimum tick the largest one-tick movement of any of the individual positions held. It is determined that the two treatments produce similar results with respect to standard metrics such as BTL and coverage ratio, based on the period from Sep. 3, 2007 to Feb. 14, 2018.

The chosen FX conversion method is compared with an alternative FX conversion method in which the spot FX rate (i.e., the FX Rate on the Value Date) is used. No scaling of the FX Risk Factors takes place in this case. Overall it is determined that the two FX conversion methods generate close results. Specifically, across all 21 multi-currency portfolios in the set of RI-Stylized portfolios, the $99^{th}$ percentile of absolute IM discrepancy $|IM_1-IM_2|$ is below 1 portfolio tick (defined as the largest instrument tick across all portfolio instruments) in the APC Off, 2-day holding period configuration (based on the backtest period from Sep. 3, 2007 to Feb. 14, 2018).

The initial margin of option portfolios is examined for which realized losses cannot exceed the premium (in magnitude). Specifically, it is investigated whether the magnitude of the initial margin for such portfolios exceeds the magnitude of the premium. It is expected that the exceedances may be present due to such features of IRM 1616 as the Correlation Stress Component and P&L Rounding. However, such exceedances may be acceptable when they are no larger than 1-2 relevant tick sizes.

Backtesting of option portfolios is performed in the set of Real Instrument Stylized portfolios over the period from Sep. 3, 2007 to Feb. 14, 2018. Those portfolios are examined for which realized losses do not exceed the premium and the premium is negative (i.e., there is a cost to construct the portfolio). In this example, the portfolios include outright options and option strategies, in particular box spread, conversion, straddle, strangle, call-put spread, butterfly, calendar spread and calendar straddle strategies.

The chosen time scaling method in which the holding period multiplier is equal to the square root of the holding period is compared with the time scaling method in which the holding period multiplier is equal to the maximum of the AR(1) time scaling factor and the square root of the holding period. In this example, backtesting of the RI-Stylized portfolios is performed in the APC Off, 2-day holding period configuration over the period from Sep. 3, 2007 to Feb. 14, 2018. Overall it is determined that the two methods generate similar results. Specifically, in cases where the median relative IM difference (taken across all backtest dates for a given portfolio) exceeds 3%, the (absolute) IM difference does not exceed 2 portfolio ticks.

Other approaches to time-scaling may include those based on using non-overlapping or overlapping h-day returns. (In these cases time-scaling is implicit and can be referred to as time aggregation.) However, such approaches may have limitations of their own. For example, the use of non-overlapping returns may result in serious reduction in the sample size (from W to $\lfloor W/h \rfloor$). Using overlapping returns may generate profound serial dependency in the data even if it was originally independent. Accordingly, the adopted time scaling approach may be preferred over such time-aggregation methods.

Example LRC Model

Next, an example configuration and testing of LRC model 1618 is described. The testing of LRC model 1618 may be performed, in some examples, by model testing module 1630. In general, LRC model 1618 include a number of parameters that may be configured for LRC model 1618 to operate according to predetermined performance characteristics. In some examples, LRC model 1618 may be configured by selecting Representative Instruments, Liquidity Buckets, CC and BAC groups. In some examples, parameters of LRC model 1618 may be periodically examined and/or adjusted.

The use of the Concentration Charge/Bid-Ask Charge groups in LRC model 1618 allows assessment of the liquidity risk more appropriately among instruments with common attributes, whereby market liquidity is expected to be different between different groups. Where the exposure for Representative Instruments is offsetting in the same group, this may prevent Clearing Members from having to post margins in excess of the economically relevant amount.

In the Baseline Model configuration, instruments that share the Product Category and Currency of the underlying instrument are assigned to the same group.

Liquidity Buckets collect instruments from one or more Expiry Buckets that can be represented by a single instrument, i.e. Representative Instrument. This allows the replacement of instrument positions in the Liquidity Bucket with a single position of the Representative Instrument. The Liquidity Buckets selection may take into consideration how products are traded, e.g., STIR packs (0-1Y, 1-2Y, etc.), and a correlation assessment of returns between each pair of instruments within a Liquidity Bucket. Instruments belonging to the same Liquidity Bucket are expected to exhibit high levels of correlation in the returns.

The Representative Instrument for each Liquidity Bucket may be selected based on multiple considerations, including trading activity and stability of the risk profile. Specifically, it is desirable for a Representative Instrument to be actively traded (relative to other instruments in the Liquidity Bucket); at the same time, the risk profile of the Representative Instrument should be stable. In view of the stability regulations, in this example, a linear instrument is selected as a Representative Instrument. To assess what instruments are actively traded, the average daily volume (ADV) is generally used, computed as for a given instrument based on all available historical data.

For STIR futures, a contract is generally selected with the greatest ADV as the Representative Instrument across the quarterly contracts in a Liquidity Bucket. Typically, for the 2Y+ Liquidity Buckets, a trend of decreasing daily volume is observed, which means that the shortest-time-to-expiry quarterly contract per bucket is selected as RI. For the 1Y Liquidity Bucket, the second-quarter contract is selected as the RI, which generally has a higher ADV than the first-quarter contract, although trading activity dominance does fluctuate across all four quarterly contracts in-between rolling cycles.

For Repos, in this example, the first-month contracts (1M) are not selected as the Representative Instrument because these contracts are essentially averaging products and may not be a good representative of all expiries. Among the remaining expiries, the contract with the highest ADV is selected, e.g., the second-month contract (2M).

For GBP Bond futures, the first-quarter contract is selected, in this example, as the Representative Instrument for each Liquidity Bucket based on the ADV considerations. For EUR Bond futures, due to low ADV values that have been observed, the first-quarter contract is selected as the Representative Instrument in line with our selection for GBP Bond futures.

For EUR Swapnotes, the first-quarter contract is selected as the Representative Instrument for each Liquidity Bucket because these contracts typically have the highest ADV (relative to the instruments in the Liquidity Bucket) and do not typically pose concern for stability of the risk profiles (e.g., in contrast with the first quarter STIR contracts). For GBP and USD Swapnotes, due to low ADV values that have been observed, the first-quarter contract is selected as the Representative Instrument in line with our selection for EUR Swapnotes.

For ONIA, the second-month contract is selected, in this example, as the Representative Instrument because the first-month contract may have an unstable risk profile. For ERIS, the first-quarter on-the-run contract is selected for each of the 2, 5, 10 and 30 year tenors for GBP and EUR as the Representative Instruments. The selection, in this example, is based on the relative trading activity of the front-quarter contracts as compared to other expiries. It is understood that Representative Instrument and Liquidity Bucket selections may be subject to periodic reviews.

The Minimum Delta $\Delta_{\%\ min}$ acts as a floor on the magnitude of the theoretical delta of an option. The intent of this floor is to avoid missing zero delta or near-zero delta options that nonetheless may still pose a risk to the CCP. Imposing a floor on option deltas may ensure that deep out-of-the-money options that may appear near-riskless to the VaR method for portfolio representation are captured by the calculation in the Delta method. On the Bid-Ask Charge side, the Minimum Delta helps to avoid instances where certain option portfolios may produce a zero charge under either method, whilst in a close-out process they may still attract a cost due to a lack of liquidity in deep out-of-the-money options.

To illustrate, consider a simple portfolio of one deep out-of-the-money option that maps to a Representative Instrument, with $\Delta \approx 0$, whose P&L vector entries are also near zero. Consequently, $BAC^{(V)} \approx 0$ and $BAC^{(D)} \approx \Delta_{\%\ min} \cdot BAC_r$.

The Minimum Delta value is selected based on the following considerations. The VaR method for portfolio representation may not be able to capture options with the probability of expiring in-the-money below 1% (since the confidence level in the VaR method is set to 99%). The value of Minimum Delta $\Delta_{\%\ min}$ may be selected so as to ensure protection for deep out-of-the-money options. Specifically, in the normal model for option pricing, the magnitude of option delta is equal to the probability of the option to expire in-the-money; in the lognormal model, this is approximately true assuming the time-to-expiry is relatively short.

The Concentration Thresholds (CTs), set separately per Liquidity Bucket for each Representative Instrument, may determine the capacity or volume that may be traded in one day with no impact on market pricing. For calibration of CT, volume data and open interest data are used. The calibration process for the Concentration Thresholds may depend on a number of parameters. The calibration methodology of the CTs and the value selection process for the parameters involved in the calibration are discussed below.

Example Calibration of LRC Model

In the example below, the CT is calculated by reference to a Short Lookback Window of the most recent $W_S$ business days and to a Long Lookback Window of the most recent $W_L$ business days. The CT for each Representative Instrument is calibrated using the following hierarchical approach:

1. For each day in the Lookback Window, the maximum volume $V_{max}$ across the futures instruments within the Liquidity Bucket is extracted. Similarly, the sum $V_{sum}$ of the volumes across the futures instruments within the same Liquidity Bucket is extracted.
2. Compute $V = \max(w_{sum}^V \cdot V_{sum}, V_{max})$ for each day in Long Lookback Window where $w_{sum}^V$ is a configurable parameter set in a range between 0 and 100%.
3. Compute $\hat{V}_S$ and $\hat{V}_L$ as the averages of V over the Short and Long Lookback Windows, respectively, based on the values obtained in the previous step. Days with zero volume are included in the averaging process, except for exchange holidays.
4. Compute the average volume $AV = \max(\hat{V}_S, \hat{V}_L)$.
5. Repeat steps 1 through 4 for the open interest data instead of volume. In step 2 use the configurable parameter $w_{sum}^{OI}$ (in place of $w_{sum}^V$). The execution of these steps results into the average open interest AOI.
6. Compute the Concentration Threshold as $$CT = \max(\beta_{AV} \cdot AV, \beta_{AOI} \cdot AOI, floor_{CT}) \quad (174)$$

The CT is floored to avoid pushing the Concentration Charge to arbitrarily large values. This amount represents a small position and is deemed not concentrated for all products in scope.

In this example, volume and open interest of option instruments are not considered in the Baseline configuration. However, in some examples, they may also be taken into account in steps 1 and 4 above.

Adjustments may be applied to CT in instances where model output is deemed to be unrepresentative of current liquidation risk faced by the CCP. Such adjustments are expected to occur on an exception basis rather than as a rule to be frequently applied. If LRC model 1618 is consistently overruled, this may serve as a guidepost to review the proper functioning and design of the model.

Parameter $w_{sum}^V$ measures what proportion of the trades is directional versus trading in spreads/strategies. The parameter was set to 45%, in this example, based on the empirical analysis of exchange data. The interpretation and value selection for parameter $w_{sum}^{OI}$ is analogous to that of $w_{sum}^V$.

The value of parameter $floor_{CT}$ is set, in this example, to 100 lots. Generally this is considered to be an amount that can be liquidated, without any market impact, in one day.

The Short Lookback Window Length is set, in this example, to 60 business days, which approximately corresponds to a calendar period of 3 months. The averaging over the Short Lookback Window is performed to be able to capture more recent changes in liquidity, such as the increase of liquidity at the end of 2015. The Long Lookback Window Length is set, in this example, to 250 business days, which approximately corresponds to a calendar period of 1 year. The averaging over the Long Lookback Window is performed to ensure the stability of the estimated volume from one day to the next.

It should be noted that the CT calibration with its parameter choices, in some examples, may be determined under a conservative assumption of considering ETD volume and OI only, thus discounting entirely OTC volume and OI.

Example Bid-Ask Parameters of LRC Model

Due to the nature of bid and ask prices, which may lead to an executed trade or just an open order to trade, the determination of the Bid-Ask spread parameters ($BA_r$) requires a careful consideration. The Bid-Ask spread parameterization process follows a waterfall structure that starts with observed Bid-Ask spread data reported by one or more electronic exchange or one or more third party systems followed by feedback from one or more systems associated with risk and/or product/market experts. In some examples, the available data may be reviewed and used to determine the suitability of the Bid-Ask charges for the purposes of LRC model 1618, and may provide for any adjustments where required.

Bid-ask parameters' calibration may use available data that is sourced as discussed above. In this example, the Bid-Ask spread estimate for each Representative Instrument is calculated as follows:

1. Extract the most recent quarter of data that follows the requirements of MiFID II Best Execution Report.

2. For each day, group instruments into their Liquidity Buckets and calculate the minimum, average and maximum of each of the following two fields in the report:
   i. AVG_EFFECTIVE_SPREAD
   ii. AVG_SPREAD_AT_BEST_BID_AND_OFFER
3. Calculate the (equally weighted) average of each of the estimates in Step 2 over the available days.

Here:

AVG_EFFECTIVE_SPREAD is the one-day average of an instrument's bid-ask spreads where each spread is the difference between best bid/offer before a trade is executed (excluding the order that caused the trade). The spread is calculated on every executed only trade and only if the both best bid/offer existed before the trade.

AVG_SPREAD_AT_BEST_BID_AND_OFFER is the one-day average of an instrument's bid-ask spreads, where each spread is calculated on every new order entry (when the new order is already in the order book) if both best offer and best bid exist. The orders that cause an executed trade are recorded as zero spreads and used in the averaging.

In this example, the AVG_EFFECTIVE_SPREAD field is used as the default for the Bid-Ask spread parameter setting, as this incorporates the best bid and best offer in the market prior to executed trades. Where the AVG_EFFECTIVE_SPREAD field returns null (no trades), the AVG_SPREAD_AT_BEST_BID_AND_OFFER filed is used as a fallback, if available.

Relevant proxy of parameters may be used in the following cases:

a) For products that are deemed to be liquid in the interest rate market, e.g. EuroDollar futures, but for which there is no reported trading activity, the Bid-Ask spread parameters can be set based on third-party sources or set to be 1 minimum price increment of the instrument. The parameters will be reviewed once the market becomes actively traded.

b) For instruments with little or no reported trading activity, the Bid-Ask spread parameters can be proxied using the nearest tenor or look alike products. The parameters will be reviewed once the market becomes actively traded.

The final parameters set by the Clearing Risk Department, taking into consideration the estimates detailed above, may be reviewed further, considering the instruments' trading behavior, for example, during expiries when trading activity rolls to new expiries.

Model Testing Module with Respect to the LRC Model

The Liquidity Risk Charges for different portfolios over a testing period are examined for various calibration setups. A number of empirical tests are performed to assess the performance of the LRC model.

The testing plan may be separated into the following main categories:

1. Stability Testing: to assess the stability of CC and BAC by considering them together with IRM 1616.
2. Sensitivity Testing: to assess the change in CC and BAC values due to a change in a parameter or configuration of LRC model 1618.

Additionally, a liquidation period analysis is performed, as discussed below.

Each test period provides a statistically meaningful sample and covers at least one financial market stress event. Notably, each test period includes stress observed following the United Kingdom's referendum result, in favour of leaving the European Union, on 24 Jun. 2016. Additionally, in December of 2015, the ECB cut the deposit rate by 10 bps and expanded the QE program, a decision the market did not expect. The testing period is constrained by the available data for actual Clearing Member portfolios and the raw data required for model parameterization, e.g. volume.

In each of the tests involving the CC, either a changing or static Concentration Threshold is used. The changing CT is calibrated as discussed above. In the case of the static CT, a single value of the Concentration Threshold $CT_r$ for each Representative Instrument is used throughout the testing period. This value is calibrated based on the 1-year period up to 22 Jan. 2018 (which is the last CT calibration date prior to the test period end date of 14 Feb. 2018).

A static value of the Bid-Ask spread $BA_r$ for each Representative Instrument is used throughout the testing period in all tests. It is calibrated based on the MiFID II Best Execution Report published in the second quarter of 2018 and covering the first quarter of 2018.

In this example, the following portfolio types are considered: real CM, stylized CM and synthetic stylized. For the real CM type, positions as observed historically in the accounts of Clearing Members. For the stylized CM type, theoretical instrument portfolios are designed based on the concentrated positions of CMs. For the synthetic stylized type, stylized theoretical portfolios with varying levels of concentration are designed, in particular, to test the sensitivity of CC with respect to position size.

Stability testing of CC and BAC is performed. The stability of LRC model 1618 is a key factor in assessing its performance. Since LRC model 1618 may be an add-on charge for IRM 1616, the stability of the LRC components may be performed by considering the components together with the IM determined by IRM 1616. Intuitively, if an account's risk profile remains unchanged from one day to the next, the sum of the LRC output and the IM (of IRM 1616) should also be stable or more importantly not procyclical.

The stability of the output of LRC model 1618 may be assessed, in an example, using the 5-day APC Expected Shortfall (APC ES) at the $95^{th}$ percentile level in line with the procyclicality assessment. Specifically, to assess the stability of a charge $C_d$ on day d ($C_d$ can be taken to be, for example, the sum of CC and the initial margin (from IRM 1616), the APC ES is computed as follows.

First the relative 5-day changes are calculated:

$$\Delta C_{5D;d} = \frac{C_d}{C_{d-5}} - 1 \qquad (175)$$

for d=6,7, . . . , D where D is the total number of days for which the charge is computed. Then the 5-day APC Expected Shortfall metric is calculated as $$ES_{APC} = ES_{5D;95\%}(C_{5D;6 \leq d \leq D}) \qquad (176)$$

where the $ES_{5D;95\%}$ is the Expected Shortfall operator at the $95^{th}$ percentile level that computes the average of the largest relative 5-day increases at the $95^{th}$ percentile level and higher. Note that the APC ES metric is concerned with relative increases, not relative decreases.

To calculate the APC ES, all days are excluded for which the relative change is undefined due to the $C_{d-5}$ being equal to zero (in very rare cases). Moreover, since the APC ES metric is affected by rolling to a new contract in the construction of historical stylized portfolios (causing the risk profile to change), the rolling dates are excluded from the metric computation.

One of three possible outcomes on the R-A-G scale is assigned as shown in Table 6 below:

TABLE 6

The outcomes for the APC ES Metric on the R-A-G scale

| R-A-G | APC ES Outcome | $ES_{APC}$ Thresholds |
|---|---|---|
| G | Low Procyclicality | <50% |
| A | Medium Procyclicality | >=50% and <=100% |
| R | High Procyclicality | >100% |

Note that the stability assessment may be performed only for a subset of portfolios with static positions and slowly changing risk profiles between expiry dates. Assessing LRC model 1618 for stability may include careful consideration as it can be difficult to attribute changes to LRC model 1616 itself or to the risk profile changing due to the passage of time, or in the case of options when the underlying price diverges from, or converges to, the strike level.

In this example, for the stability testing, two portfolio sets are used: Stylized CM and Synthetic Stylized portfolio sets. In the Synthetic Stylized set, a subset of 72 portfolios are considered that conform to the desired outcomes (discussed above).

The stability of the Concentration Charge and Bid-Ask Charge may be assessed, in an example, by applying the 5-day APC ES metric to the following four (4) charges: the initial margin (IM) determined by IRM 1616); IRM 1616IM+CC; IRM 1616IM+BAC; and IRM 1616IM+CC+BAC.

Next, sensitivity testing is discussed. A purpose of sensitivity testing is to evaluate the change in model outputs due to a change in parameter values or configuration settings. For CC, sensitivity is tested with respect to Concentration Thresholds, to CCG selection, to a different Liquidity Bucket selection, to the size of portfolio positions, and to three model parameters. For BAC, sensitivity is tested with respect to BACG selections, to a different Liquidity Bucket selection, and to the Minimum Delta parameter.

In this example, sensitivity of CC and BAC to grouping configurations is tested using the set of 17 Stylized CM portfolios. Both for CCG and BACG, two grouping configurations are considered, in addition to the Baseline configuration. From most to least granular the configurations are:

Grouping configuration 1 (GC1): All instruments with the same currency are grouped together. This produces 4 different groups (CHF, EUR, GBP, and USD).

Grouping configuration 2 (GC2): All instruments are assigned to the same group. This results into a single group (Rates).

The expectation is that the more granular the grouping is, the less portfolio benefit will be provided between positions when calculating the charges. Accordingly a more granular grouping would generally result in a higher CC and BAC.

The sensitivity of CC as well as BAC are tested with respect to the Liquidity Bucket selection using the set of 261 Synthetic Stylized portfolios. In this example, two configurations are considered: the Baseline configuration as discussed above, and an alternative configuration.

Next, the sensitivity of CC is tested with respect to the change in the size of portfolio positions using the example set of 261 Stylized Synthetic portfolios. In this example, the portfolio set includes outrights as well as spreads/butterflies. Each portfolio falls into one of three categories: mildly concentrated, highly concentrated, and extremely concentrated. The size of each position in a mildly, highly and extremely concentrated portfolio is selected so that the corresponding Liquidation Period is 0.5 days, 2 days and 6 days, respectively. The size of all positions does not change over time, except for a subset of delta-hedged portfolios.

It is expected that the CC generally increases as the portfolio becomes more concentrated, given the portfolio is structurally the same and only the size of the position is changing.

Next, the sensitivity of CC is tested with respect to the Concentration Thresholds using the example set of 248 Real CM accounts. Specifically in addition to the Baseline configuration, two example alternative configurations are considered in which the Concentration Threshold for each Representative Instrument is obtained by multiplying the Baseline value of CT by a factor of 0.5 and a factor of 2, respectively.

As expected, the CC generally increases as the CT decreases. Moreover, the CC increases non-linearly, i.e., at a higher rate for a smaller CT.

Next, the sensitivity of CC and BAC are tested with respect to the following parameters: $w_{sum}^V$ and $w_{sum}^{OI}$, $\beta_{AOI}$, and Minimum Delta. In this example, the set of Synthetic Stylized portfolios is used.

Next, a sensitivity of CC to $\beta_{AOI}$ is discussed. As expected, decreasing (respectively, increasing) the value of $\beta_{AOI}$ generally leads to a greater (respectively, smaller) CC.

Next, the sensitivity of CC to $w_{sum}^V/w_{sum}^{OI}$ values is tested using the Synthetic Stylized portfolio set. As expected, decreasing (respectively, increasing) the value of $w_{sum}^V/w_{sum}^{OI}$ generally leads to a greater (respectively, smaller) CC.

Next, the sensitivity of CC and BAC to the Minimum Delta values is tested using 192 option portfolios of the Synthetic Stylized set. As expected, increasing (respectively, decreasing) the value of Minimum Delta generally leads to a greater (respectively, smaller) CC. For the BAC, it is observed that it generally exhibits little sensitivity to the considered Minimum Delta values. Specifically, in this example, the average ratio of IM+BAC in each of the two alternative configurations to the IM+BAC in the Baseline configuration remains within the interval from 99.8% to 100.2% on all dates in the test period.

Next, a liquidation period analysis is discussed. In this example, the length of each liquidation period $LP_r$ is analyzed using the set of Real CM portfolios over the testing window from 26 Jan. 2015 to 14 Feb. 2018. In the analysis, the average for each $LP_r$ is computed across all portfolios and all dates considered.

Computer Architecture

Systems and methods of the present disclosure may include and/or may be implemented by one or more specialized computers or other suitable components including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer specifically configured to perform the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) and/or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with one or more components of risk engine architecture 100 (FIG. 1) and risk management system 1600 (FIG. 16) (including components 1610-1630 of risk engine 1602, data source(s) 1604, data recipient(s) 1606) or an external system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a cellular telephone, a personal digital assistant, a smartphone, or any other computing and/or communication device.

The term "network" shall refer to any type of network or networks, including those capable of being utilized in connection with architecture 100 and system 1600 described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 28:
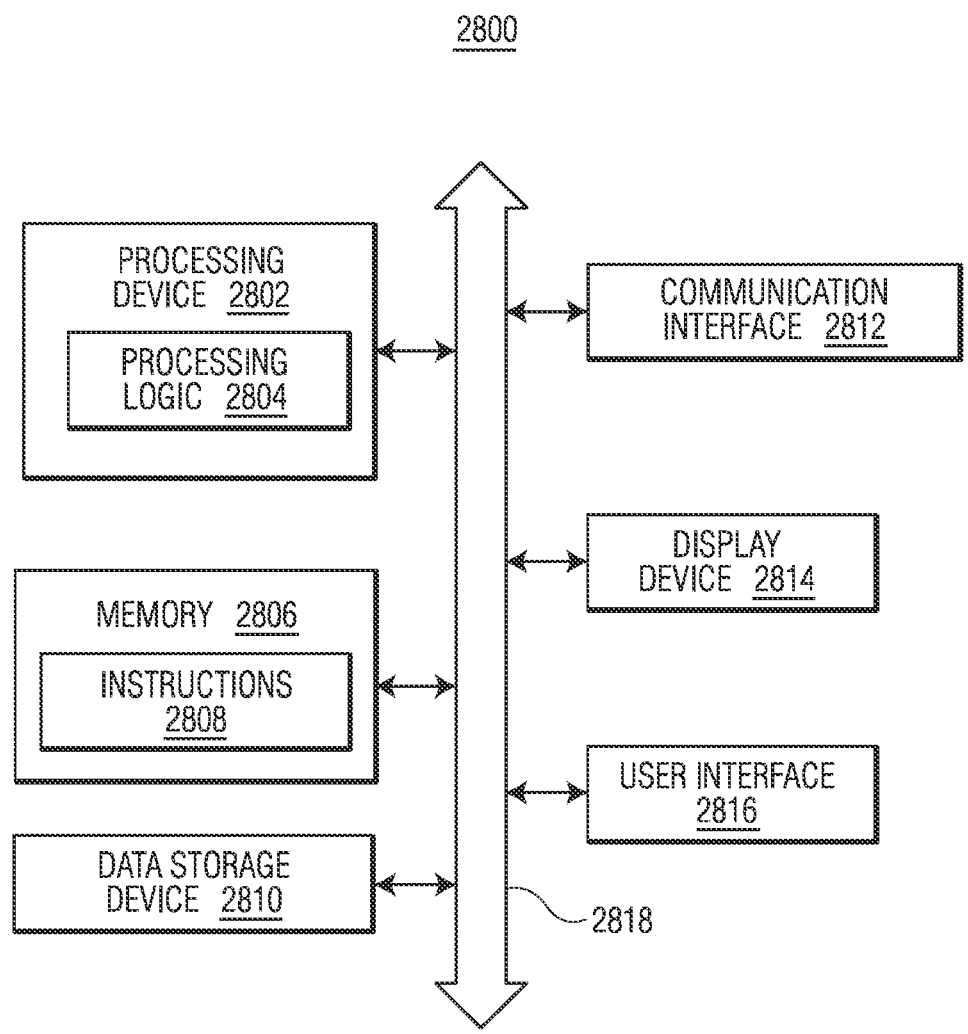
FIG. 28 is a functional block diagram of an example computer system, according to the present disclosure.

FIG. 28 illustrates a functional block diagram of a machine in the example form of computer system 2800 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more components of risk engine architecture 100 or risk engine 1600 (e.g., components 1610-1630) may be implemented by the example machine shown in FIG. 28 (or a combination of two or more of such machines).

Example computer system 2800 may include processing device 2802, memory 2806, data storage device 2810 and communication interface 2812, which may communicate with each other via data and control bus 2818. In some examples, computer system 2800 may also include display device 2814 and/or user interface 2816.

Processing device 2802 may include, without being limited to, a microprocessor, a central processing unit, an application specific integrated circuit (ASIC), a field programmable gate array (FPGA), a digital signal processor (DSP) and/or a network processor. Processing device 2802 may be configured to execute processing logic 2804 for performing the operations described herein. In general, processing device 2802 may include any suitable special-purpose processing device specially programmed with processing logic 2804 to perform the operations described herein.

Memory 2806 may include, for example, without being limited to, at least one of a read-only memory (ROM), a random access memory (RAM), a flash memory, a dynamic RAM (DRAM) and a static RAM (SRAM), storing computer-readable instructions 2808 executable by processing device 2802. In general, memory 2806 may include any suitable non-transitory computer readable storage medium storing computer-readable instructions 2808 executable by processing device 2802 for performing the operations described herein. For example, computer-readable instructions 2808 may include operations performed by components 1610-1630 of risk engine 1602), including operations shown in FIGS. 19-25 and 27). Although one memory device 2806 is illustrated in FIG. 28, in some examples, computer system 2800 may include two or more memory devices (e.g., dynamic memory and static memory).

Computer system 2800 may include communication interface device 2812, for direct communication with other computers (including wired and/or wireless communication) and/or for communication with a network. In some examples, computer system 2800 may include display device 2814 (e.g., a liquid crystal display (LCD), a touch sensitive display, etc.). In some examples, computer system 2800 may include user interface 2816 (e.g., an alphanumeric input device, a cursor control device, etc.).

In some examples, computer system 2800 may include data storage device 2810 storing instructions (e.g., software) for performing any one or more of the functions described herein. Data storage device 2810 may include any suitable non-transitory computer-readable storage medium, including, without being limited to, solid-state memories, optical media and magnetic media.

All exemplary embodiments described or depicted herein are provided merely for the purpose of explanation and are in no way to be construed as limiting. Moreover, the words used herein are words of description and illustration, rather than words of limitation. Further, although reference to particular means, materials, and embodiments are shown, there is no limitation to the particulars disclosed herein.

The invention claimed is:

1. A system comprising:
one or more processors executing machine-readable instructions stored in a non-transitory storage medium, thereby causing the system to:
receive risk factor data from a plurality of data sources, the risk factor data comprising current real-time data and historical data associated with one or more financial portfolios;
generate an initial margin for the one or more financial portfolios, according to a historical risk factor simulation process, based on the risk factor data;
determine a stress metric to account for increases or decreases in the risk factor data by:
determining daily changes in the historical data,
determining a percentile of the daily changes using a variable that accounts for daily changes in volatility, and
applying a stress volatility treatment to the percentile using a risk factor anti-pro-cyclicality index;
determine a portfolio level liquidity charge for the one or more financial portfolios based on bid and ask spread data associated with the one or more financial portfolios;
determine a concentration charge for the one or more financial portfolios;
determine a total portfolio margin based on a combination of the initial margin, the stress metric, the portfolio level liquidity charge and the concentration charge;
create a summary risk report in a standardized format, the summary risk report comprising the total portfolio margin;
store the summary risk report in the standardized format in one or more databases;
format, based on preferences of a data recipient stored in the one or more databases, the summary risk report into a non-standardized format to allow for presentation on a graphical user interface (GUI) of the data recipient, the non-standardized format particular to the data recipient; and
distribute, via a data recipient interface, the formatted summary risk report to the data recipient according to one or more of a predefined time interval and a predetermined condition.

2. The system of claim 1, wherein the historical risk factor simulation process comprises a filtered historical simulation process, wherein the system generates the initial margin by executing machine-readable instructions that cause the system to:
execute the filtered historical simulation process comprising applying a scaling factor to historical pricing data for the risk factor data to resemble current market volatility.

3. The system of claim 2, wherein the machine-readable instructions, when executed by the one or more processors, further cause the system to:
generate portfolio profit and loss values for the one or more financial portfolios based on results of the historical risk factor simulation process, wherein the portfolio profit and loss values are used to determine the initial margin.

4. The system of claim 2, wherein the machine-readable instructions, when executed by the one or more processors, further cause the system to:
retrieve the historical pricing data for the risk factor data;
determine statistical properties of the historical pricing data;
perform de-volatilization of the historical pricing data based on historical volatility;
process the de-volatized historical pricing data; and
perform re-volatilization on the processed data based on one or more scaling factors to adjust for the current market volatility.

5. The system of claim 2, wherein the machine-readable instructions, when executed by the one or more processors, further cause the system to:
execute a volatility forecast configured to adapt to current market environment conditions, the volatility forecast comprising a stress volatility component associated with market stress periods.

6. The system of claim 5, wherein the machine-readable instructions, when executed by the one or more processors, further cause the system to:
dynamically adjust the volatility forecast to reduce pro-cyclicality.

7. The system of claim 3, wherein the machine-readable instructions, when executed by the one or more processors, further cause the system to:
generate one or more risk factor scenarios based on the results of the historical risk factor simulation process;
generate one or more instrument pricing scenarios based on the one or more risk factor scenarios;
generate one or more profit and loss scenarios at an instrument level, based on the one or more instrument pricing scenarios; and
aggregate the one or more profit and loss scenarios at the instrument level to form one or more profit and loss scenarios at a portfolio level.

8. The system of claim 1, wherein the machine-readable instructions, when executed by the one or more processors, further cause the system to at least one of:
apply a portfolio diversification benefit to the initial margin, and
apply a currency allocation to the initial margin.

9. The system of claim 1, wherein the machine-readable instructions, when executed by the one or more processors, further cause the system to:
generate one or more synthetic datasets configured to model one or more hypothetical market conditions.

10. The system of claim 1, wherein the machine-readable instructions, when executed by the one or more processors, further cause the system to:
execute a margin model to generate the initial margin.

11. The system of claim 10, wherein the machine-readable instructions, when executed by the one or more processors, further cause the system to:
test the margin model according to one or more testing categories,
the one or more testing categories comprise one or more of fundamental characteristics, backtesting, pro-cyclicality, sensitivity, incremental addition of one or more model components, model comparison with historical simulation, and assumption backtesting.

12. The system of claim 1, wherein the one or more financial portfolios comprise one or more financial products and one or more currencies.

* * * * *

UNITED STATES PATENT AND TRADEMARK OFFICE
CERTIFICATE OF CORRECTION

PATENT NO. : 11,928,734 B2
APPLICATION NO. : 17/719983
DATED : March 12, 2024
INVENTOR(S) : Maruyama et al.

Page 1 of 1

It is certified that error appears in the above-identified patent and that said Letters Patent is hereby corrected as shown below:

In the Specification

In Column 105

At Line 55, please change "($w_{sum}^V \cdot V_{sum}, V_{max}$)" to --$(w_{sum}^V \cdot V_{sum}, V_{max})$--;

At Line 56, please change "$w_{sum}^V$" to --$w_{sum}^V$--;

At Line 66, please change "$w_{sum}^{OI}$ (in place of $w_{sum}^V$)" to --$w_{sum}^{OI}$ (in place of $w_{sum}^V$)--.

In Column 106

At Line 23, please change "$w_{sum}^V$" to --$w_{sum}^V$--;

At Line 27, please change "$w_{sum}^{OI}$" to --$w_{sum}^{OI}$--; and

At Line 28, please change "$W_{sum}^V$" to --$w_{sum}^V$--.

In Column 110

At Line 26, please change "$w_{sum}^V$ and $w_{sum}^{OI}$" to --$w_{sum}^V$ and $w_{sum}^{OI}$--;

At Line 32, please change "$w_{sum}^V / w_{sum}^{OI}$" to --$w_{sum}^V / w_{sum}^{OI}$--; and At Line 35, please change "$w_{sum}^V / w_{sum}^{OI}$" to --$w_{sum}^V / w_{sum}^{OI}$--.

Signed and Sealed this
Twenty-fifth Day of March, 2025

Coke Morgan Stewart
*Acting Director of the United States Patent and Trademark Office*